United States Patent
Gaston

(10) Patent No.: US 11,386,391 B1
(45) Date of Patent: Jul. 12, 2022

(54) AUTONOMOUS POINT-OF-SALE TRIGGERED LOGISTICS ENGINE

(71) Applicant: KIMERGY LLC, Honolulu, HI (US)

(72) Inventor: Kim Gaston, Ohau, HI (US)

(73) Assignee: Kimergy LLC, Honolulu, HI (US)

( * ) Notice: Subject to any disclaimer, the term of this patent is extended or adjusted under 35 U.S.C. 154(b) by 0 days.

(21) Appl. No.: 17/671,272

(22) Filed: Feb. 14, 2022

(51) Int. Cl.
  *G06Q 10/08* (2012.01)
  *G06Q 50/12* (2012.01)
  *G06Q 10/06* (2012.01)

(52) U.S. Cl.
  CPC ... *G06Q 10/087* (2013.01); *G06Q 10/063118* (2013.01); *G06Q 10/08355* (2013.01); *G06Q 50/12* (2013.01)

(58) Field of Classification Search
  CPC ......... G06Q 10/087; G06Q 10/063118; G06Q 10/08355; G06Q 50/12
  See application file for complete search history.

(56) References Cited

U.S. PATENT DOCUMENTS

| | | | |
|---|---|---|---|
| 8,190,483 B2 * | 5/2012 | Woycik | G07G 1/14 705/26.1 |
| 9,031,867 B1 * | 5/2015 | Crawford | G06Q 30/0601 705/26.1 |
| 10,181,111 B1 * | 1/2019 | Kohli | G01S 19/42 |
| 10,977,606 B1 * | 4/2021 | Mimassi | G06Q 10/063114 |
| 11,010,739 B2 * | 5/2021 | Bell | G06Q 20/12 |

FOREIGN PATENT DOCUMENTS

| | | | | |
|---|---|---|---|---|
| WO | WO-0111523 A1 * | 2/2001 | | G06Q 30/06 |
| WO | WO-2015034327 A1 * | 3/2015 | | A47J 36/00 |

\* cited by examiner

*Primary Examiner* — A. Hunter Wilder
(74) *Attorney, Agent, or Firm* — Fish & Richardson P.C.

(57) ABSTRACT

Disclosed are techniques for processing and completing food orders placed by consumers using food ordering services. A method can include providing menu items to user devices for display to consumers, receiving orders from user devices before delivery of the orders, processing each order to generate a delivery address and an ordered menu item, assigning a kitchen to prepare an ordered menu item based on kitchen proximity to the delivery address of, determining if an ingredient of an ordered menu item is understocked in the kitchen, ordering, with a purveyor, understocked ingredients, forwarding instructions to prepare an ordered menu item to a device of the kitchen, grouping the ordered menu items into cohorts based on proximity of the addresses relative to each other, assigning the cohorts to delivery workers, and providing delivery routes for the cohorts to delivery worker devices. The method can be performed within seconds and for many kitchens.

19 Claims, 38 Drawing Sheets

User Device 106A

1004

Meal Plan Summary ⊗
Order changes are allowed until 2pm on day before delivery.

$26.55

[EDIT CART]  [EMPTY CART]

MEAL PLAN FOR
WED · JAN 3, 2020

( DELIVER BY 12:10PM
Baldwin Hills Elementary ⌄ )

| | |
|---|---|
| Lobster Mac & Cheese<br>No Cherry Tomatoes | $8 |
| 2 Cookies<br>$1.19 each | $2 |

MEAL PLAN FOR
THU · JAN 4, 2020

( DELIVER BY 12:10PM
Baldwin Hills Elementary ⌄ )

| | |
|---|---|
| Lobster Mac & Cheese<br>No Cherry Tomatoes | $8 |
| 2 Cookies<br>$1.19 each | $2 |

GIFTING
Each gifted meal costs $5
☑ I want to gift [3 ⌄] meals to families in watts CART TOTALS
○ 10% Tip — $2.65
☑ 10% Tip (Recommended) — $3.97
○ Custom Tip  [$--]

| | |
|---|---|
| Subtotal | $24 |
| Tax | $1.55 |
| Tip | $1.00 |
| Discount (Event Name) | $10 |
| Grand Total | $26.55 |

PAYMENT METHOD
[ Credit Card ending in XXXX0000 ⌄ ]
☑ Use my 100 points towards this order

[ CONFIRM ORDER — $26.55 ]
or continue setting up your meal plans

FIG. 10D

Delivery Device 112A

1106

Jane Doe

[map showing McDonald's, Red Rock Coffee, Mountain View, Almond School, 32 MINS AWAY Moderate Traffic]

DELIVER TO

Baldwin Hills Elementary     11AM-1PM
1090 Baldwin Ave
Los Angeles, CA 90018

CUSTOMER

John Doe

MANIFEST

MARK AS DELIVERED ←1108

COMMENT     50 character limit

○ Failed Delivery
⊙ Sucessful Delivery

SUBMIT

FIG. 11E

Delivery Device 112A

Kitchen Device 110A

Let's go A!

04 : 32 : 24
MONDAY, SEPT. 1, 2021
AUGUST 10, 2021

Task Manager

| | EST. TIME | ACTUAL TIME | 7:00AM 7:30AM 8:00AM 8:30AM 9:00AM 9:30AM 10:00AM 10:30AM 11:00AM 11:30AM |
|---|---|---|---|
| ∨ Preparation | 90m | 93m [END] | |
| Cut 23g of cabbage | 10m | [START] | |
| Slice 24 onions | | [START] | |
| Peel 8 potatoes | | | |
| ∨ Cooking | | | |
| Toast buns | | [START] | |
| Sautee ground beef | | [START] | |
| Apply onions | | [START] | |
| ∨ Packaging | | | |
| Prepare utensils | | [START] | |
| Apply stickers | | [START] | |
| ∨ Package all burgers | | [PRINT] | |
|   Ashly Burns | | | |
|   Banner Cruz | | | |
|   Robert Tandem | | | |
| ∨ Delivery | | | |
| ∨ John Doe (3) | | | |
|   100 Road, LA | | | |
|   200 Road, LA | | | |
|   300 Road, Inglewood | | | |
| ∨ Jane Smith | | | |
|   100 Road, LA | | | |
|   300 Road, LA | | | |
| ∨ Johnny Deer | | | |

Kitchen Device 110A — Task Manager

04:32:24
MONDAY, SEPT. 1, 2021

| | EST. TIME | ACTUAL TIME | AUG 7:00 |
|---|---|---|---|
| ∨ Preparation | 90m | 93m | |
| Cut 23g of cabbage | 10m | END | |
| Slice 24 onions | | START | |
| Peel 8 potatoes | | START | |
| ∨ Cooking | | | |
| Toast buns | | START | |
| Sautee ground beef | | START | |
| Apply onions | | START | |
| ∨ Packaging | | | |
| Prepare utensils | | START | |
| Apply stickers | | START | |
| ∨ Package all burgers | | PRINT | |
| Ashly Burns | | | |
| Banner Cruz | | | |
| Robert Tandem | | | |
| ∨ Delivery | | | |
| ∨ John Doe (3) | | | |
| 100 Road, LA | | | |
| 200 Road, LA | | | |
| 300 Road, Inglewood | | | |
| ∨ Jane Smith | | | |
| 100 Road, LA | | | |
| 300 Road, LA | | | |
| ∨ Johnny Deer | | | |

1200

1202
TASK: Slice 24g of Onions
ESTIMATED TIME TO COMPLETE 90m
START TIME 9:30AM
END TIME 10:31AM
ELAPSED TIME 10:31
END TASK

1204
TASK: Peel 8 Potatoes
ESTIMATED TIME TO COMPLETE 90m
START TIME 9:30AM
END TIME 10:31AM
OVERDUE 39 MINUTES!
START TASK

1206
TASK: Cut 23g of Cabbage
ESTIMATED TIME TO COMPLETE 90m
START TIME 9:30AM
END TIME 10:31AM
START IN 39 MINUTES
START TASK

User Device 1300

| Search 🔍 | Menu Manager ☰ |
|---|---|
| ⚙ Kitchen 1 | Kitchen 1 |
| ⚙ Kitchen 2 | [VIEW MENU] ✕ ✓ |
| ⚙ Kitchen 3 | Tagline  The Food In The West |
| ⚙ Kitchen 4 | Description  The kitchen description goes here. |
|  | Address  1010 Wilshire Blvd, Los Angeles, CA 90017 |
|  | Inventory [Search 🔍] + |
|  | {{stock.product.name}} {{stock.size}}{{stock.unit}} {{stock.supplier.name}} {{stock.product.sku}} |
|  | RED ONION  10LB  FOSTER FARMS  B9092 ⊕ ⊖ |
|  | RED ONION  10LB  FOSTER FARMS  B9092 ⊕ ⊖ |

User Device 1300

Search 🔍

< KITCHEN 1

Chilli Cheese Burger

Korean BBQ Pizza

Korean BBQ Sandwich

Jerk Chicken Plate

Korean BBQ Sandwich ✕ ✓

Menu Manager 📊 — 1304

Sku  CBK1010

Description

Ingredients

Prep Tasks  +

CHOP  3.98 OZ  ONION  30 MINUTES  ⊗

Cook Tasks

Assemble Tasks

Pack Tasks

Inventory

AUTONOMOUS POINT-OF-SALE TRIGGERED LOGISTICS ENGINE

TECHNICAL FIELD

This document describes devices, systems, and methods related to processing delivery transactions data and generating workflow directives to fulfill the delivery transactions.

BACKGROUND

Food service companies, such as restaurants, can operate through on-demand transactions that are placed by end users (e.g., consumers) and then processed by point-of-sale (POS) systems. The transactions, or orders, can be placed by an end user using a mobile application or other food ordering software/services that are accessible via a user device, such as a smartphone. Kitchen logistics can assume that meals are to be prepared in an order through which the meals were processed through the POS systems. Thus, the meals can be prepared using an on-demand model, in which meals are prepared as they are received and processed by the POS systems.

Ghost kitchens can also prepare meals that are ordered by the end users using the mobile application or other food ordering software/services. A ghost kitchen can be a food preparation option that does not have waiters, a dining room, a parking lot, or other public presence. Rather, ghost kitchens are physical spaces for operators to create food for consumption by the end users who place orders via the mobile application or other food ordering software/services.

SUMMARY

The document generally relates to a cloud-based computing system for efficiently processing and completing food orders that are placed by end users (e.g., consumers) using mobile applications or other food ordering services/software. The disclosed techniques can provide for calendar-based ordering and food preparation, which can be more efficient than traditional on-demand ordering and preparation. More particularly, the disclosed techniques provide an autonomous POS-triggered logistics engine that can enable: (a) ghost kitchens to prepopulate menus made available to end users, (b) end users to add meals from pre-populated menus to their calendars days, weeks, even months in advance for delivery to one or more locations at a particular time or during a particular window of time, and be charged just prior to delivery, (c) purveyors to send ghost kitchens product identifiers, such as SKUs, needed to complete their calendar-based orders automatically based on a delta of SKUs on hand and SKUs needed to complete orders, (d) kitchens (such as ghost kitchens) to determine which employees to call in to prep, cook, pack, and push to which drivers (during which delivery windows) a precise quantity of meals, and (e) drivers to know which meals to take to which locations on their route in which order. Such logistics can be dynamically determined for any given delivery period using the disclosed techniques.

The disclosed techniques provide for a calendar-based model for ordering meals. This type of model can enable end users to select and schedule meals to be made and delivered sometimes days, weeks, even months in advance. The end users' transactions can also occur automatically and simultaneously prior to the meals being made, even prior to kitchens requesting missing SKUs from purveyors to prepare those meals. As a result, the calendar-based model described herein can support dynamic operations, thereby enabling cost savings to all relevant parties (e.g., end users can get discounts for ordering meals farther out in advance of delivery, kitchens can determine how many and which employees to call in for a particular day when a particular group of meals are to be prepared, kitchens can also determine how many and which drivers to call in, purveyors and kitchens can work together to order an appropriate amount of ingredients to prepare the particular group of meals for the particular day, etc.).

The techniques described herein can also provide for automatically processing a given dataset of transactions simultaneously through a POS system and into directives that enable a ghost kitchen's (or various kitchens') staff to stock, prep, cook, pack, and push meals to drivers. This disclosure provides various techniques for addressing the dataset of transactions, ensuring an appropriate amount of SKUs are available to the kitchen to make meals in the dataset of transactions, organizing deliveries into optimal routes, assigning routes to drivers based on preference and/or performance, assigning meals to be delivered in each route to a packaging associate (e.g., employee, other relevant user), and grouping like meals to their optimal prep and cooking station(s) in the kitchen.

One or more embodiments described herein can include a method including receiving, at a computing system and from user devices of one or more chefs, menu item content for a menu item to be presented to users, at user devices, and identification of ingredients needed to prepare the menu item, providing, by the computing system, menu items to user devices for display to users, receiving, at the computing system and from user devices of users, orders by a specified period of time prior to delivery of the orders, the orders including selection of one or more of the menu items presented to the users at the plurality of user devices, processing, by the computing system, each order to generate a delivery address and an ordered menu item, assigning, by the computing system, a kitchen to prepare an ordered menu item based at least in part on proximity of the kitchen to the generated delivery address of the ordered menu item, determining, by the computing system, if an ingredient of an ordered menu item is understocked in the kitchen to which an ordered menu item is assigned, ordering, by the computing system and with a purveyor, understocked ingredients, forwarding, by the computing system, instructions to prepare an ordered menu item to a user device in the kitchen where the ordered menu item is to be prepared, grouping, by the computing system, the ordered menu items into cohorts of ordered menu items based on proximity of the generated addresses relative to each other, assigning, by the computing system, the cohorts of ordered menu items to one or more delivery workers, and providing, by the computing system, delivery routes for each of the cohorts of the ordered menu items to be delivered to user devices of the one or more delivery workers. The delivery routes can include driving instructions to deliver the orders. The steps can be performed within seconds and for more than one kitchen.

In some implementations, the embodiments described herein can optionally include one or more of the following features. For example, the method can also include receiving, by the computing system, the menu item content for the menu item to be presented to users from a group of unaffiliated chefs. The identification of ingredients can include SKUs associated with each of the ingredients needed to prepare the menu item. The identification of ingredients can also include weights and quantities of each of the ingredients needed to prepare the menu item. The specified period of time prior to delivery of the orders can be within a range of 3 to 24 hours.

In some implementations, the method can include lowering, by the computing system and by a predetermined amount, a cost charged to the users for the orders based on how far in advance the users place the orders within the specified period of time prior to delivery of the orders. In some implementations, assigning, by the computing system, a kitchen to prepare an ordered menu item can also be based at least in part on whether the kitchen has a quantity of the ingredients needed to prepare the ordered menu item. Sometimes, assigning, by the computing system, a kitchen to prepare an ordered menu item can also be based at least in part on whether the kitchen has equipment needed to prepare the ordered menu item. Moreover, assigning, by the computing system, a kitchen to prepare an ordered menu item can be based at least in part on whether the kitchen has sufficient kitchen staff to prepare the ordered menu item. Sometimes, assigning, by the computing system, a kitchen to prepare an ordered menu item can further be based at least in part on whether the kitchen is assigned a quantity of ordered menu items to prepare that may be less than a predetermined threshold quantity.

As another example, the method can include ordering, by the computing system and with the purveyor, understocked ingredients for delivery to the kitchen prior to preparation of the ordered menu item. The method can also include ordering, by the computing system and with the purveyor, understocked ingredients for delivery to the kitchen within 1 to 2 days of receiving the orders. Sometimes, the method can also include receiving, at the computing system and from the user devices of the one or more chefs, at least one of preparing instructions, a recipe, and time needed to prepare the menu item. The method may also include generating, by the computing system, a label for the ordered menu item to be placed on the ordered menu item once it is prepared by the kitchen.

In some implementations, determining, by the computing system, if an ingredient of an ordered menu item is understocked in the kitchen to which an ordered menu item is assigned can include: receiving, from the user device in the kitchen, a list of SKUs and quantities of each SKU present in the kitchen, and determining at least one of (i) the list of SKUs present in the kitchen does not include the ingredient of the ordered menu item and (ii) the quantity of the SKU present in the kitchen that corresponds to the ingredient of the ordered menu item is less than a predetermined quantity of the ingredient needed to prepare the ordered menu item. Sometimes, grouping, by the computing system, the ordered menu items into cohorts of ordered menu items can include determining, for each of the cohorts of ordered menu items, an order to pack the ordered menu items into a delivery unit. The delivery unit can maintain the cohort of ordered menu items at a predetermined temperature for delivery routes that are up to 90 minutes long. Sometimes, grouping, by the computing system, the ordered menu items into cohorts of ordered menu items can also be based on delivery times for each of the ordered menu items being within a predetermined period of time relative to each other. In some implementations, assigning, by the computing system, the cohorts of ordered menu items to one or more delivery workers can be based on, for each of the one or more delivery workers, at least one of delivery performance, proximity of the delivery worker to the kitchen, and work schedule of the delivery worker.

One or more embodiments described herein can include a computerized system for preparation and delivery of ordered menu items, the system having one or more processors and one or more computer-readable devices including instructions that, when executed by the one or more processors, cause the computerized system to perform operations that may include: receiving, from user devices, menu item content for a menu item to be presented to users, at user devices, and identification of ingredients needed to prepare the menu item, providing menu items to user devices for display to users, receiving, from user devices of users, orders by a specified period of time prior to delivery of the orders, the orders including selection of one or more of the menu items presented to the users at the user devices, processing each order to generate a delivery address and an ordered menu item, assigning a kitchen to prepare an ordered menu item based at least in part on proximity of the kitchen to the generated delivery address of the ordered menu item, determining if an ingredient of an ordered menu item is understocked in the kitchen to which an ordered menu item is assigned, ordering, with a purveyor, understocked ingredients, forwarding instructions to prepare an ordered menu item to a user device in the kitchen where the ordered menu item is to be prepared, grouping the ordered menu items into cohorts of ordered menu items based on proximity of the generated addresses relative to each other, assigning the cohorts of ordered menu items to one or more delivery workers, and providing delivery routes for each of the cohorts of the ordered menu items to be delivered to user devices of the one or more delivery workers. The delivery routes can include driving instructions to deliver the orders. The operations can be performed within seconds for more than one kitchen.

In some implementations, the system can optionally include one or more of the abovementioned features.

The devices, system, and techniques described herein may provide one or more of the following advantages. For example, the disclosed techniques can be scaled to provide for scheduling and delivering orders for any number of kitchens, any quantities of ingredients, any quantity of workers available to work in the kitchens, and any quantity of delivery workers. For example, the disclosed techniques can be quickly and simultaneously performed, in some implementations, for many kitchens (e.g., at least 2 kitchens, 3 kitchens, 10 kitchens, 50 kitchens, 100 kitchens, etc.), many quantities and types of ingredients (e.g., at least 5 ingredients, 20 ingredients, 50 ingredients, 100 ingredients, etc.), many workers (e.g., at least 3 workers per kitchen, 5 workers per kitchen, 10 workers per kitchen, 20 workers per kitchen, etc.), and/or many delivery workers (e.g., at least 3 delivery workers, 5 delivery workers, 10 delivery workers 20 delivery workers, etc.). The disclosed techniques can therefore be used to make decisions quickly, efficiently, and accurately without being compromised by availability of resources or computing power. Decisions, e.g., processes described in this specification, can be made within seconds (e.g., within 240 seconds, within 120 seconds, within 60 seconds, within 30 seconds, within 10 seconds, within 5 seconds, or within 2 seconds) for many orders and many kitchens at a time such that kitchens can be quickly prepared to meet demand from customer orders. The disclosed techniques can also provide for processing large volumes of orders simultaneously and/or in little or minimal time, thereby providing for efficiency in order processing and fulfillment. Data can be synthesized from various sources, systems, and devices in order to quickly process orders and ensure timely preparation and delivery of the orders.

Additionally, the disclosed techniques provide for aggregation of mass amounts of data from a variety of sources to accurately and efficiently determine order preparation and delivery directives.

As another example, orders can be made and prepared in a calendar-based model, which can save relevant users, such as end users, kitchens, and purveyors, in time, costs, and efficiency. An on-demand model for ordering meals, on the other hand, can cost more to relevant users, due to waste that may result from unpredictable fluctuations in supply and demand. Changes in weather can cause on-demand orders to be delayed in preparation and/or delivery. Shortages of staff in a kitchen or drivers can delay preparation and/or delivery of the on-demand orders. Shortages in SKUs can also delay or sometimes prevent preparation and/or delivery of the on-demand orders. The calendar-based model for ordering meals can therefore be an automated and efficient tool for kitchens to plan how and when orders are to be prepared and/or delivered. As a result of the disclosed techniques, kitchens can efficiently prepare and delivery meal orders (e.g., menu items) with minimal to no waste in time, resources, and other costs.

The disclosed techniques also provide for kitchens to offer expansive menus and ordering options to end users. Typical kitchens, such as those of restaurants, may have a genre-limited menu from which end users can place orders. Each kitchen therefore may use the same SKUs to produce a limited set of meals. The disclosed technology, on the other hand, allows for kitchens to offer more expansive menus by automatically determining what SKUs are needed in a kitchen to prepare a list of orders for a particular delivery window, even if the kitchen does not have all the SKUs for those orders at a present time. The disclosed techniques can therefore be used to organize the kitchen, regardless of what menu the meals are ordered from, before the meals are to be prepared for the particular delivery window.

Moreover, delivery workers can efficiently deliver multiple meals along a single route, thereby making it easier for the delivery workers to fulfill their jobs and improve end user experiences with on-time delivery. Typically, a delivery worker may pick up one meal from one location and deliver the meal to another location before picking up another meal etc. The disclosed technology, on the other hand, provides for one or more delivery workers to arrive at one location, such as a ghost kitchen, pick up, and delivery a plurality of meals along a single route. The meals can be delivered quickly and on-time to end users. The delivery workers also may not have to drive to various different locations (e.g., restaurants or other kitchens) to pick up meals and then deliver those meals along different routes.

As yet another example, the disclosed techniques provide for a scalable calendar-based model that can be used by various kitchens, including those of restaurants and ghost kitchens. Ghost kitchens may use software designed for restaurant management, even though restaurants operate differently than ghost kitchens. The disclosed technology, thus, is agnostic and provides a software platform that can be scaled to and deployed by both ghost kitchens and restaurants to accomplish their respective goals in meal ordering, preparation, and delivery. Additionally, the disclosed techniques are scalable because they allow for a kitchen to efficiently prepare meals from menus that originate from various restaurants and/or culinary creatives. Which kitchen prepares which meals may no longer depend on which menus are associated with the kitchen. Rather, any kitchen can prepare any meal since the disclosed techniques provide for preparing a kitchen in advance of receiving a list of meal orders to prepare for a given delivery window.

As described above, the disclosed techniques provide numerous benefits in food delivery services. For example, calendar-based ordering means that before meals are made, (i) they can be paid for by the end users, (ii) purveyors can delivery the right SKUs needed for kitchens to fulfill a set of orders ahead of time, thereby reducing storage and waste, (iii) kitchen management can onboard contractors and other workers dynamically as needed, thereby reducing overhead costs, (iv) delivery workers can optimize revenues per mile by picking up many meals from one location and delivering the meals in a single route, and (v) culinary creatives can receive royalties for menus they design whenever those menus are purchased and offered by ghost kitchens (the culinary creatives may not have to make the meal(s) in their menu(s) to receive royalties).

Moreover, the disclosed techniques use less computer processing power by grouping orders into cohorts, processing financial transactions for the entire cohort simultaneously at one time period in a day as opposed to individually processing at different times throughout a given day, sending requests to purveyors for SKUs related to the cohorts as opposed to sending smaller/individual requests at different points throughout the given day, prepping, cooking, assembling, and pushing meals by cohort, rather than in smaller/individual sets at different points throughout the given day, and delivering meals on a route as a cohort. Therefore, the disclosed techniques enable kitchens, such as ghost kitchens, to bundle orders for processing as a cohort as opposed to as individual requests, thereby utilizing less computer processing power.

Similarly, the disclosed techniques provide for using less human processing power and great efficiency in decision-making. Determinations in processing orders may occur faster since a human worker can require more time to manually plan driving routes, check inventory, determine how many workers are needed and for how longer to prepare the orders, and determine an optimal use of the kitchen equipment. After all, the disclosed techniques provide for computing systems to determine and communicate directives through a chain of command to line cooks and other human workers in a kitchen. Human workers may not make such determinations as quickly and reliably in how to lead workers to make, and prepare for route-based delivery, an expansive array of orders whose transactions are run simultaneously through the disclosed system as opposed to a linear on-demand technique. Moreover, the disclosed techniques provide for lower cost operations since ghost kitchens can utilize dynamic operations—inviting only a necessary amount of workers to process a pre-determined cohort of orders for delivery. The disclosed techniques also provide for lower costs to delivery companies since a delivery worker can now pick up and deliver over 50 meals from one location for delivery using the disclosed temperature-controlled delivery bags/units.

The details of one or more implementations are set forth in the accompanying drawings and the description below. Other features and advantages will be apparent from the description and drawings, and from the claims.

BRIEF DESCRIPTION OF THE DRAWINGS

FIGS. 10A-H are example graphical user interfaces (GUIs) that can be presented to end users at their respective user devices for planning and ordering meals.

FIGS. 11A-G are example GUIs that can be presented to delivery workers at their respective devices for reviewing and performing scheduled delivery tasks.

FIGS. 12A-B are example GUIs that can be presented to kitchen staff at their respective devices for reviewing and performing scheduled meal preparation tasks.

FIGS. 13A-G are example GUIs that can be presented to relevant users at their respective devices for generating and updating menu items at a kitchen.

Like reference symbols in the various drawings indicate like elements.

DETAILED DESCRIPTION OF ILLUSTRATIVE EMBODIMENTS

This document generally relates to a system for an autonomous POS-triggered logistics engine that can provide efficient, calendar-based meal order (e.g., menu item), prep, and delivery to end users. The disclosed techniques can be deployed across various kitchens, such as ghost kitchens, and/or restaurants. Kitchens can prepare meals that are ordered from a variety of menus. The disclosed techniques can provide for selecting which kitchen or kitchens to prepare a list of meal orders based on a variety of factors intended to improve efficiency in preparing and delivering the orders. The factors can include, for example, selecting a kitchen based on SKUs available at that kitchen, proximity of the kitchen to delivery locations of the meal orders in the list, staffing and equipment capabilities of the kitchen, and/or busyness of the kitchen.

As an illustrative example, the disclosed system can include an ordering engine, an inventory check engine, a cook directive engine, and a delivery scheduling engine. The ordering engine can receive orders from end users by a deadline or specified amount of time before delivery. The inventory check engine can determine what SKUs needed for preparing the orders are available at various kitchens and what SKUs may be needed at one or more of the kitchens. The cook directive engine can select a kitchen to prepare a list of orders, determine capabilities of the kitchen to prepare the orders in the list, determine staff to call in to prepare the orders, and generate instructions for preparing the orders. The delivery scheduling engine can determine an order for delivering the prepared orders, a route or routes for delivering the prepared orders, delivery workers to call in to deliver the prepared orders, and packing instructions based on the order for delivering the prepared orders. The disclosed system can also include one or more additional or fewer components configured to perform the techniques described throughout this disclosure.

Figure 1:
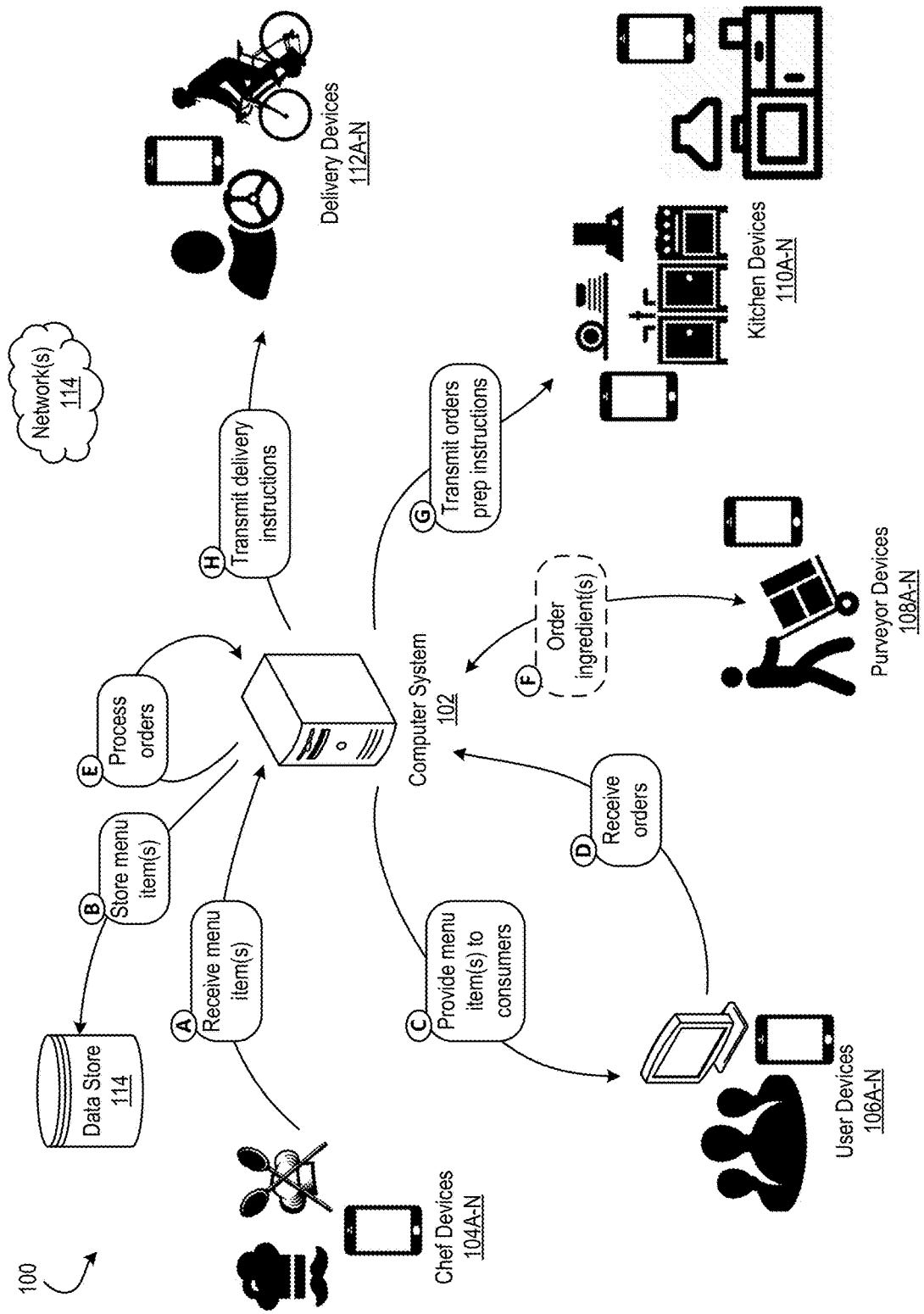
FIG. 1 is a conceptual diagram of an autonomous POS-triggered logistics system for processing and fulfilling meal orders.

Referring to the figures, FIG. 1 is a conceptual diagram of an autonomous POS-triggered logistics system 100 for processing and fulfilling meal orders. In the system 100, various components can communicate (e.g., wired and/or wireless) with each other via network(s) 114. For example, a computer system 102, chef devices 104A-N, user devices 106A-N, purveyor devices 108A-N, kitchen devices 110A-N, and/or delivery devices 112A-N can communicate with each other via the network(s) 114.

The computer system 102 can be configured to process and fulfill menu orders. The computer system 102 can be a cloud-based computing system and/or service. The computer system 102 can also be another type of computing system, computing device, network of devices, and/or network of systems.

The chef devices 104A-N can be used by chefs and other culinary creatives who can create recipes and or menus of meals that can be ordered by end users. The chef devices 104A-N can deploy a mobile application, application, or other software that provides communication/interaction between the chefs and other culinary creatives and the computer system 102. For example, using the application, a chef can upload and/or modify a menu and/or individual recipes. The chef can also use the application to monitor and receive payment of royalties for any menus and/or recipes that are prepared. The chef devices 104A-N can be any type of computing device, including but not limited to mobile devices, mobile phones, smartphones, laptops, tablets, and/or computers.

The user devices 106A-N can be used by end users, such as consumers, who can place orders for meals. The end users can also pay for the orders before they are prepared using the user devices 106A-N. The user devices 106A-N can deploy a mobile application, application, or other software that provides communication/interaction between the end users and the computer system 102. For example, using the application, the end users can view different menus, select meals to order from the menus, select when the meals should be delivered (e.g., days, weeks, and even months in advance), and pay for ordered meals. The user devices 106A-N can be any type of computing device, including but not limited to mobile devices, mobile phones, smartphones, laptops, tablets, and/or computers.

The purveyor devices 108A-N can be used by purveyors, or suppliers of items needed to prepare any of the meals. The purveyor devices 108A-N can deploy a mobile application, application, or other software that provides communication/interaction between the purveyors, the computer system 102, and/or one or more other components, such as the kitchen devices 110A-N. For example, using the application, a purveyor can determine when particular SKUs need to be delivered to a particular kitchen and what quantities of the particular SKUs are needed for the delivery. The purveyor devices 108A-N can be any type of computing device, including but not limited to mobile devices, mobile phones, smartphones, laptops, tablets, and/or computers.

The kitchen devices 110A-N can be used by kitchen management. The kitchen devices 110A-N can deploy a mobile application, application, or other software that provides communication/interaction between the end users and the computer system 102. For example, using the application, kitchen management can track/determine current SKU inventory, view a list or multiple lists of orders to prepare for particular delivery windows, determine kitchen equipment capabilities, determine staffing for particular delivery windows, review recipes for meal orders in the list or multiple lists of orders, and review/determine/implement orders by which the list or multiple list of orders should be prepared. The kitchen devices 110A-N can be any type of computing device, including but not limited to mobile devices, mobile phones, smartphones, laptops, tablets, and/or computers.

The delivery devices 112A-N can be used by delivery workers, such as drivers and/or bicyclists. The delivery devices 112A-N can deploy a mobile application, application, or other software that provides communication/interaction between the delivery workers and the computer system 102. For example, using the application, a delivery worker can view a list of orders that they are scheduled to deliver, view a route or routes for delivering the orders in the list, and/or review/receive payment for completing a delivery route or routes. The delivery devices 112A-N can be any type of computing device, including but not limited to mobile devices, mobile phones, smartphones, laptops, tablets, and/or computers.

Still referring to FIG. 1, the computer system 102 can receive menu items from the chef devices 104A-N (step A). The menu items can include at least one individual recipe for a meal that can be prepared by any kitchen. Sometimes, one of the chef devices 104A-N may provide only one menu item. Sometimes, one of the chef devices 104A-N may provide multiple menu items, such as a full menu of recipes for multiple meals that can be prepared by any kitchen. The menu items received in step A can each include instructions for preparing the respective menu item and a list of SKUs for ingredients needed to prepare the respective menu item. In some implementations, the menu items received in step A can each include information identifying the chef or other user who provided the menu item via one of the chef devices 104A-N. This identifying information can be used by the computer system 102 to determine royalty payout(s) whenever the particular chef's menu item is ordered and prepared by a kitchen.

The computer system 102 can store the menu item(s) in a data store 114 in step B. The data store 114 can be a cloud-based service and/or system. In some implementations, the data store 114 can be part of the computer system 102. In some implementations, the data store 114 can be separate from the computer system 102.

Next, the computer system 102 can provide the menu item(s) to consumers (e.g., end users) at the user devices 106A-N (step C). As described throughout this disclosure, the end users can view menus of items, or meals, that can be ordered via a mobile application, application, or other software. Whenever the computer system 102 receives new menu items from the chef devices 104A-N (step A), the computer system 102 can automatically update what menu items are presented to the end user at the user devices 106A-N to include the new menu items (step C). The end users can therefore select what menu item or items they wish to order at their user devices 106A-N. The end users can also select when they would like the menu item(s) delivered. As described herein, the system 100 provides a calendar-based approach to ordering meals. Therefore, the end users can schedule out meal deliveries days, weeks, and even months in advance. When placing orders at the user devices 106A-N, the users can also provide payment information to pay for the orders.

The computer system 102 can receive the orders from the user devices 106A-N (step D). The computer system 102 can receive the orders in real-time, as they are completed/submitted by the user devices 106A-N. The computer system 102 can also receive the orders in near real-time and/or at one or more predetermined periods of time. For example, the computer system 102 can receive all orders at the end of a day, every 24 hours, every 12 hours, every 6 hours, every 2 hours, etc. In some implementations, an end user can place an order that includes menu items from different menus. The computer system 102 can still treat this as a single order, thereby charging the end user the cost of one delivery fee. After all, all the menu items that are ordered can be provided in a single order and delivered by a single delivery worker.

The computer system 102 can process the orders in step E. The computer system 102 can process the orders in a batch. The computer system 102 can also process orders as they are received from the user devices 106A-N. The orders can also be processed for a particular delivery window. The delivery window can be any amount of time before delivery is scheduled. In some example implementations, the delivery window can include an amount of time from 6 PM a day before delivery is scheduled to 10:30 AM a day of delivery. The delivery window can be longer or shorter.

When processing the orders, the computer system 102 can charge the users for their orders at a same time/during a same time period. After all, each user can load their meals into a calendar and thus lock the meals into particular delivery windows. All meals that are locked in for a particular given window can then be processed simultaneously in step E. Further, batching transactions ahead of a cooking/preparation window can enable dynamic operations and thus cost savings. A kitchen may, for example, have only an amount of human workers and SKUs needed to make a batch of meals in the kitchen at any given time, and coordinate a driver(s) to deliver meals in a route optimizing revenues/mile via 1-to-many delivery as opposed to a 1-to-1 model.

As described further below, processing the orders can include parsing the order to identify information about the order, such as delivery information, customer/end user information, and a particular menu item or items (e.g., meals) to prepare. Processing the orders can also include determining: (i) which kitchen(s) should be chosen for preparing a group of orders, (ii) which orders are being prepared for which delivery time windows, (iii) what SKUs are needed to prepare the orders, (iv) what SKUs may need to be ordered, (v) an order for preparing and packing the group of orders, (vi) an order for delivering the group of orders, (vii) which kitchen staff to call in, and/or (viii) which delivery workers to call in and assign which groups of orders and/or routes for delivery.

Once the orders are processed in step E, the computer system 102 can optionally transmit orders for ingredients, or SKUs, to the purveyor devices 108A-N (step F). For example, the computer system 102 can determine in step E that a particular kitchen does not have one or more SKUs (or sufficient quantity of the SKUs) needed to prepare all the menu items in the group of orders for a given delivery window. The computer system 102 can make this determination based on inventory information that is received from the respective kitchen devices 110A-N. The inventory information can be received at predetermined time intervals (e.g., once a day, every couple hours, etc.). The inventory information can also be received when the computer system 102 polls the respective kitchen devices 110A-N for the information.

In step F, the computer system 102 can automatically send a request to the purveyor devices 108A-N to deliver a particular quantity of a particular SKU or SKUs to the kitchen having the low inventory before the given delivery window. Therefore, the quantity of the SKU or SKUs can be delivered in time for the kitchen to prepare the group of orders for the given delivery window.

As a result of automatically performing step F, kitchen management may not have to review their inventory and communicate with purveyors to replenish low stock SKUs. This can save on cost and storage space, since the computer system 102 can instead determine when the kitchen needs only SKUs for preparing the group of orders. The kitchen may not have to store a particular amount and type of SKUs that can potentially go to waste if they are not used for preparing various menu items. Moreover, the kitchen management may not have to keep up to date about when and what SKUs are needed to prepare the group of orders for the given delivery window.

The computer system 102 can also transmit order preparation instructions to the kitchen devices 110A-N in step G. For example, the computer system can transmit instructions indicating an order to prepare the mean items in the group of orders for the given delivery window. The instructions can indicate how many and/or which kitchen staff should be called in to prepare the group of orders for the given delivery window. The instructions can include recipes/steps for preparing each of the menu items in the group of orders.

The instructions can also indicate an order for packaging the menu items once they are prepared. The packaging order may be based on an order in which the menu items are to be delivered to end consumers. As an illustrative example, a menu item that is to be delivered first along a delivery route can be packaged last so that the menu item is positioned on top of the other menu items in a delivery bag. Therefore, the delivery worker can easily and quickly grab the menu item and deliver it first. The menu items can be packaged and put in the delivery bag in an order from last delivery (at a bottom of the delivery bag) to first delivery (at a top of the delivery bag), thereby making it easier and more efficient for the delivery worker to complete deliveries along the delivery route.

The computer system 102 can also transmit delivery instructions to the delivery devices 112A-N (step H). The delivery instructions can indicate what route or routes a particular delivery worker will take, including instructions and an order for delivering each of the menu items that the delivery worker is assigned. The delivery instructions can also indicate a time and/or day at which the delivery worker should pick up the assigned orders from the kitchen.

Figure 2:
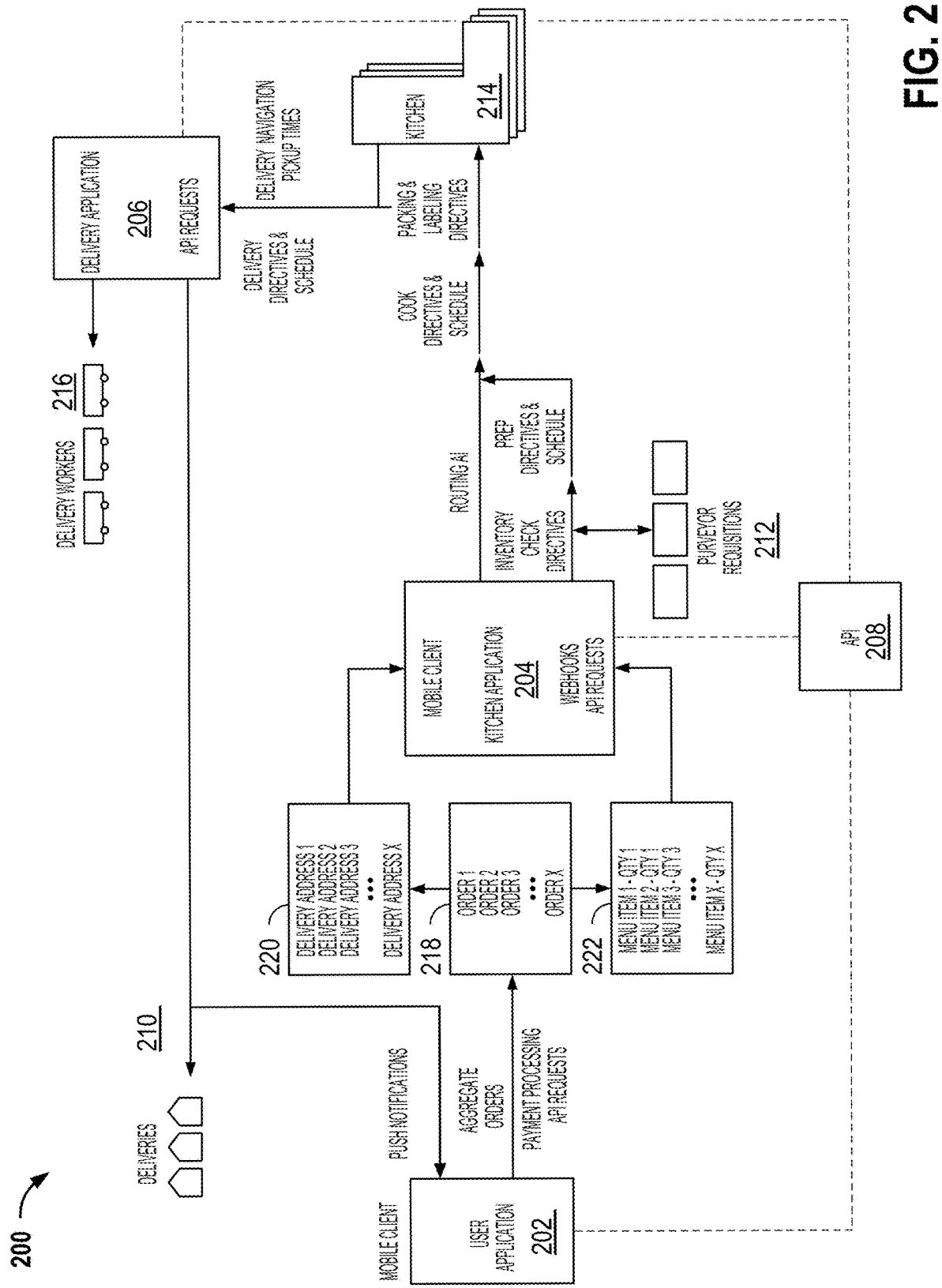
FIG. 2 is another conceptual diagram of the disclosed system for processing and fulfilling meal orders.

FIG. 2 is another conceptual diagram of the disclosed system 100 for processing and fulfilling meal orders. An API server 208 can provide two-way communication between various components described herein, including user interfaces, platforms, applications, and other end user types of services presented at computing devices (e.g., the chef devices 104A-N, the user devices 106A-N, the purveyor devices 108A-N, the kitchen devices 110A-N, and/or the delivery devices 112A-N).

End users can access a user application 202 presented at the user devices 106A-N to browse menus and/or menu items, select menu items to be ordered, select delivery windows for the orders, and pay for the orders. The end users may also receive notifications about the processes of preparing and delivering their orders via the user application 202. The end users may also provide feedback about the processes via the user application 202. The user devices 106A-N, as described in FIG. 1, can be a mobile device that hosts/displays the user application 202 to the end users. The user application 202 can include graphical user interfaces (GUIs) that are different than GUIs presented in other applications to other user types described throughout this disclosure.

As shown in FIG. 2, once the end users place orders using the user application 202, the orders can be aggregated by a certain time. The certain time can be an amount of time before a next delivery window. As an illustrative example, the orders can be aggregated at 6 PM the night before the next delivery window, which can be LOAM the next day. Aggregating the orders can include processing payments from the end users. API requests can also be made in order to receive information from the user devices 106A-N, such as payment information and order information. API requests can also be made to retrieve information, from a data store, that is associated with the processed orders. This information can be used by kitchens 214 to prepare the orders (e.g., SKUs or ingredients needed to prepare the orders, preparation instructions, etc.).

Aggregating the orders can include creating datasets 218, 220, and 222. Dataset 218 can be a list of processed orders (e.g., orders that have been paid for, orders that are to be delivered during the next delivery window). Each of the processed orders in the dataset 218 can include parsed information, such as delivery information (e.g., delivery address) and instructions for preparing the order (e.g., SKUs/ingredients needed, cooking instructions/directions).

The datasets 220 and 222 can be derived from the dataset 218. For example, the dataset 220 can include just the delivery information for each of the processed orders. In some implementations, the delivery information can be sorted in the dataset 220 based on a delivery route. For example, the delivery information for an order that is to be delivered first along the delivery route can be listed at the top of the dataset 220 while the delivery information for an order that is to be delivered last along the delivery route can be listed at the bottom of the dataset 220. Moreover, each of the delivery information in the dataset 220 can include a unique identifier that corresponds to a processed order from the dataset 218, which can create and maintain relationships across the datasets 218, 220, and 222.

The dataset 222 can include the preparation instructions for each of the processed orders. For example, the dataset 222 can include a list of all menu items to be prepared for the processed orders. The dataset 222 can include quantities for each of the menu items, especially since multiple orders may be made for the same menu item. The dataset 222 can also include SKUs/ingredients needed for each quantity of each menu item to be prepared for the next delivery window. The dataset 222 can also include cooking instructions associated with each of the menu items to be prepared. Moreover, each of the menu items can include unique identifiers that correspond to the processed orders from the dataset 218 that request the menu item.

The datasets 218, 220, and 222 can be used by a computer system (such as the computer system 102 described herein) to determine efficient logistics for preparing, cooking, packaging, and delivering the processed orders during the next delivery window. These logistics, along with the datasets 220 and 222 can be pushed to a kitchen application 204.

The kitchen application 204 can be presented at the kitchen devices 110A-N described herein. Kitchen staff can use the kitchen application 204 to know precisely what menu items to prepare, cook, package, and push to delivery workers and at what time(s) to complete these actions. Kitchen management can also use the kitchen application 204 as an inventory tool to manage SKUs/ingredients and efficiently order SKUs that are needed to prepare ordered menu items.

As mentioned throughout, the kitchen application 204 can provide inventory check directives and automated SKU ordering with a purveyor application 212. For example, kitchen management can update inventory information, which can be used by the computer system 102 to determine whether additional SKUs are needed to complete the orders for the next delivery window. The inventory information can be transmitted to the purveyor application 212 and/or requests for the additional SKUs. Purveyors can access the purveyor application 212 at the purveyor devices 108A-N to send SKUs/ingredients that are needed for a particular kitchen 214 at a particular time, based on a delta between SKUs needed to fulfill a set of orders and SKUs on hand at the particular kitchen 214. Once requests for additional SKUs are made and/or fulfilled using the purveyor application 212, the kitchen application 204 can provide preparation directives and schedule to the kitchens 214. The kitchen application 204 can also provide cooking directives and schedules as well as packaging and labeling directives to kitchens 214. In some implementations, as soon as transactions are finalized (e.g., users are charged for their meals for a given delivery window), the cooking directives and schedules can be determined and transmitted to the kitchens 214. Such determinations and transmissions can be made in real time and/or near real time, e.g., in less than a minute or even in less than 10 seconds. In some implementations, such as when a user's credit card is declined, the determinations and transmissions can be made once a window of resolution passes in which the user can provide another form of payment.

Any of these directives and/or schedules can be determined by the computer system 102 and based at least in part on determining efficient delivery routes, availability of equipment and/or staff at the kitchens 214, availability of SKUs needed to prepare the menu items in the dataset 222 at the kitchens 214, and/or availability of delivery workers. Moreover, the computer system 102 can determine to split up the orders in the dataset 218 into multiple groups of orders. The groups of orders can be determined based at least in part on efficient delivery routes (e.g., orders to be delivered in a same geographic region/area can be grouped together). Each of the groups of orders can then be assigned to different kitchens 214 (e.g., a kitchen 214 having the most available equipment and/or staff can be assigned a group having the most orders to prepare, a kitchen 214 that is closest to a geographic region/area where the orders in the group will be delivered can be assigned to prepare that group of orders, etc.).

Kitchen staff in the kitchens 214 can follow the preparation, cooking, packaging, and labeling directives and schedules presented via the kitchen application 204 to prepare all the orders (e.g., menu items for the orders) that have been assigned to the respective kitchens 214 for the given delivery window.

Delivery directives and schedules determined by the computer system 102 can also be transmitted to a delivery application 206. The delivery application 206 can be presented at delivery devices 112A-N. The delivery application 206 can present GUIs with navigation instructions, maps, delivery routes, delivery instructions (e.g., as requested by a particular end user), and/or pickup times. Therefore, the delivery application 206 can be used by drivers and bicyclists 216 to know how to fulfill their delivery routes, which orders to deliver to which end users, an order for delivering to the end users, and times at which to deliver to the end users.

Figure 3A:
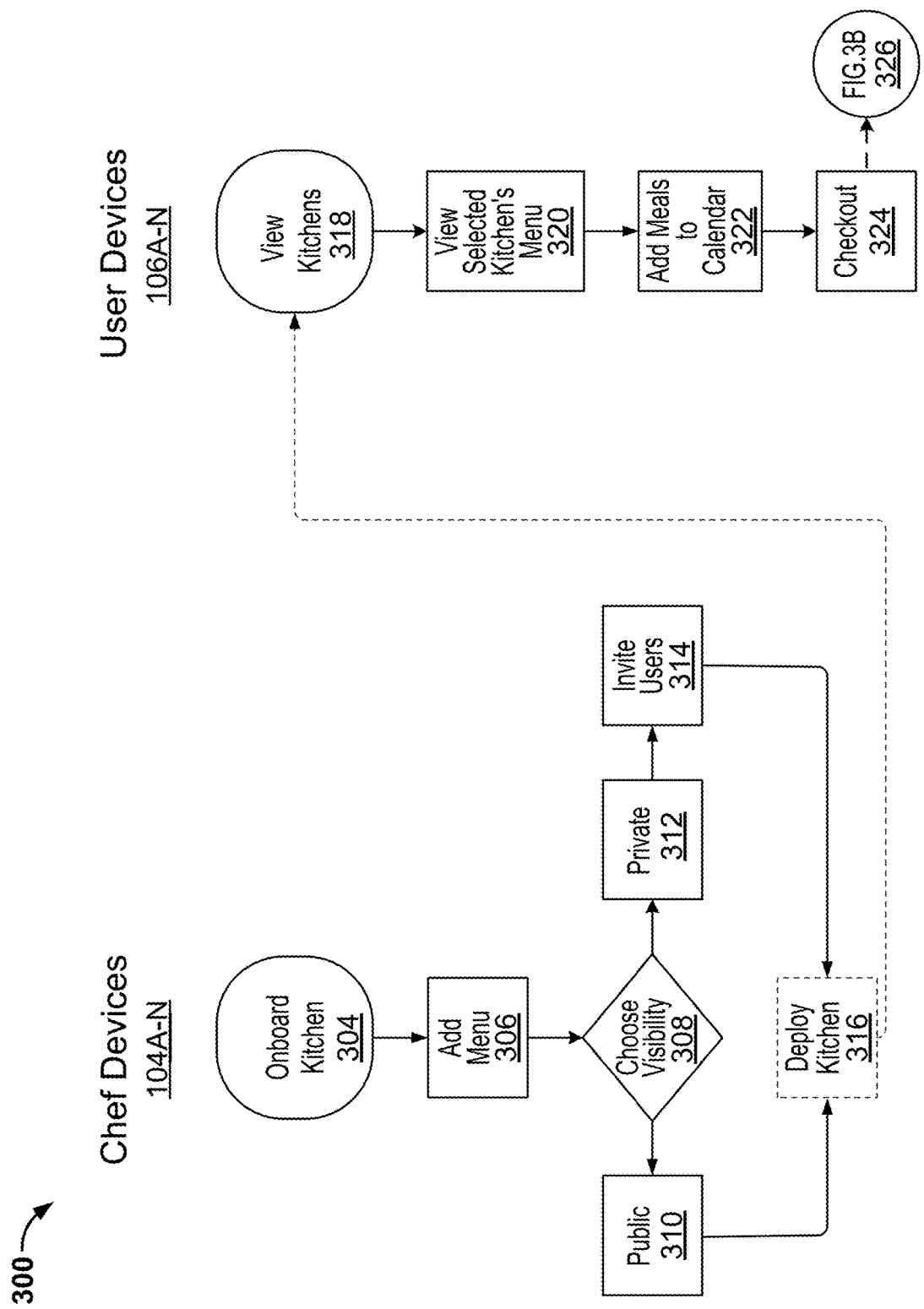
FIGS. 3A-B is a flowchart of a process for processing meal orders.
Figure 3B:
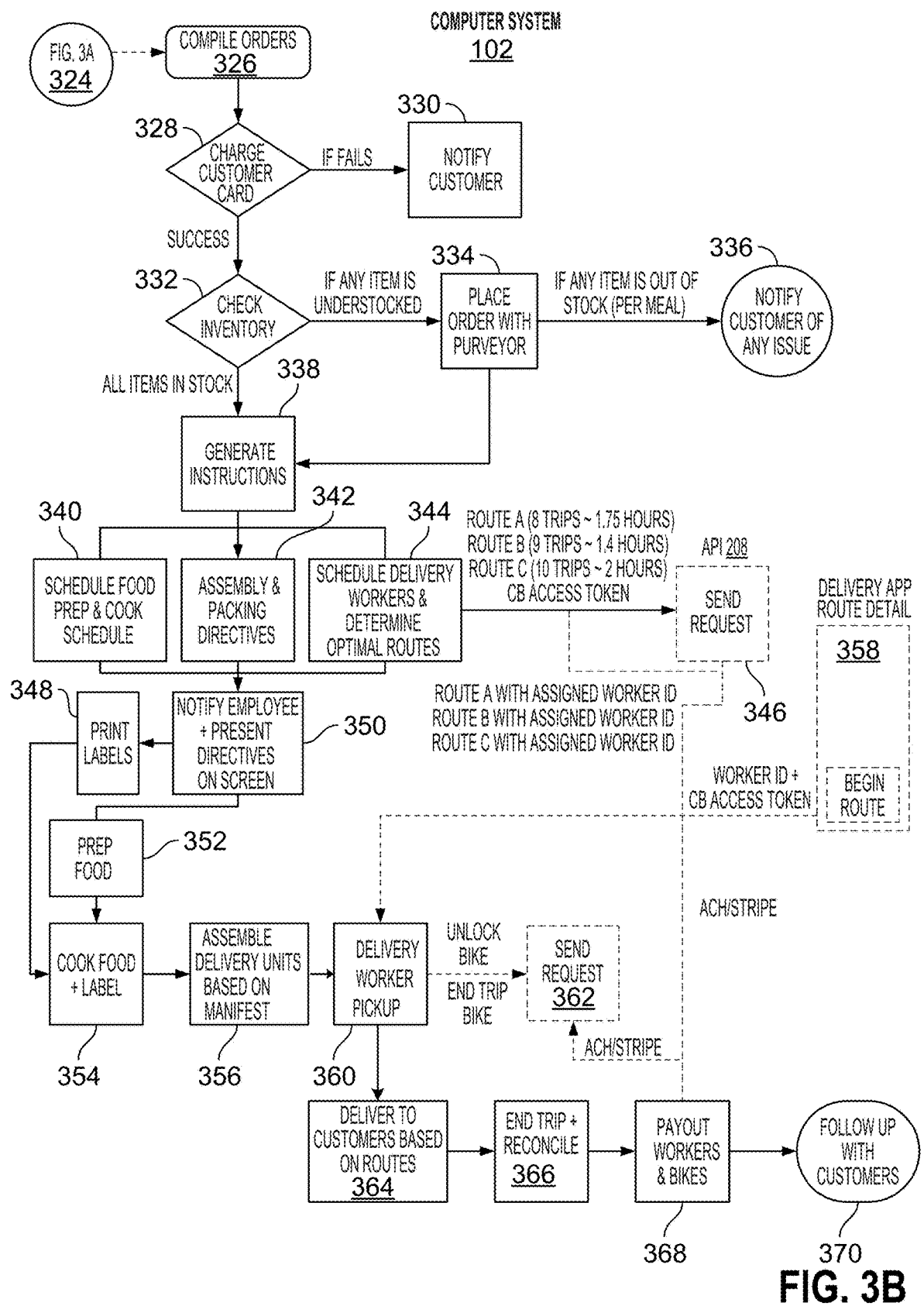

FIGS. 3A-B is a flowchart of a process 300 for processing meal orders. Blocks of the process 300 can be performed by and/or at the chef devices 104A-N, the user devices 106A-N, and/or the computer system 102. For example, one or more blocks of the process 300 can be performed by the chef devices 104A-N via a chef application 302. One or more blocks of the process 300 can also be performed by the user devices 106A-N via the user application 202. One or more blocks of the process 300 can also be performed by the computer system 102 via the kitchen application 204 depicted and described in FIG. 2. Any blocks described in the process 300 can also be performed by one or more other computing systems, devices, computers, networks, cloud-based systems, and/or cloud-based services.

Referring to the process 300 in both FIGS. 3A-B, the chef devices 104A-N can onboard a kitchen in block 304. Onboarding the kitchen can be beneficial to connect chefs or other creative culinary users with kitchens (e.g., unused ghost kitchens) so that they can share their menus (e.g., menu items, recipes, etc.) with end users. Onboarding the kitchen can include kitchen workers (e.g., chefs or others) entering data/information for their menu. The data can include, as described throughout this disclosure, ingredients, ingredient unit quantities, tasks to be performed to prepare a meal, images of the meal and/or ingredients, and pricing information.

The chef devices 104A-N can add a menu in block 306. In some implementations, once a menu is added to a particular kitchen, the menu may not be added to another kitchen. A chef can use a mobile application presented at the chef devices 104A-N to add individual menu items and/or a menu of items to the onboarded kitchen. The chef can upload, for example, instructions (e.g., recipes) for preparing and cooking each of the menu items. The chef can also upload SKUs/ingredients and quantities of the SKUs/ingredients needed for each of the menu items. In some implementations, for each of the added menu items, the chef can also include a recommended price to charge the end users.

Once the menu is added, the chef can choose visibility of the menu (block 308). The chef can choose to make the menu public (block 310), which means the menu is visible to all end users at the user devices 106A-N. In other words, the menu can be presented for the kitchen in the user application 202 described in FIG. 2 (block 316). The chef can also choose to make the menu private (block 312). Once a menu is private, the menu can only be accessed by end users who are given access to the menu. Accordingly, the chef can invite end users to view the private menu in block 314. Once the end users are given access to the private menu, the menu can be displayed for the kitchen (block 316) in the user application 202.

The menu may be automatically updated whenever a chef adds to or updates the menu. In some implementations, if a menu is update, end users may only see the updated menu if they are ordering in a geography where the updated menu was made and can be delivered. In some implementations, an end user may only be able to view and order from the updated menu if a kitchen in the geographic location of the end user makes the updated menu and also delivers meals from the updated menu.

The end users can view various kitchen menus at the user devices 106A-N (block 318). The kitchen menus can be presented in the user application 202 described in FIG. 2. The end users can view the menus based on their role. In other words, if an end user has been granted access to a private menu, then the end user can view the private menu in block 318. However, if the end user has not been granted access to the private menu, then the end user can only view menus that are public. The end users can also verify their user accounts in the user application 202 to get access to kitchen menus that are valid within a network of the end user (e.g., within a geographic region of the end user). As a result, end users may only view kitchen menus for kitchens having a delivery radius that includes a location of the end users.

Each kitchen can have a different menu. Therefore, the end user can sort through menus based on kitchen. The end user can also sort through kitchens based on their respective menus. When the end user finds a menu they are interested in ordering from, the end user can select and view that kitchen's menu in block 320.

The end user can review the kitchen's menu and select meals (e.g., menu items) to add to a calendar in block 322. As described throughout this disclosure, the disclosed techniques provide a calendar-based model for ordering meals. Therefore, the end user can select meals that they would like delivered days, weeks, and sometimes months in advance. The user can add each of the selected meals to particular days on a calendar associated with an account of the user. The end user can be given a deadline to place orders for a next delivery window (e.g., the deadline can be 6 PM the night before the next delivery window, which can start at 10:30 AM). The computer system 102 can also provide the end user with incentives to order meals in advance. For example, the further back in time (e.g., the more in advance) that the end user places orders, the larger the discount the end user can receive on their orders.

In block 324, the end user can perform a checkout process. The end user can pay for the orders that have been added to the calendar in block 322. In some implementations, the end user can pay for all the orders that they added to their calendar at one time, even though the end user may not be charged until a predetermined period of time before a next delivery window. In some implementations, the end user may not be charged until a predetermined amount of time before kitchen operations begin (e.g., preparing and cooking the orders before delivery).

In block 326, the computer system 102 can compile orders that have been placed. Therefore, the orders can be processed in a batch. The computer system 102 can compile the orders at a predetermined time or within an amount of time before a next delivery window. For example, the orders can be compiled every day at 6 PM. The orders can be compiled at one or more other time intervals and/or predetermined times. The orders can be compiled into a dataset, such as the dataset 218 described in FIG. 2.

The computer system 102 can charge end users' payment methods (e.g., credit cards, debit cards, online payment forms, etc.) in block 328. For example, the computer system 102 may only charge end users for orders that are to be delivered in the next delivery window. In some implementations, the computer system 102 may charge end users for all the orders that were placed in blocks 322-324, regardless of delivery windows in which the orders are to be delivered. If the computer system 102 is unable to charge an end user's payment method, then the computer system 102 can notify the end user in block 330. For example, a notification can be presented in the user application 202 at the respective end user device 106A-N. The end user can respond to the notification by providing another form of payment (e.g., block 324). The end user can also respond to the notification by canceling the order(s) that was placed.

If, on the other hand, the computer system 102 was able to charge an end user's payment method, the computer system can proceed to block 332.

In block 332, the computer system 102 can check inventory at the kitchen to determine whether the kitchen has sufficient quantities of SKUs (e.g., ingredients) needed to prepare each of the ordered meals. As described throughout this disclosure, the computer system 102 can poll the kitchen devices 110A-N for inventory information. Kitchen managers can run inventory checks every day or at predetermined times. When they perform inventory checks, they can input information such as SKUs, quantity of each SKU, and/or weight of each SKU into the kitchen application 204 at the kitchen devices 110A-N. This inventory information can be received at predetermined times into a backend of the computer system 102 and used in the block 332.

The computer system 102 can compare the received inventory information against information associated with each of the ordered meals. The computer system 102 can determine a delta between the quantity of SKUs available at the kitchen and the quantity of SKUs needed to prepare each of the ordered meals. Similarly, the computer system 102 can determine an absolute value of a difference in weight (e.g., in grams) of any given SKU available in the kitchen with the weight of the SKU required in the recipe for an ordered meal. Based on the delta, or the absolute value of the difference in weight, if SKUs are understocked at the kitchen for any of the ordered meals, the computer system 102 can place an order for the necessary quantity of SKUs with a purveyor (block 334). The order can be transmitted to the purveyor devices 108A-N described in FIG. 1. For any given delivery window, the purveyor may organize an automated delivery of only a quantity of the SKU(s) (e.g., a weight in grams of each SKU) needed to prepare the ordered meals. The kitchen, as a result, may not have to communicate with the purveyor to ensure the kitchen has the sufficient quantity of SKU(s) for preparing the ordered meals, thereby making an overall food preparation and delivery process automated and efficient. Once the order is placed in block 334, the computer system 102 can proceed to block 338, described below.

Moreover, if the computer system 102 determines that any of the ordered meals (e.g., menu items) are out of stock, then the computer system 102 can transmit a notification to the respective end user (block 336). The end user can receive, for example, an email, text message, SMS text message, and/or push notification. Such a notification can be received a predetermined amount of time before a next delivery window. For example, the notification can be received once all daily orders are processed for the next delivery window and/or the next day (e.g., at 6 PM the day before delivery). The notification may include a link that directs the end user to a webpage or mobile application to manage their order. The end user can, for example, cancel or reschedule an order by selecting the link.

Referring back to block 332, if the computer system 102 determines that the kitchen has all the necessary quantities of SKUs to prepare the ordered meals, the computer system 102 can generate preparation and cooking instructions in block 338. More particularly, the computer system 102 can generate a schedule for food preparation and cooking (block 340), assembly and packing directives (block 342), schedules for delivery workers (block 344), and optimal delivery routes (block 344). The computer system 102 can perform blocks 340-344 a predetermined amount of time before a next delivery window. As an illustrative example, for orders being delivered a following day between 11 am and 1 pm, the blocks 344-344 can be performed between 6 PM and 6:15 PM the day before. One or more other predetermined amounts of time can be used for executing the blocks 340-344. For example, in some implementations, the predetermined amount of time can be closer to the next delivery window and/or preparation of the orders for the next delivery window.

The computer system 102 can determine each of these schedules and directives in one or more orders. For example, the computer system 102 can work backwards from delivery to food preparation. Thus, the computer system 102 can first determine optimal delivery routes (block 344), then schedules for delivery workers (block 344), assembly and packing directives (block 342), and finally preparation and cooking schedule(s) (block 340). Determining the schedules and directives in this order can be beneficial to identify a most efficient process that uses minimal resources (e.g., cost effective, minimum delivery time, minimum food preparation time, minimum packaging time, etc., all of which can be based on currently available resources in kitchens, such as number of staff, number of delivery workers, available equipment, inventory of SKUs/ingredients, etc.) to get ordered meals out to delivery addresses during a given delivery window.

As part of generating instructions, schedules, and directives in the blocks 338-344, the computer system 102 can group together ordered meals that can be delivered along a single route (e.g., the ordered meals are to be delivered to addresses, such as those in the dataset 220 in FIG. 2, that are proximate to each other and/or within a same geographic region). Therefore, the computer system 102 can establish routes based on calculating closest distances to and between each successive meal that needs to be delivered during the delivery window. One or more routes can be consolidated based on an overall travel time of the routes. The overall travel time of a single route (whether it is a single route or an aggregation/consolidation of routes) may not exceed 120 minutes, in some implementations. The overall travel time may also vary depending on one or more factors, including but not limited to an amount of time that the ordered meals can remain in a climate-controlled temperature environment. One or more routes can also be consolidated based on a quantity of ordered meals per route. The quantity of ordered meals per route may not exceed 60 meals, in some implementations. One or more other quantities can be used and based on one or more factors, including but not limited to a mode of delivery used by a delivery worker (e.g., a delivery worker driving a car may be able to deliver more meals than a delivery worker using a bicycle). The computer system 102 can also identify which kitchen is closest to the route and/or has sufficient inventory to prepare all the ordered meals in a group (e.g., cohort, all the meals to be delivered along a single route).

Within the group, the computer system 102 can determine an order to package the ordered meals such that the ordered meals are arranged in a delivery box/package/unit in an order in which they will be delivered along the single route (e.g., a last delivered meal can be prepared and packaged first so that it can be placed at a bottom of the delivery box while a first delivered meal can be prepared last and packaged last so that it can be placed at the top of the delivery box). For each of the groups, the computer system 102 can also determine an order for cooking the ordered meals, an amount of time and other kitchen resources needed to prepare the ordered meals (e.g., batch preparation of SKUs for the ordered meals), and instructions about how to divide preparation and cooking directives for the ordered meals amongst the kitchen staff, which may also include particular times at which the ordered meals should be prepared, cooked, and/or packaged.

For example, the computer system 102 can determine how many kitchen staff should be brought into the kitchen to prepare the meals for the next delivery window. This determination can be presented in the kitchen application 204 at the kitchen devices 110A-N in advance of the next delivery window. Since the kitchen staff and other resources can be determined based on order demand for the given delivery window, the kitchen can dynamically prepare, in advance, for more efficient meal delivery and improved cost savings (e.g., financial costs, resources, etc.).

In some implementations, the computer system 102 can generate and provide suggestions about what particular kitchen staff should be brought in to prepare the meals for the next delivery window. For example, when an end user places an order, they may include instructions indicating that they like a meal prepared by a particular chef. The computer system 102 can then provide a notification to the kitchen devices 110A-N indicating that the particular chef should be working in the kitchen during the next delivery window in order to prepare the customer's meal. In yet some implementations, the computer system 102 can generate and provide suggestions about what kitchen staff should be brought in based on end user reviews. Similar to determining the appropriate kitchen staff to work in the kitchen, the computer system 102 can perform similar or same techniques to determine appropriate delivery workers to call in for the next delivery window. As described above, the delivery workers can be selected/suggested based on factors including but not limited to location of the delivery worker relative to the kitchen and/or delivery route(s), end user reviews of the delivery worker, familiarity of the delivery worker with particular end users, and/or experience of the delivery worker in operating a delivery vehicle and/or efficiently completing deliveries on time.

It can be realized that one or more other orders of operations can be performed in order to improve efficiency of food preparation and delivery during any given delivery window.

Once the instructions, schedules, and directives are generated in blocks 338-344, the computer system 102 can transmit notifications to the kitchen devices 110A-N of kitchen staff (block 350). The notifications can include the preparation and cooking instructions, schedules, and directives. This information can be presented in GUI displays at the kitchen devices 110A-N and used to guide the kitchen staff in efficiently preparing the ordered meals for the given delivery window. The kitchen staff can begin preparing the ordered meals in block 352, then proceed to block 354, described below. In some implementations, reports can also be automatically generated and transmitted to kitchen staff, such as administrators, which notify the kitchen staff when preparation is taking place and/or when preparation is behind schedule. The computer system 102 can also generate and transmit notifications to the end users informing them that their deliveries are running late. Moreover, information relating to time for preparing and delivering orders can be logged/stored for further analysis and improved decision making on the part of the computer system 102.

The computer system 102 can automatically print labels in block 348. The labels can include information such as the end user's name, contact information, address, and/or order details.

In block 354, the kitchen staff can cook the ordered meals and label the meals once they are cooked. As the kitchen staff complete these actions, they can provide user input via the kitchen devices 110A-N that indicate status of meal preparation (e.g., status of the actions they have completed). The computer system 102 can use this information to determine whether the kitchen is on track to prepare all the ordered meals and deliver them on time in the given delivery window. The computer system 102 can also use this information to generate notifications for the end users that can indicate whether there will be any type of delay in delivering their ordered meal(s).

Once the ordered meals are prepared, cooked, and labeled, they can be assembled into the delivery boxes in block 356. The kitchen staff can use the packing directive determined in block 342 to place the meals in a particular order in the delivery box or boxes. As described herein, the packing directive can include a packing order in which a last meal to be delivered is put first into the delivery box and a first meal to be delivered is put last into the delivery box (e.g., on top of all the other meals in the delivery box). That way, the delivery worker can efficiently and quickly pull a meal to be delivered out from the delivery box in the order in which it is to be delivered. The delivery worker may not have to shuffle through all the meals in the delivery box to identify the meal that is to be delivered next.

Moreover, the delivery box can be a refrigerated unit that maintains the meals placed therein in a climate-controlled temperature environment for up to a predetermined amount of time. For example, the predetermined amount of time can be 90 minutes. Since the meals can be maintained at the desired climate-controlled temperature for up to 90 minutes, the computer system 102 may determine delivery routes that, in total, may not exceed 90 minutes. Therefore, all the meals along that delivery route can maintain optimal temperature until the meals are delivered. One or more other predetermined amounts of time can be used, including but not limited to 60 minutes, 70 minutes, 80 minutes, 100 minutes, 110 minutes, 120 minutes, etc. The climate-controlled temperature can be a cooling temperature. The temperature can also be a warming temperature and/or a room temperature, in some implementations.

Once the delivery boxes are assembled with the ordered meals in block 356, the computer system 102 can proceed to block 360, discussed further below.

Referring back to blocks 338-344, once the instructions, schedules, and directives are generated (or at least the delivery directives), the computer system 102 can send a request via the API 208 to provide the delivery directives to the delivery devices 112A-N (block 346). The API 208 can therefore provide communication between the computer system 102 and delivery applications 206 presented at the delivery devices 112A-N. The delivery directives sent to the delivery devices 112A-N can indicate one or more routes to be taken by each respective delivery worker. Each route can include information such as a number of trips and approximately how long it would take to complete all the trips in the route. Each route can be assigned to a particular delivery worker ID. Each of the delivery devices 112A-N can be associated with a delivery worker ID. The API 208 can match the delivery worker ID with the appropriate delivery device 112A-N to transmit the route(s) that was determined for that delivery worker. The delivery worker can use a CB access token or other similar token to be able to seamlessly and securely access the delivery directives (e.g., in a mobile application) without having to login with a password.

Each delivery worker at their respective delivery device 112A-N can view their delivery directives and can begin a route in block 358. By beginning the route, the delivery worker's device 112A-N can transmit a notification to the computer system 102 indicating a driver pickup action (block 360). The notification can include the delivery worker's ID, which can be used by the computer system 102 to verify that the correct delivery worker is picking up the ordered meals and that the delivery worker associated with the ID is paid for completing the route of deliveries.

Once the driver pickup action is made in block 360, the delivery worker can optionally use their delivery device 112A-N to send a request to a vehicle rental company to use an e-bicycle or other transportation means to perform their deliveries (block 362). As an illustrative example, the delivery worker can send the request to BOAZ, a bicycle company that allows users to schedule and use BOAZ e-bikes for delivery services. Therefore, the delivery worker can perform their delivery routes on a bicycle if they do not have a car or otherwise do not drive. When the request is sent to the vehicle rental company in block 362, the request can be accepted and an e-bike can be unlocked and/or assigned to the requesting delivery worker. When the delivery worker completes their delivery route(s), they can return to the e-bike to a designated bike station and can transmit another request to the vehicle rental company indicating an end of the delivery worker's bike trip. In some implementations, the computer system 102 can send the request in block 362.

Once the delivery worker picks up the delivery box in block 360 (and optionally requests an e-bike in block 362), the delivery worker can deliver the ordered meals based on the delivery directives that were determined in block 344 (block 364). For example, delivery instructions, such as a map and/or navigation instructions (e.g., written, visual, and/or audio), can be displayed at the delivery devices 112A-N. The delivery worker can use the delivery instructions to deliver the ordered meals in a correct order along an optimal and efficient delivery route. The delivery worker's movement can be tracked with the delivery worker's permission so that an end user can receive real time updates about when their ordered meals are arriving. This tracking can also be used by the computer system 102 to determine whether the delivery is or will be on time. This tracking can be used for reporting purposes, as described above. This tracking can also be used for further analysis and improvements of decision making performed by the computer system 102 (e.g., adjusting an order in which orders are to be delivered, adjusting a selection of delivery workers who are more efficient in particular geographic locations than others, changing an order in which the ordered meals should be prepared before they are delivered, etc.).

Once the delivery worker has completed a delivery route, the delivery worker can select an option presented in the driver application 206 at the driver devices 112A-N to end their trip and reconcile (block 366). The computer system 102 can receive an indication indicating the delivery worker's selection of the option. As a result, the computer system 102 can pay the delivery worker in block 368. In some implementations, the computer system 102 can also pay the vehicle rental company for the e-bike that was used by the delivery worker in block 368. The API 208 can be used to communicate between the computer system 102 and the delivery devices 112A-N to pay the delivery workers and/or the vehicle rental company.

To pay the delivery workers and/or the vehicle rental company, the computer system 102 can use Automated Clearing House (ACH)—Stripe payments via the API 208. The delivery workers can be compensated based on number of meals delivered, using the disclosed techniques. The delivery workers can also be paid a base amount as a minimum for completing any delivery route. Therefore, regardless of how many meals a delivery worker delivers to a number of locations, the delivery worker will receive the same base amount. The delivery workers can receive tips (e.g., 100% of tips), directly from end users and/or via the payment techniques of the computer system 102.

Finally, the computer system 102 may follow up with end users in block 370. For example, the computer system 102 can send a notification to the user application 202 presented at the user device 106A-N requesting feedback about the order and/or delivery process. The end user can rate their experience with the user application 202, communication with the delivery worker, and overall experience. The end user can provide reviews, rating, comments, and other forms of feedback when requested by the computer system 102 in block 370. The end user feedback can be used by the computer system 102 to improve any of the techniques described herein. The computer system 102 can, for example, use the user feedback to determine better, preferred, or optimal delivery routes and improved instructions for timely preparation and delivery of future orders. Additionally, as described above, the feedback can be used by the computer system 102 to determine and/or suggest which kitchen staff and/or delivery workers to call in to work during a particular delivery window.

Figure 3C:
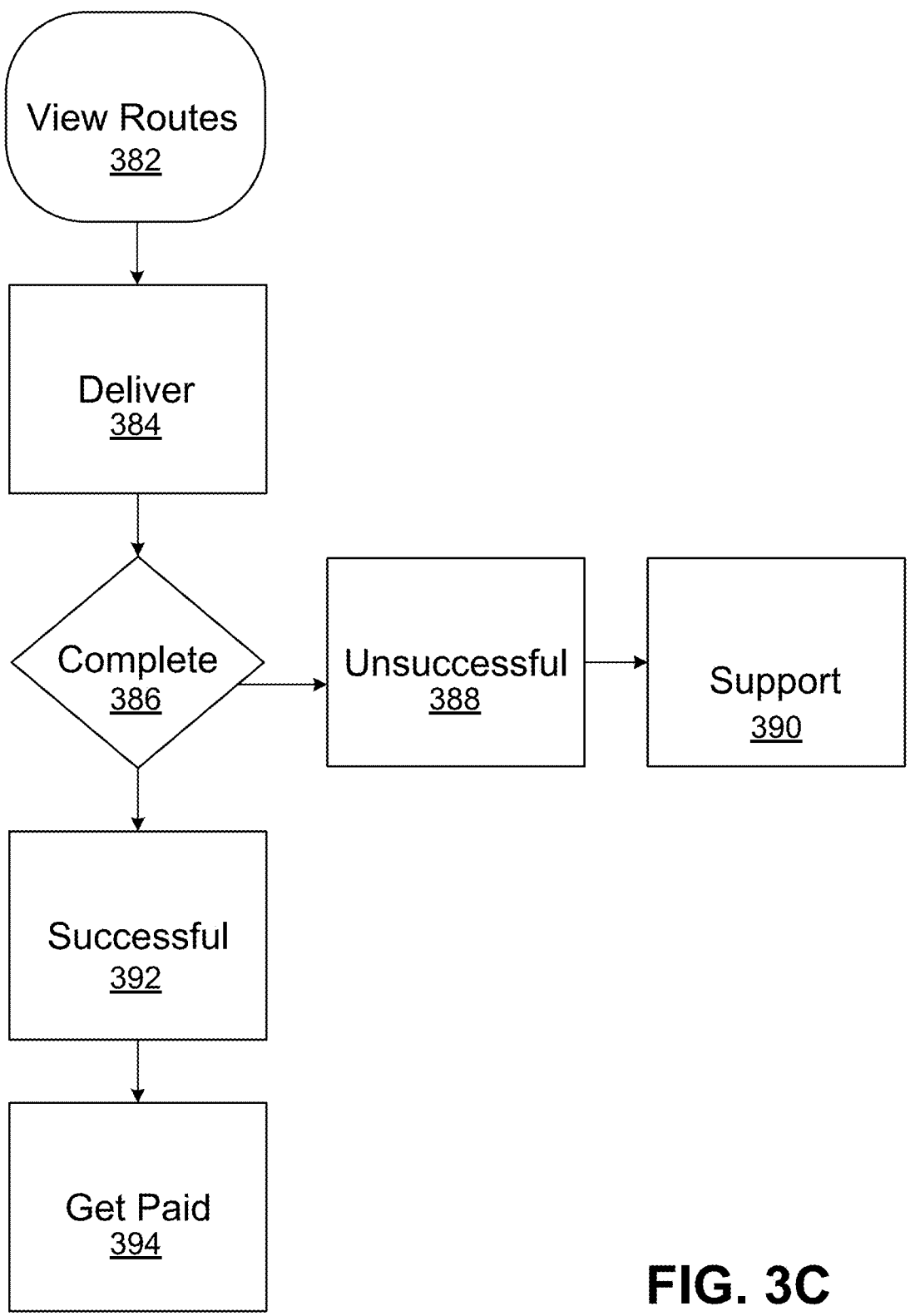
FIG. 3C is a flowchart of a process for completing delivery of meal orders.

FIG. 3C is a flowchart of a process 380 for completing delivery of meal orders. The process 380 can be performed as part of the process 300 described in FIGS. 3A-B. The process 380 can be performed by the delivery devices 112A-N, via the delivery application 206. In some implementations, the process 380 can also be performed by one or more other computing systems, devices, computers, networks, cloud-based systems, and/or cloud-based services.

Referring to the process 380 in FIG. 3C, the delivery worker can view the delivery route(s) they have been assigned in block 382. The delivery application 206, for example, can include a GUI display having information about the delivery route(s) assigned to the delivery worker, such as a time that the delivery worker should pick up the delivery box from the kitchen, an estimated amount of time it should take the delivery worker to complete the route, an amount of ordered meals in the delivery route, a number of delivery locations along the delivery route, navigation instructions, a map of the delivery route, and/or instructions associated with particular ordered meals that are to be delivered in the delivery route.

The delivery worker can view the abovementioned information in the delivery application 206 once the API 208 establishes communication between the computer system 102 and the delivery devices 112A-N in blocks 346 and 358 described in the process 300 in FIGS. 3A-B. For example, once communication is established in the block 346, the delivery worker can receive a notification at their respective delivery devices 112A-N indicating that delivery information is available for them to view in the delivery application 206. As part of block 358 in the process 300, the delivery worker can view the delivery route(s) described in block 382 in the process 380.

As mentioned in the process 300, the delivery worker can begin the route in block 358, which, in the process 380, means the delivery worker can begin delivering the ordered meals in the route in block 384. For each delivery route, the delivery device 112A-N can determine whether the delivery is complete in block 386. The delivery device 112A-N can track movement of the delivery worker and use that information to determine whether the ordered meal has been delivered to its associated address. The delivery device 112A-N may additionally or alternatively request confirmation from the delivery worker indicating that the delivery is complete. Additionally or alternatively, the delivery device 112A-N may also request confirmation of delivery from the end user.

If the delivery device 112A-N determines that the delivery was incomplete, the delivery device 112A-N can mark the delivery of the particular meal as unsuccessful in block 388. The delivery device 112A-N can mark individual meals based on destination as being unsuccessful. This indication can be transmitted to the computer system 102 and used to provide a notification to the end user's user device 106A-N. The notification can prompt the end user to provide feedback about the unsuccessful delivery in block 390. In block 390, the computer system 102 can also provide customer support to the end user, such as refunding the end user for the unsuccessful delivery. Moreover, deliveries marked as unsuccessful can be used to adjust driver ratings. The driver ratings, as described herein, can be derived from delivery data such as successful deliveries, early deliveries, late deliveries, etc. The driver ratings can then be used by the computer system 102 to determine which delivery workers to assign to which delivery routes, if any.

Referring back to block 386, if the delivery device 112A-N determines that the delivery was completed, the delivery device 112A-N can identify delivery of the particular meal as a successful delivery in block 392. This indication can be transmitted to the computer system 102 and used to confirm a payment action to the delivery worker (block 394). In other words, since the delivery was successful, the computer system 102 can pay the delivery worker for the delivery, as described in reference to block 368 in the process 300 of FIGS. 3A-B. A delivery worker can be paid once at the end of a delivery route, for each successful delivery along the route. Unsuccessful deliveries, on the other hand, can be deducted from a total value of the delivery route. This feedback can be used to adjust the driver's rating (e.g., by increasing the rating by a predetermined amount of points, ratio, percentage, etc.). This feedback can also be used by the computer system 102 to make improved selections of delivery workers for future delivery routes (e.g., by selecting most efficient delivery workers for a particular geographic region, etc.).

Figure 4A:
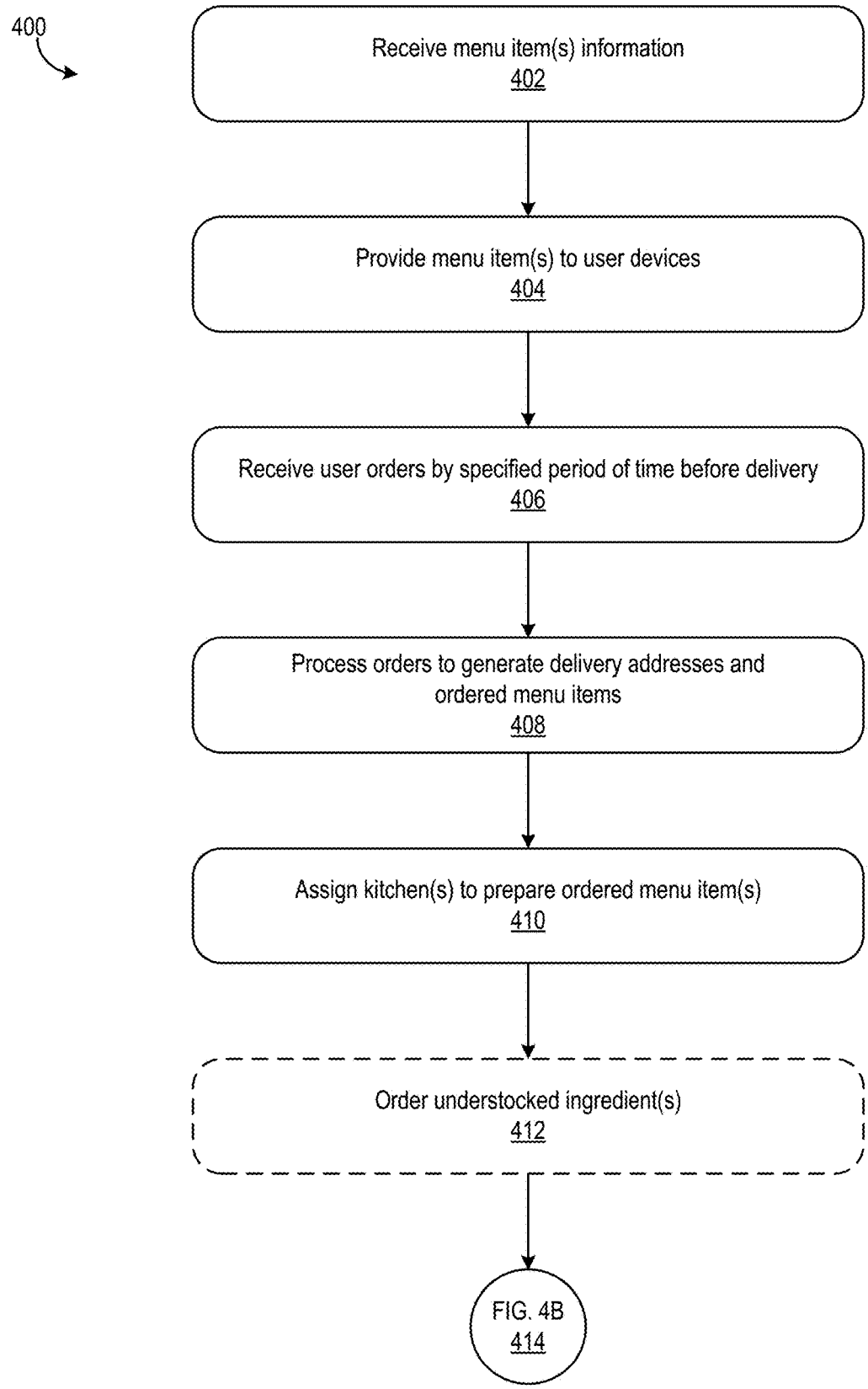
FIGS. 4A-B is a flowchart of an example process for processing meal orders for a particular delivery window.
Figure 4B:
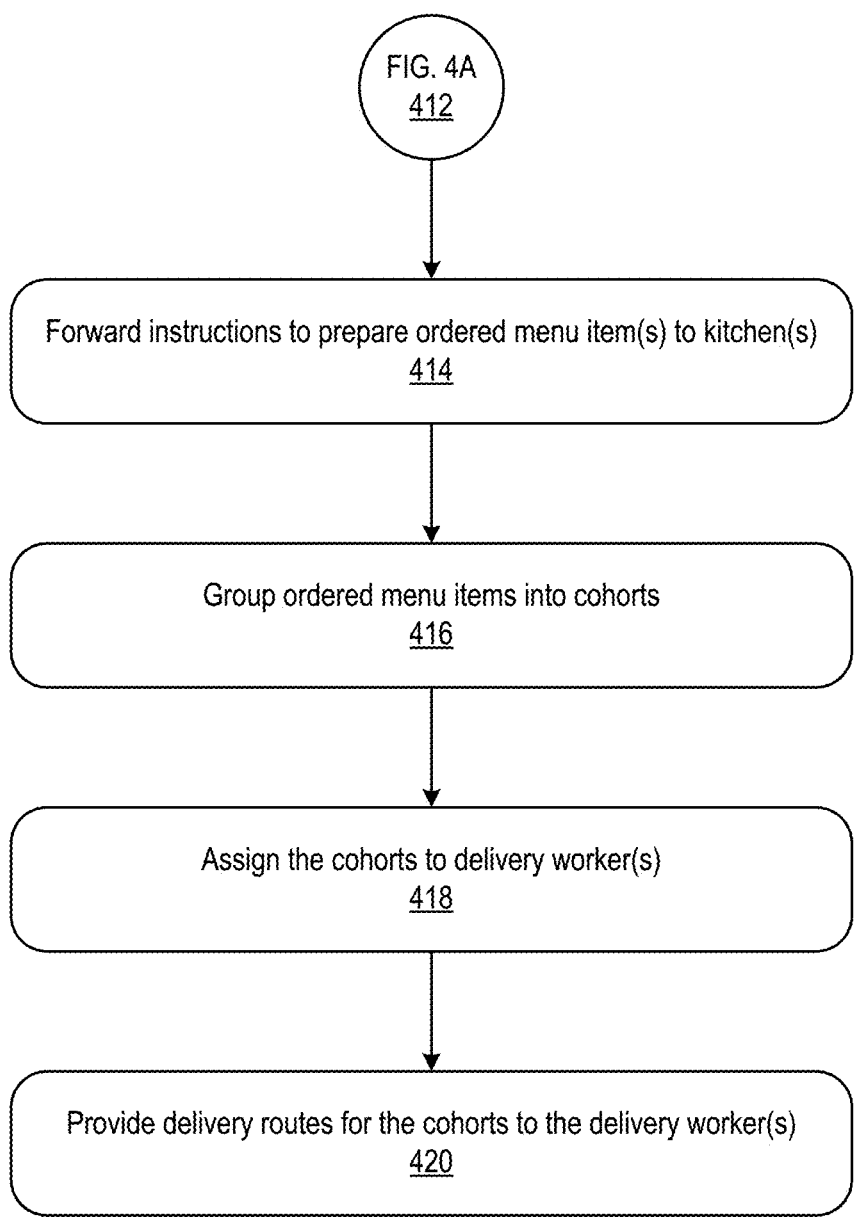

FIGS. 4A-B is a flowchart of an example process 400 for processing meal orders for a particular delivery window. The process 400 can be performed to determine instructions, schedules, and/or directives for preparing, cooking, packing, and delivering ordered meals (e.g., ordered menu items) as described throughout this disclosure. Moreover, the process 400 can be performed before each delivery window. Sometimes, one or more blocks in the process 400 can be performed during a period of time in advance of the next delivery window. As an illustrative example, one or more blocks in the process 400 can be performed approximately 12 to 16 hours before the next delivery window. The process 400 can also be performed during one or more other periods of time.

The process 400 can be performed by the computer system 102. The process 400 can also be performed by one or more other computing systems, devices, computers, networks, cloud-based systems, and/or cloud-based services.

For illustrative purposes, the process 400 is described from the perspective of a computer system.

Referring to the process 400 in both FIGS. 4A-B, the computer system can receive menu item(s) information in block 402. The computer system can receive, from user devices of one or more chefs (e.g., the chef devices 104A-N), menu item content for a menu item to be presented to end users (e.g., at the user devices 106A-N) and identification of ingredients (e.g., SKUs and quantities, such as weights, of SKUs/ingredients) needed to prepare the menu item. The computer system can also receive, from the user devices of the chefs, at least one of preparing instructions, a recipe, and time needed to prepare each menu item. The computer system can receive the menu item content from unaffiliated chefs, as described throughout this disclosure.

In block 404, the computer system can provide the menu item(s) to user devices (e.g., the user devices 106A-N).

The computer system can receive user orders by a specified period of time before a next delivery window (block 406). The orders can include include selection of one or more of the menu items presented to the end users at the user devices. As described herein, the specified period of time can be between 12 to 16 hours before the next delivery window. In an illustrative example, the orders can be received by 6 PM a day before the next delivery window, where the next delivery window is a following day starting at 10:30 AM. As another example, the specified period of time prior to delivery can be within a range of 3 to 24 hours.

The computer system can then process the orders to generate delivery addresses and ordered menu items in block 408. As described herein, the computer system can parse the orders, which can be part of the dataset 218, into two datasets, the datasets 220 and 222 described in FIG. 2. As part of processing the orders, the computer system can also charge the end users for the orders they placed. Sometimes, the computer system can lower, by a predetermined amount, a cost charged to the end users for the orders based on how far in advance the users place the orders within the specified period of time prior to delivery of the orders. In some implementations, a difference between on demand ordering for a comparable meal that is offered using the disclosed techniques can be nearly 100%. As an illustrative example, Chef A's Korean BBQ Torta can cost $18-25 as a walk-in price. On a meal delivery application, the same meal may cost $25-30. Using the disclosed techniques, the same meal can cost $9. Thus, the disclosed techniques can provide an incentive structure in which end users can get access to a 100% discount on the orders they place/schedule far in advance.

In block 410, the computer system can assign one or more kitchens to prepare the ordered menu items. The computer system can assign kitchens based at least in part on proximity of a kitchen to the generated delivery address of the ordered menu item. Therefore, a kitchen that is closest to the location where the ordered menu item is to be delivered (e.g., less distance, less time to travel the distance between the two, etc.) can be assigned to prepare that ordered menu item. The computer system can also assign the kitchens based on how much of each ingredient needed to prepare the ordered menu item is currently available in a kitchen. Therefore, a kitchen that has low quantities of a threshold number of required ingredients (or a kitchen that has a quantity of a particular required ingredient that is less than a threshold quantity, where the threshold quantity can be an exact quantity of the ingredient that is needed to prepare the ordered menu item) may not be assigned to prepare the ordered menu item.

In some implementations, the computer system can assign a kitchen to prepare an ordered menu item based at least in part on whether the kitchen has equipment needed to prepare the ordered menu item. The computer system can also assign a kitchen to prepare an ordered menu item based at least in part on whether the kitchen has sufficient kitchen staff to prepare the ordered menu item (e.g., a sufficient quantity of staff needed to prepare the ordered menu item, a sufficient level of skill/expertise to prepare the ordered menu item, etc.). Moreover, the computer system can assign a kitchen to prepare an ordered menu item based at least in part on whether the kitchen is assigned a quantity of ordered menu items to prepare that is less than a predetermined threshold quantity (e.g., if the kitchen is already assigned many items to prepare, adding another item or items may cause the kitchen to run behind schedule).

The computer system can optionally order understocked ingredients in block 412. The computer system may determine if an ingredient of an ordered menu item is understocked in the kitchen to which an ordered menu item is assigned. The computer system can then order, with a purveyor (e.g., via the purveyor devices 108A-N), the understocked ingredients so that the understocked ingredients can be delivered to the kitchen prior to preparation of the ordered menu item. Sometimes, for example, the understocked ingredients can be ordered with the purveyor for delivery to the kitchen within 1 to 2 days of receiving the orders in block 406. To determine if an ingredient is understocked, the computer system can receive, from a user device of the kitchen (e.g., the kitchen devices 110A-N), a list of SKUs and quantities of each SKU present in the kitchen and determine that (i) the list of SKUs present in the kitchen does not include the ingredient of the ordered menu item and/or (ii) the quantity of the SKU present in the kitchen that corresponds to the ingredient of the ordered menu item is less than a predetermined quantity of the ingredient needed to prepare the ordered menu item.

Next, in block 414, the computer system can forward instructions to prepare the ordered menu items to the kitchen(s). The instructions can be transmitted to at least one user device (e.g., the kitchen devices 110A-N) in the kitchen where the ordered menu item is to be prepared. As described throughout this disclosure, the computer system can determine and generate the instructions, which can include directives and schedules for preparing, cooking, packaging, and delivering the ordered menu items. The computer system can also generate a label for each of the ordered menu items. The label can be placed on the ordered menu item once the ordered menu item is prepared by the kitchen.

The computer system can also group ordered menu items into cohorts (block 416). Grouping the ordered menu items into cohorts can also include determining, for each of the cohorts, an order to pack the ordered menu items into a delivery unit (e.g., delivery box) described throughout this disclosure. Grouping can be based on one or more factors. For example, ordered menu items can be grouped into cohorts based on proximity of the generated addresses for the ordered menu items relative to each other. In other words, ordered menu items having addresses that are within some threshold distance/radius/geographic region can be grouped together in a cohort. Ordered menu items can also be grouped together in a cohort based on one or more other factors, including but not limited to temperature (e.g., temperature to maintain before delivery, temperature of the meal, cold meal, hot meal, etc.), timing (e.g., amount of time to prepare the meal), equipment in the kitchen (e.g., it can be preferred to prepare 150 salmon cuts at one time using a professional oven rather than preparing smaller quantities of salmon cuts in the professional oven or over a stovetop), and others. Grouping can also be based on delivery times for each of the ordered menu items being within a predetermined period of time relative to each other. In other words, ordered menu items having addresses with travel times less than some predetermined period of time (instead of or in addition to actual travel distance) can be grouped together in a cohort.

As described in reference to FIGS. 2-3, grouping of ordered menu items can also occur before or after one or more other blocks in the process 400. As an illustrative example, the ordered menu items can be grouped into cohorts before assigning the ordered menu items to kitchens in block 410. In such a scenario, cohorts can be assigned to kitchens rather than individual ordered menu items. As another example, grouping can occur before forwarding instructions to prepare the ordered menu items to the kitchens in block 414. As a result, the instructions can include preparing, cooking, and/or packaging directives that are based at least in part on what ordered menu items are in a cohort.

The computer system can assign the cohorts to delivery workers in block 418. The cohorts can be assigned based on a variety of factors. The cohorts can be assigned to the delivery workers based on, for each of the delivery workers, at least one of delivery performance, proximity of the delivery worker to the kitchen, and a work schedule of the delivery worker. For example, the cohorts can be assigned based on experience of a delivery worker (e.g., a more experienced delivery worker can receive a larger cohort), end user ratings of or feedback about the delivery worker (e.g., a delivery worker with positive ratings, or ratings above a threshold value, can receive a larger cohort or a cohort that includes ordered menu items of end users who provided the positive ratings), and/or location of the delivery worker relative to the kitchen and/or the delivery addresses associated with the cohort (e.g., a delivery worker who is closer to the kitchen and thus can pick up the cohort quicker than another delivery worker can receive the cohort).

Finally, the computer system can provide delivery routes for each of the cohorts to the delivery workers (block 420). The delivery routes, as described herein, can include driving instructions to deliver the ordered menu items of the cohort in a particular order. The delivery routes can be presented in the driver application 206 described in FIG. 2 at the delivery devices 112A-N.

Figure 5:
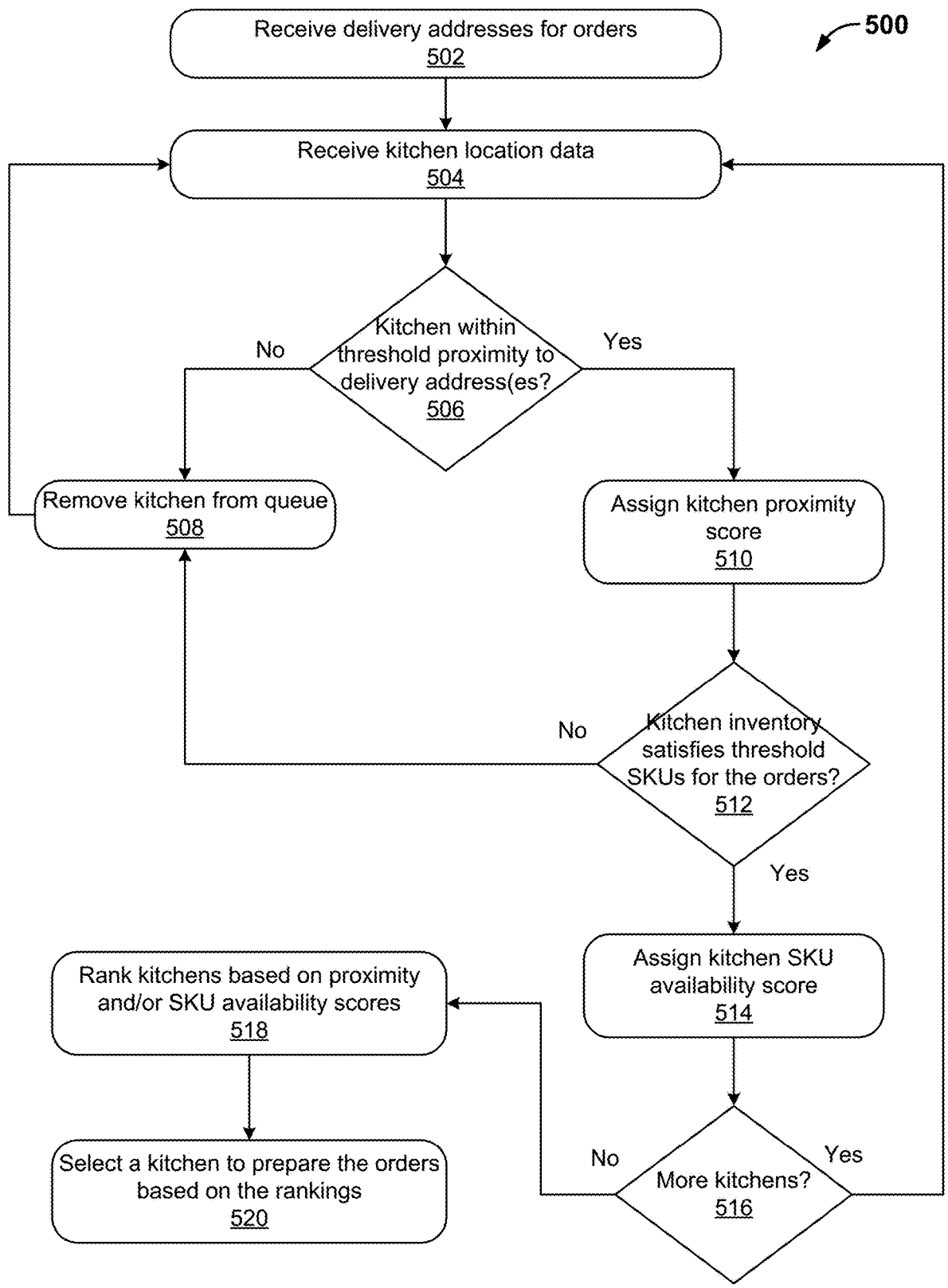
FIG. 5 is a flowchart of a process for determining kitchen capabilities to prepare a list of meal orders for a particular delivery window.

FIG. 5 is a flowchart of a process 500 for determining kitchen capabilities to prepare a list of meal orders for a particular delivery window. The process 500 can be performed by the computer system 102. The process 500 can also be performed by one or more other computing systems, devices, computers, networks, cloud-based systems, and/or cloud-based services. For illustrative purposes, the process 500 is described from the perspective of a computer system.

Referring to the process 500, the computer system can receive delivery addresses for a list of orders in block 502. The list of orders can include meal orders that are to be delivered within some geographic region/area (e.g., the meal orders in the list can have delivery addresses that are physically proximate to each other). Refer to FIGS. 2 and 3B for additional discussion about receiving the delivery addresses.

In block 504, the computer system can receive kitchen location data. The kitchen location data can be retrieved from a data store, such as the data store 114 in FIG. 1. The computer system can receive location data for all kitchens (e.g., all available kitchens). The computer system can also receive location data for a subset or portion of all the kitchens. The computer system can also receive location data for one kitchen at a time.

The computer system can determine whether a kitchen associated with the kitchen location data is within a threshold proximity to one or more of the delivery addresses for the list of orders (block 506). The threshold proximity can be measured as a radius, distance, and/or location of the kitchen relative to the delivery addresses. An example threshold proximity can be a 5-mile radius around a kitchen. Therefore, the kitchen can prepare meal orders to be delivered within the 5-mile radius from the kitchen. One or more other threshold proximities can be determined.

The threshold proximity can be determined by the computer system and based on one or more factors. For example, the threshold proximity can vary depending on a geographic region and/or a population density where the kitchen and/or the delivery addresses are located. A city, for example, may have a denser population and smaller threshold proximities than a sprawling town. The city may also have more kitchens than the sprawling town to accommodate for an increased amount of orders in comparison to the sprawling town.

If the kitchen is not within the threshold proximity to one or more of the delivery addresses, the computer system can remove the kitchen from a queue of possible kitchens that can prepare the list of meal orders (block 508). For example, if the threshold proximity is a 5-mile radius and the kitchen is 6 miles away from one delivery address for the list of meal orders, the kitchen can be removed from the queue of kitchens. The computer system can determine that the kitchen is unable to prepare at least one of the meal orders in the list of orders. Since the kitchen cannot prepare at least one of the meal orders, the kitchen should not prepare any of the meal orders in the list, since all the meal orders in the list have delivery addresses that are physically proximate to each other.

The computer system can then return to block 504 and receive kitchen location data for another kitchen in the queue. The computer system can repeat block 506 for each kitchen in the queue to determine whether each of the kitchens are candidates for preparing the list of meal orders.

If the kitchen is within the threshold proximity to one or more of the delivery addresses in block 506, the computer system can assign a kitchen proximity score to the kitchen in block 510. The kitchen proximity score can be assigned based on how close the kitchen is to the one or more delivery addresses. A higher score can be assigned the closer the kitchen is to the one or more delivery addresses (e.g., the kitchen is physically located within a threshold distance from a farthest away delivery address). A higher score can also be assigned if the kitchen is closer to a greater quantity of the delivery addresses for the list of meal orders (e.g., the kitchen is physically closest to a quantity of delivery addresses that exceeds a threshold quantity).

The computer system can also determine whether the kitchen has inventory that satisfies a threshold quantity and/or type of SKUs needed to prepare the list of orders in block 512. Block 512 can be performed as described throughout this disclosure, for example in FIGS. 2 and 3B. In some implementations, block 512 can be performed before and/or during blocks 504-510.

If the kitchen inventory does not satisfy the threshold quantity and/or type of SKUs needed, the computer system can proceed to block 508, as described above. If, on the other hand, the kitchen inventory does satisfy the threshold quantity and/or type of SKUs needed, the computer system can assign a kitchen SKU availability score to the kitchen in block 514. Similar to the kitchen proximity score, the kitchen SKU availability score can be assigned based on how much the kitchen inventory satisfies the threshold quantity and/or type of SKUs needed. For example, a higher score can be assigned if the kitchen inventory has a quantity and/or type of SKUs needed that exceeds some threshold quantity (e.g., the kitchen can be assigned a perfect score, such as 100 on a scale of 0 to 100, if the kitchen inventory has all the necessary quantity and/or type of SKUs needed). A lower score can be assigned if, for example, the kitchen inventory includes some of the needed quantity and/or type of SKUs but additional quantity and/or type of the SKUs may need to be ordered with a purveyor.

The computer system can then determine whether there are more kitchens in the queue in block 516. If there are more kitchens, the computer system can return to block 504 and repeat blocks 504-514 for each remaining kitchen in the queue. If there are no more kitchens in the queue in block 516, the computer system can proceed to block 518.

In block 518, the computer system can rank the kitchens based on proximity and/or SKU availability scores. The computer system can determine an aggregate score for each kitchen by averaging the proximity and SKU availability scores for the kitchen. The computer system can also aggregate the score for each kitchen based on summing the kitchen's proximity and SKU availability scores. One or more other statistical techniques can also be used to determine an aggregate score for each kitchen and rank the kitchens in the queue accordingly. In some implementations, the computer system may rank the kitchens based on only one score, such as the proximity scores or the SKU availability scores, but not both.

The computer system can then select a kitchen to prepare the list of orders based on the rankings in block 520. In some implementations, the computer system can select the kitchen that is ranked the highest amongst the kitchens in the queue. In some implementations, the computer system can select the kitchen having the highest proximity score. The computer system can also select the kitchen having the highest SKU availability score. One or more other techniques can be used to determine which kitchen to select to prepare the list of orders.

The process 500 can also be performed to determine available equipment and/or staff at a kitchen to make a determination as to whether the kitchen can fulfill the list of meal orders. In other words, the computer system can also score each kitchen based on whether the kitchen has the necessary equipment to fulfill the list of meal orders, whether the kitchen has enough staff to cook and prepare the list of meal orders, and/or whether the kitchen is too busy to also take on the list of meal orders.

Figure 6:
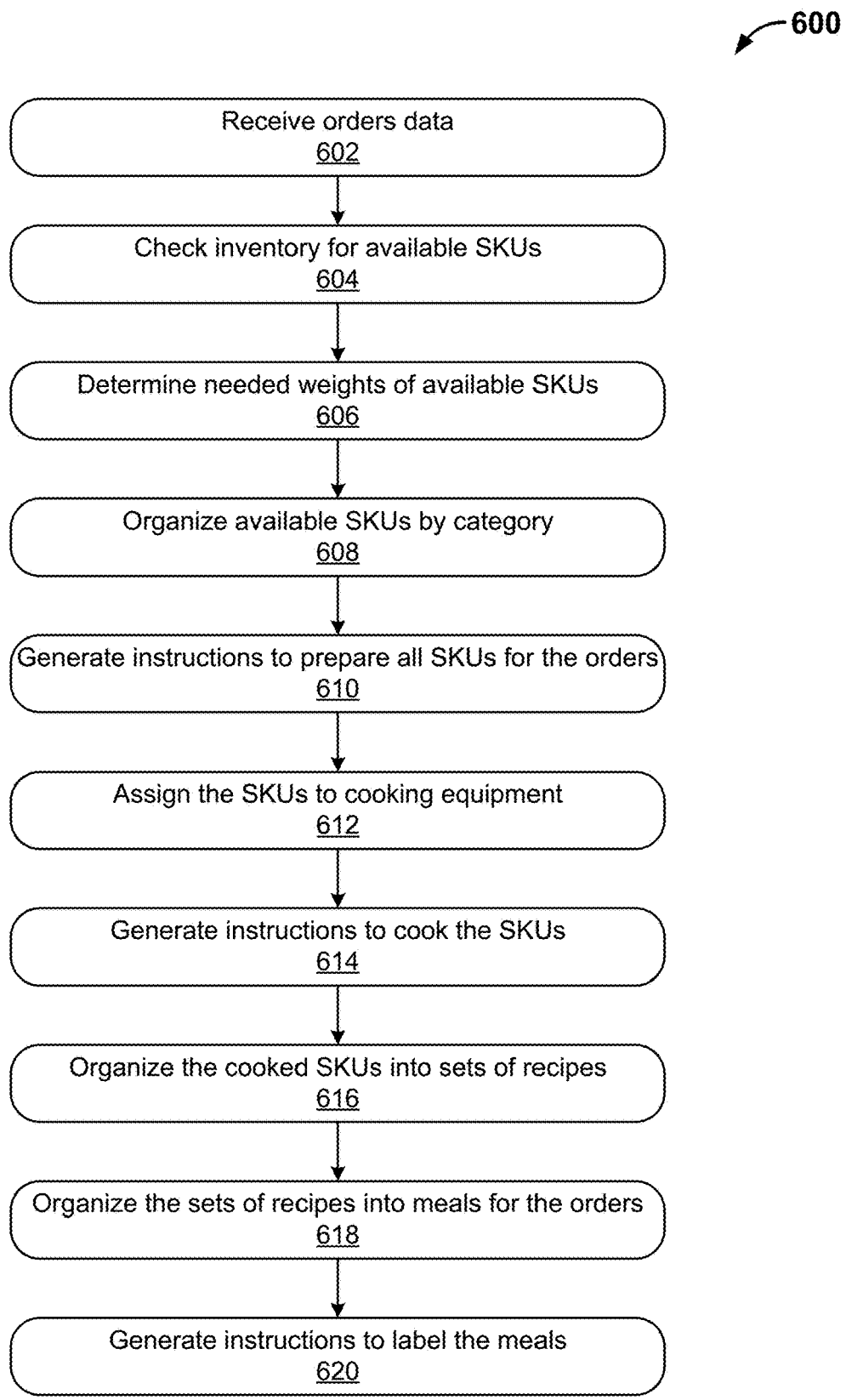
FIG. 6 is a flowchart of a process for scheduling meal order preparation for a particular delivery window.

FIG. 6 is a flowchart of a process 600 for scheduling meal order preparation for a particular delivery window. The process 600 can be performed after selecting a kitchen to prepare the meal orders (e.g., ordered menu items) in the process 500 of FIG. 5. The process 600 can be performed by the computer system 102. The process 600 can also be performed by one or more other computing systems, devices, computers, networks, cloud-based systems, and/or cloud-based services. For illustrative purposes, the process 600 is described from the perspective of a computer system.

Referring to the process 600, the computer system can receive meal orders data in block 602. For example, the computer system can receive quantities, recipes, and lists of ingredients/SKUs for each menu item that has been ordered by end users and included in a list of meal orders to be prepared at the kitchen. Refer to FIGS. 2 and 3B for additional discussion.

In block 604, the computer system can check inventory at the kitchen for available SKUs. For example, the computer system can receive inventory information associated with the kitchen and determine whether the kitchen has the necessary quantities, such as weights, of each SKU needed to prepare the meals in the list of meal orders. In block 604, the computer system can place an order for SKUs with a purveyor if one or more SKUs are understocked, as described herein. In some implementations, the computer system can generate and transmit a notification to an end user indicating that one or more SKUs for their purchased meal order is out of stock. In some implementations, if the one or more SKUs cannot be replenished (e.g., by ordering them from a purveyor), then the computer system can generate and transmit a notification to the end user indicating that the meal order cannot be prepared and that the meal order is cancelled. The end user can then place an order for a different meal (e.g., a different menu item).

The computer system can determine needed weights of available SKUs (block 606). For example, the computer system can receive menu item information for the meal orders in the list. The menu item information can be uploaded by chefs and stored in a data store, as described throughout this disclosure. The menu item information can include preparation instructions, a recipe, list of SKUs, and weights/quantities of each of the listed SKUs. The computer system can compare the received meal orders data to the menu item information to determine what quantities of the SKUs available in the kitchen are needed to prepare the ordered meals. The computer system can therefore check for stock on hand versus stock needed and determine how much of a particular SKU is needed in order to fulfill the orders for that kitchen.

Next, the computer system can organize the available SKUs by category in block 608. SKUs may be categorized based on one or more factors, including but not limited to (a) their relationship to purveyors (e.g., barcode and/or ASIN, brand name, item name, etc.), (b) their grocer profile (e.g., which aisle is it found in most stores or other retail environments, their relationship with similar SKUs, such as SKU X being replaceable for recipes 1-n by SKU Y, etc.), and (c) their relationship to the consumer (e.g., olfactory, tactile, and gustatory descriptors, such as sweet, bitter, salty, savory, hard, soft, minty, fragrant, fruity, etc.).

The computer system can also generate instructions for kitchen staff to prepare all SKUs for the meal orders in block 610. The instructions can be generated based on the menu item information. For example, the computer system can identify preparation instructions in each of the menu item information that involve the same category of SKUs and group those preparation instructions together, even if those instructions are each related to different meal orders. The computer system can also group the preparation instructions together based on what type of tasks are required during preparation. For example, instructions can be generated for kitchen staff that instruct the kitchen staff to chop up vegetables for all the meal orders including vegetables in their recipes. Another set of instructions can be generated for kitchen staff to retrieve all quantities of dairy ingredients from refrigerators for all the meal orders including dairy ingredients.

In some implementations, the generated instructions can be transmitted to devices of the kitchen staff in real-time, once the instructions are generated. In some implementations, the generated instructions can be transmitted to the kitchen staff devices at a later time in the process 600, such as at the end of the process 600 (e.g., after block 620).

The computer system can also assign the SKUs to cooking equipment in block 612. As an illustrative example, the computer system can determine which stovetops and/or ovens should be used for which SKUs (e.g., fish can be prepared on stovetop #1 while pork can be prepared on stovetop #4). As another example, the computer system can determine which food processors to use for preparing one or more SKUs. Block 612 can be performed before or during one or more blocks, such as blocks 608 and 610.

The computer system can generate instructions to the kitchen staff to cook the SKUs (block 614). The generated instructions can be based on the preparation instructions and/or the recipe in the menu item information. The instructions can assign cooking of different SKUs to different kitchen staff. As a result, each kitchen staff can receive a different set of cooking instructions. The generated cooking instructions can include SKUs for multiple different meal orders. For example, one kitchen staff can receive a set of instructions for cooking four fillets of salmon over stovetop #1, where each fillet corresponds to a different meal order. The instructions may also include additional details about how each of the four fillets of salmon should be cooked (e.g., one fillet can be cooked plain without additional spices or sauces while another fillet can be cooked with a teriyaki sauce). As another example, another kitchen staff can receive a set of instructions for baking potatoes in oven #2, where each set of details in the instructions for potatoes can be different and corresponding to a different meal order.

In some implementations, the generated cooking instructions can be transmitted to devices of the kitchen staff in real-time, once the instructions are generated. In some implementations, the generated cooking instructions can be transmitted to the kitchen staff devices at a later time in the process 600, such as at the end of the process 600 (e.g., after block 620).

The computer system can also organize the cooked SKUs into sets of recipes (block 616). The computer system can make this determination based on the menu item information. In block 616, the computer system can also generate instructions for the kitchen staff to group together the cooked SKUs into the recipes once they are done cooking. For example, the instructions can indicate which fillet of salmon and which set of potatoes go together in a recipe.

Moreover, the computer system can organize the sets of recipes into meals for the orders (block 618). The computer system can make this determined based on the received meal orders data. The computer system can also generate instructions for the kitchen staff to group together the recipes into the ordered meals in the list of meal orders. For example, a single order can include menu items from three different menus. Three different recipes can be used to prepare the menu items for this order. The computer system can determine that the recipes from block 616 that are associated with the single order can therefore be grouped together.

The computer system can then generate instructions to label the meals, as described throughout this disclosure (block 620).

As mentioned above in the process 600, and of the generated instructions can be transmitted to the devices of kitchen staff at one or more different times, such as at the end of the process 600. The generated instructions from blocks 610, 614, 616, 618, and/or 620 can be transmitted separately and/or in batch. The instructions can be transmitted to the devices and presented as notifications to the kitchen staff once they show up for their shifts/jobs. For example, the process 600 can be performed before the kitchen opens to prepare the list of meal orders for the next delivery window. Once the kitchen opens, the computer system can transmit the instructions generated by the process 600 to the devices of the kitchen staff.

Figure 7:
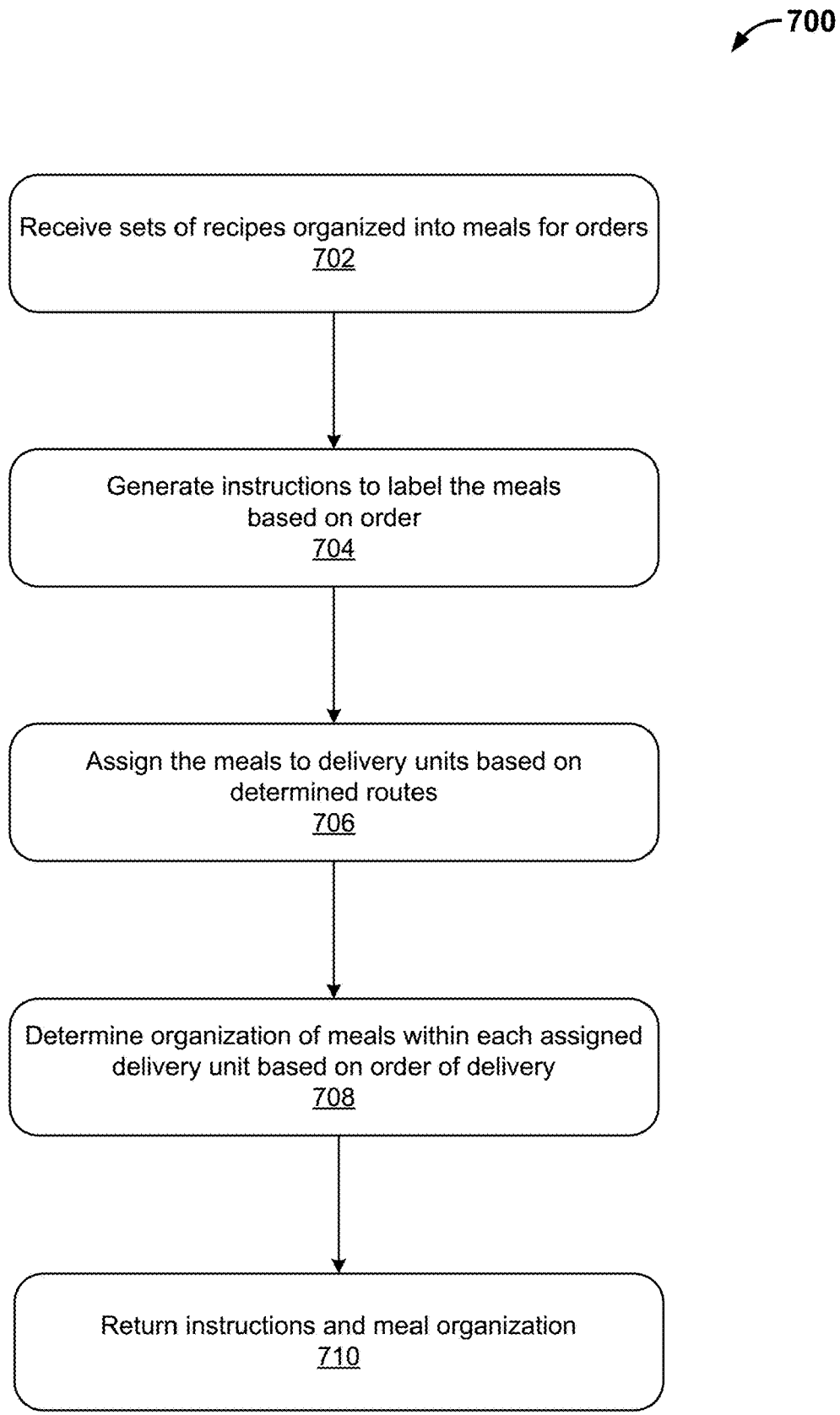
FIG. 7 is a flowchart of a process for determining meal order assembly and packing directives for a particular delivery window.

FIG. 7 is a flowchart of a process 700 for determining meal order assembly and packing directives for a particular delivery window. The process 700 can be performed by the computer system 102. The process 700 can also be performed by one or more other computing systems, devices, computers, networks, cloud-based systems, and/or cloud-based services. For illustrative purposes, the process 700 is described from the perspective of a computer system.

Referring to the process 700, the computer system can receive sets of recipes that are to be organized into meals for the orders (block 702). Refer to block 618 in the process 600 of FIG. 6.

In block 704, the computer system can generate instructions to label the meals based on order. As described throughout this disclosure, the labels can be generated by the computer system based on end user information associated with a meal order. The labels can include a delivery address, a recipient name, phone number, and a list of menu items in the meal order. The labels can also include barcodes or other identifiers that can be scanned by delivery workers and/or used for tracking and/or confirming delivery of the meal order. The generated instructions in block 704 can indicate an order in which the kitchen staff should label the meals. The instructions can also indicate where to place the labels on the meal orders. Each meal order can receive a label. In some implementations, where a meal order may include multiple different menu items (e.g., where each menu item can be from a same or different menu), a same/similar label can be generated for each menu item in the meal order.

The computer system can also assign the meals to delivery units based on determined delivery routes (block 706). The computer system can receive a set of delivery routes that were previously determined (e.g., refer to FIGS. 3B and 8). Meal orders that are part of a same delivery route can be grouped together and assigned to the same delivery unit.

Each delivery route can be assigned a delivery unit. In some implementations, each delivery route can be assigned multiple delivery units, depending on a size of each meal order (e.g., each meal order has one menu item versus each meal order has multiple menu items). The delivery unit can maintain the meal orders in particular ambient temperature settings intended to keep the meal orders fresh/warmed while on delivery to the end users. The delivery unit can be a delivery box as described throughout this disclosure.

The computer system can determine an organization of meal orders within each assigned delivery unit based on an order of delivery in each of the delivery routes (block 708). For example, meal orders to be delivered at an end of a delivery route can be loaded first into the delivery unit (and thus at a bottom of the delivery unit) while meal orders to be delivered at a beginning of the delivery route can be loaded last into the delivery unit (and thus at a top of the delivery unit). As a result, during delivery, a delivery worker may pull meal orders out of the delivery unit in an order in which they are delivered. The delivery worker may not have to shuffle around through the meal orders in the delivery unit to find which meal orders to deliver next, thereby increasing delivery efficiency and reducing potential damage or disruption to any of the meal orders in the delivery unit.

The computer system can further determine an organization of the meal orders within the delivery unit based on a size and/or shape of each of the meal orders. For example, larger sized meal orders can be placed at a bottom of the delivery unit to provide a base on which to layer on other smaller sized meal orders. As another example, rectangular or square meal orders can be stacked at the bottom of the delivery unit while rounder and more irregularly shaped meal orders can be stacked closer to the top of the delivery unit. The computer system can determine a preferred organization of meal orders in a delivery unit based on a combination of the delivery route and the size/shape of the meal orders for that delivery route.

The computer system can then return the labeling instructions and the meal organization for the delivery units in block 710. For example, the computer system can transmit the instructions and meal organization to devices of kitchen staff who are in charge of labeling the meal orders and putting them into the delivery units. In some implementations, instead of transmitting the instructions and organization in batch, as described in reference to the process 600 of FIG. 6, the instructions generated in block 704 can be transmitted in real-time to the kitchen staff devices and the meal organization can be transmitted separately in real-time to the kitchen staff devices.

Figure 8:
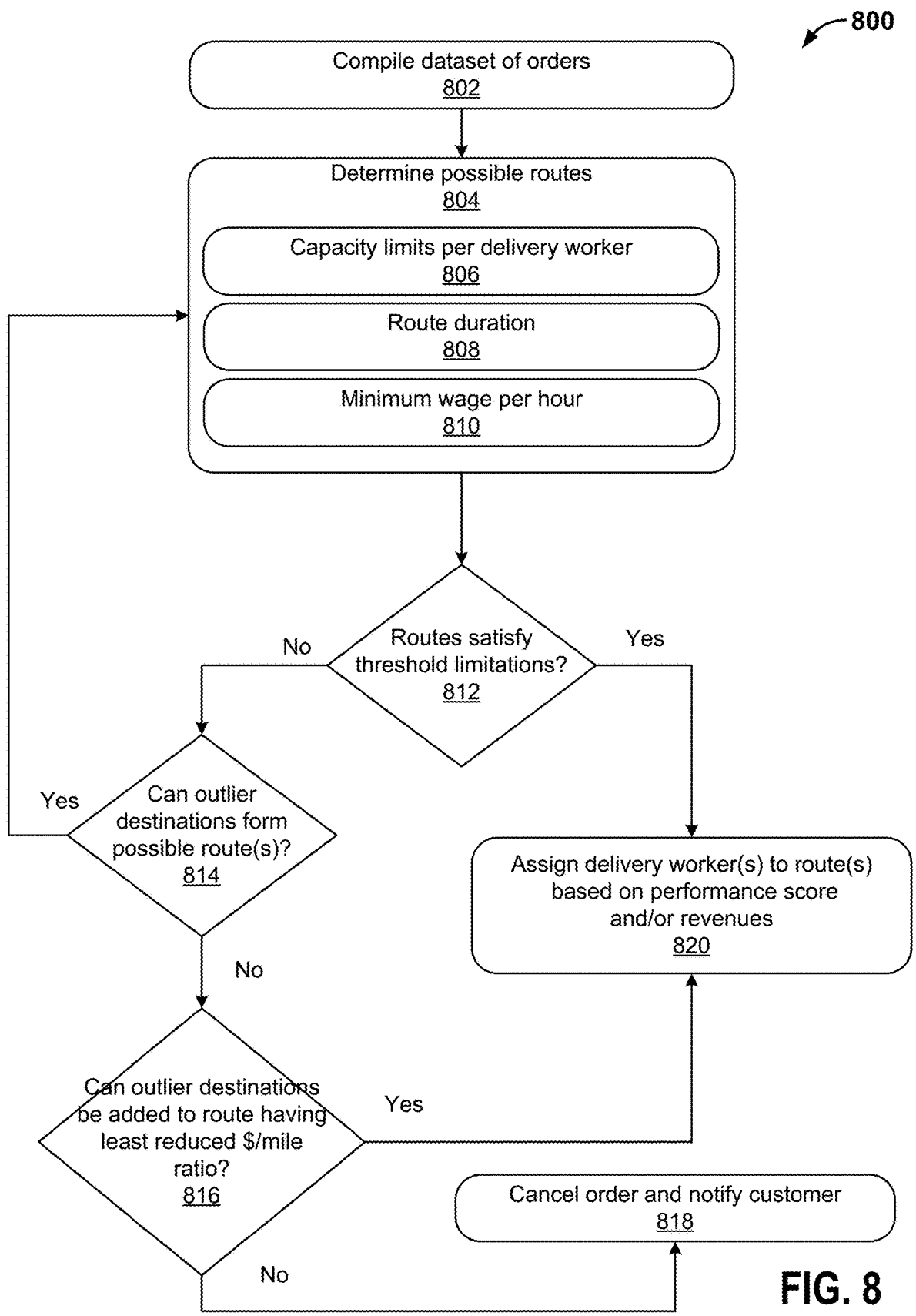
FIG. 8 is a flowchart of a process for determining delivery routes and scheduling delivery workers for a particular delivery window.

FIG. 8 is a flowchart of a process 800 for determining delivery routes and scheduling delivery workers for a particular delivery window. The process 800 can be performed by the computer system 102. The process 800 can also be performed by one or more other computing systems, devices, computers, networks, cloud-based systems, and/or cloud-based services. For illustrative purposes, the process 800 is described from the perspective of a computer system.

Referring to the process 800, the computer system can compile a dataset of meal orders in block 802. For example, as shown and described in FIG. 2, the computer system can identify and extract delivery addresses from each meal order that has been paid for and processed for the particular delivery window.

The computer system can determine all possible routes for the meal orders in the dataset in block 804. The computer system can use different combinations and permutations to determine all possible routes. For example, for any given dataset, in generating all possible routes, the computer system can choose a point, then determine every possible next point (or a subset of next points) and repeat until all points are included. Parameters can also be set to determine viable routes. Then, the computer system can determine for any given dataset, a route having a highest, optimal, or preferred revenue/mile. The computer system can extract points along that route from the dataset and repeat this process until either no points in the dataset exist, or no viable routes exist from the remaining points in the dataset (in which case these outliers can be attached to one or more viable routes based on which addition least reduces, or most increases, an average revenue/mile for the viable route. This may be considered a reductive technique for determining all the possible routes that are viable in block 804.

The computer system can determine the possible routes based on grouping together delivery addresses that are geographically proximate to each other (e.g., within some predetermined threshold distance of each other). The computer system can also determine possible routes based on most direct delivery instructions to get from one delivery address to a next (e.g., delivery instructions that require the delivery worker to make the least amount of turns, delivery instructions that do not require the delivery worker to get on highways, etc.).

The computer system can also determine the possible routes based on one or more factors. For example, the possible routes can be determined while taking into account capacity limits per delivery worker (block 806), route duration (block 808), and/or minimum wage per hour (block 810). The capacity limit per delivery worker can vary depending on whether the delivery worker has a car or bicycle. A delivery worker on a bicycle may have a smaller capacity, such as one delivery unit, than a delivery worker with a car. The delivery worker with the car, for example, may be able to take more than one full delivery unit. As another example, route duration can be the same for every delivery worker or different. In some implementations, every delivery worker can have a maximum route duration of 2 hours. In some implementations, delivery workers on bicycles can have shorter maximum route durations than delivery workers with cars. For example, a delivery worker with a bicycle may have a maximum route duration of 90 minutes while a delivery worker with a car can have a maximum route duration of 2 hours. One or more other route durations can be used in block 808.

Once the possible routes are determined, the computer system can determine whether the possible routes satisfy or meet one or more threshold limitations in block 812. For example, any possible route that exceeds the capacity limit (block 806), exceeds the route duration (block 808), and/or does not meet the minimum wage per hour (block 810), may not satisfy the threshold limitations in block 812. On the other hand, a possible route that does not exceed the capacity limit (block 806), does not exceed the route duration (block 808), and meets the minimum wage per hour (block 810) can satisfy the threshold limitations in block 812.

If a route does not satisfy the threshold limitations in block 812, the computer system can determine whether any outlier destinations can form other possible routes (block 814). In other words, the computer system can determine whether any of the delivery addresses in the route (e.g., the outlier destinations) that did not satisfy the threshold limitation can be grouped into one or more other possible routes. These delivery addresses may be grouped together, for example, if they are geographically proximate each other (e.g., within some threshold distance of each other).

If the outlier destinations can form other possible routes in block 814, the computer system can return to block 804 and determine all the other possible routes for the outlier destination(s).

If the outlier destinations cannot form other possible routes in block 814, the computer system can determine whether any of the outlier destinations can be added to existing possible routes that satisfied the threshold limitations in block 812 (block 816). The computer system can base this determination on which routes have a least reduced $/mile ratio (e.g., revenue/mile). Thus, the outliers can be assigned to routes based on how they impact a route's $/mile ratio. A match producing a least reduced (which can also mean most increased) $/mile ratio can be selected and therefore the outliers can be integrated into routes that fit preliminary viable route parameters. Moreover, if justified, another delivery worker can also be added to satisfy delivery of the added outliers.

If the outlier destination(s) can be added to a route having a least reduced $/mile ratio in block 816, the computer system can proceed to block 820, described below. This means that the route has capacity to also include delivery to the outlier destination(s). If the outlier destination(s) cannot be added to a route, then the computer system can cancel the meal order and notify the customer (block 818). After all, none of the possible routes that satisfy the threshold limitations in block 812 may have capacity to take on and deliver to the outlier destination(s) (e.g., the possible routes may have reached capacity limits and/or route duration).

Referring back to block 812, if any of the possible routes satisfy the threshold limitations, the computer system can assign one or more delivery workers to those routes in block 820. A delivery worker can be assigned per route. In some implementations, multiple delivery workers can be assigned to a route. For example, a first delivery worker can be assigned a first half of the route while a second delivery worker can be assigned a second half of the route.

Assignment of delivery workers to routes can be based on the delivery worker's performance score and/or revenue (e.g., total revenue, average revenue, mean revenue, median revenue, weekly revenue, daily revenue, monthly revenue, yearly revenue, etc.). As described herein, end users can rate delivery of their meal orders. As part of the rating, the end users can rate performance of their delivery worker. Performance ratings can be compiled (e.g., averaged, summed, etc.) to determine an overall performance score for a delivery worker. Delivery workers can be ranked based on their overall performance scores, from highest score to lowest score. Routes can first be assigned to delivery workers with the highest scores. Routes can therefore be assigned to delivery workers based on their overall performance scores, from highest score to lowest score. In some implementations, all the delivery routes may be assigned to delivery workers before all ranked delivery workers get assignments. In other words, some delivery workers having the lowest scores may not be assigned delivery routes in block 820. Those delivery workers may, however, be assigned delivery routes when the process 800 is performed for another delivery window.

As mentioned above, delivery workers can also be assigned routes based on their revenue. The delivery workers can be ranked from highest to lowest revenue. Higher-revenue delivery workers may be more profitable, efficient, and/or experienced than lower-revenue delivery workers. Therefore, the higher-revenue delivery workers can be assigned routes first such that assignments are made from highest revenue to lowest revenue.

In yet some implementations, delivery workers can be assigned to routes based on a combination of performance score and revenue. The performance score and/or revenue can be weighted differently (e.g., the performance score can be waited more heavily than the revenue or vice versa).

Once delivery workers are assigned to routes in block 820, the assignments can be transmitted to devices of the delivery workers.

Figure 9A:
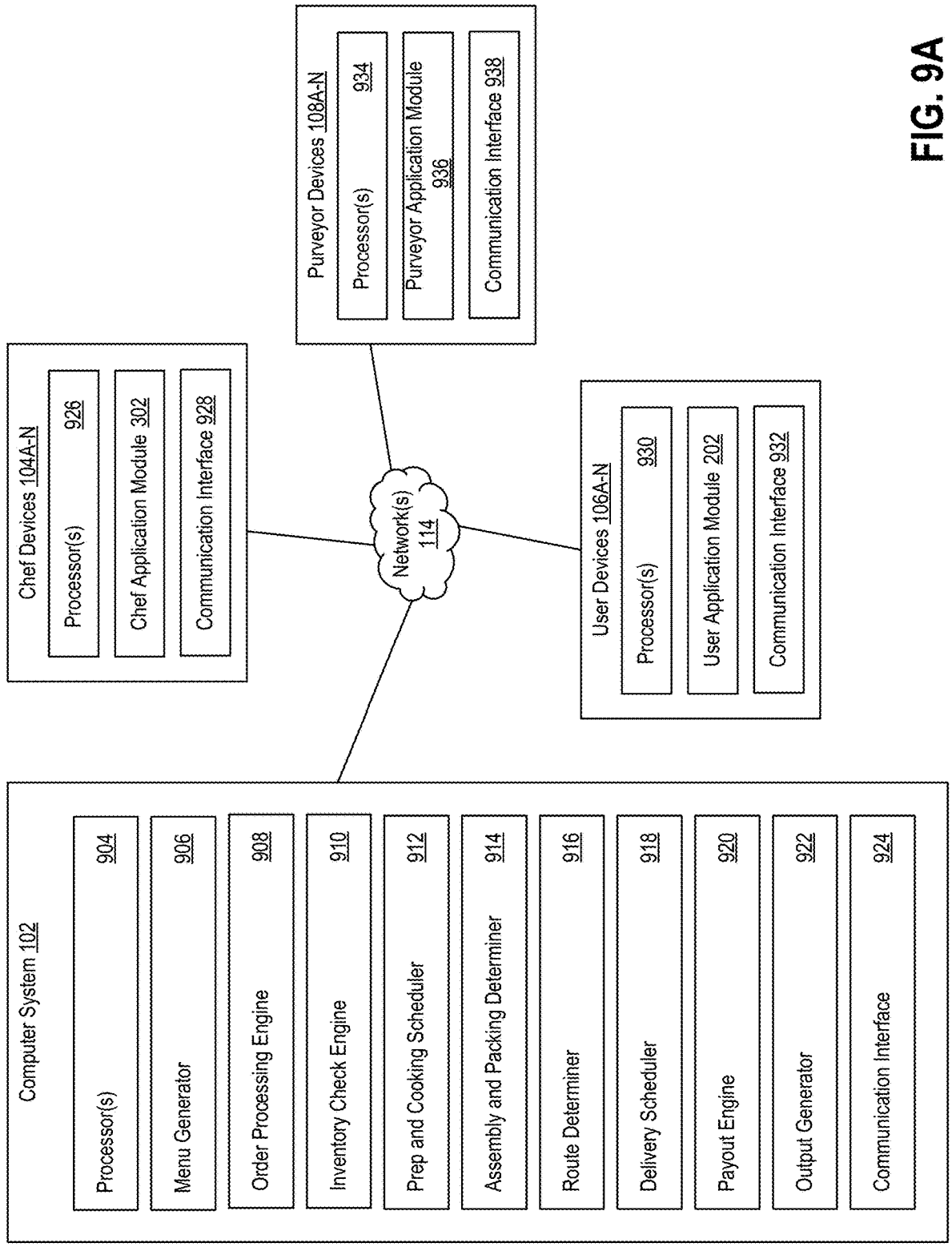
FIGS. 9A-B are system diagrams depicting one or more components used to perform the techniques described herein.
Figure 9B:
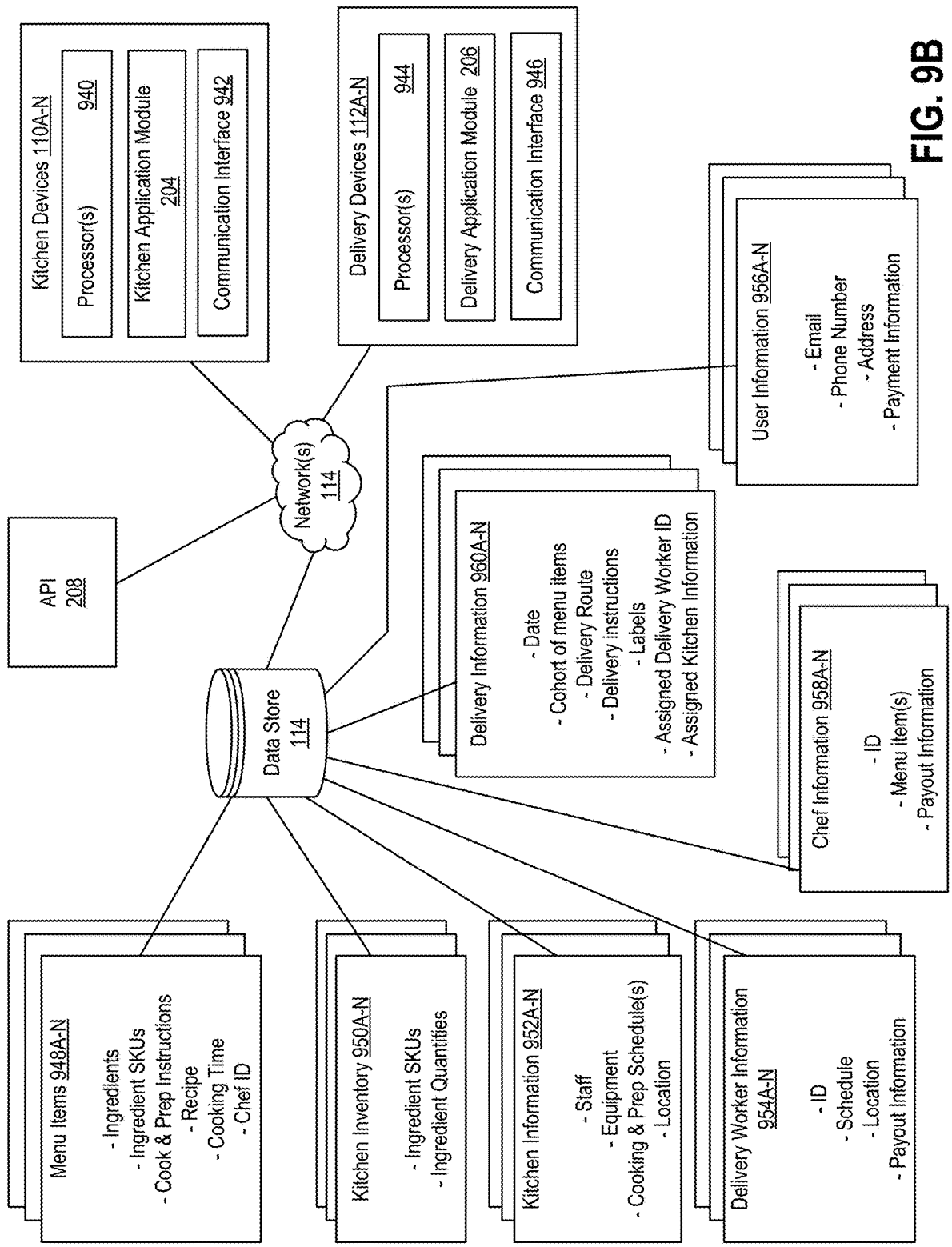

FIGS. 9A-B are system diagrams depicting one or more components used to perform the techniques described herein. Referring to both FIGS. 9A-B, the computer system 102, chef devices 104A-N, user devices 106A-N, purveyor devices 108A-N, kitchen devices 110A-N, delivery devices 112A-N, data store 114, and API 208 can communicate through the network(s) 114. The API 208 can provide for communication between the computer system 102 and any of the devices 104A-N, 106A-N, 108A-N, 110A-N, and 112A-N described herein.

The computer system 102 can include processor(s) 904, menu generator 906, order processing engine 908, inventory check engine 910, prep and cooking scheduler 912, assembly and packing determiner 914, route determiner 916, delivery scheduler 918, payout engine 920, output generator 922, and communication interface 924.

The chef devices 104A-N can include processor(s) 926, chef application module 302, and communication interface 928. Similarly, the user devices 106A-N each can include processor(s) 930, user application module 202, and communication interface 932. The purveyor devices 108A-N may also include processor(s) 934, purveyor application module 936, and communication interface 938. The kitchen devices 110A-N can include processor(s) 940, kitchen application module 204, and communication interface 942. Moreover, the delivery devices 112A-N can include processor(s) 944, delivery application module 206, and communication interface 946.

Each of the processor(s) 904, 926, 930, 934, 940, and 944 can be configured to execute instructions to perform one or more of the techniques described throughout this disclosure. Each of the communication interfaces 924, 928, 932, 938, 942, and 946 can be configured to provide communication between one or more of the components described herein. Each of the devices 104A-N, 106A-N, 108A-N, 110A-N, and 112A-N may also execute their respective application modules 302, 202, 936, 204, and 206. As described herein, the application modules 302, 202, 936, 204, and 206 can provide one or more GUIs that can be used by the respective users of the devices 104A-N, 106A-N, 108A-N, 110A-N, and 112A-N to interact with services provided by the computer system 102.

Referring to the computer system 102, the menu generator 906 can be configured to generate menus to be presented to end users of the user devices 106A-N. The menu generator 906 can receive menu items from chefs at the chef devices 104A-N. The chefs can provide the menu items and their associated information via the chef application module 302. The menu items can be stored in the data store 114 as menu items 948A-N. The chefs, at the chef devices 104A-N can provide information such as ingredients, ingredient SKUs, cook and preparation instructions, a recipe, cooking time, and/or a chef ID, all of which can be stored in the menu items 948A-N by the computer system 102. The computer system 102 can use the information in the menu items 948A-N to generate menus but also to generate cooking and preparation schedules for any of those menu items 948A-N when they are ordered by end users at the user devices 106A-N.

The order processing engine 908 can be configured to process any orders that are placed by the end users at the user devices 106A-N using the user application module 202. The engine 908 can, for example, charge a payment method of each end user that places an order. The engine 908 may also parse orders to identify delivery addresses and ordered menu items. The parsed information can be used by one or more other components of the computer system 102 as described throughout this disclosure. The engine 908 can generate user information 956A-N, which can be stored in the data store 114. The user information 956A-N can include at least an end user's email, phone number, delivery address(es), and/or payment information. In some implementations, the engine 908 can poll the data store 114 to identify whether user information 956A-N already exists for an end user that placed an order. If information does exist, the engine 908 can retrieve the payment information and/or delivery address(es) from the respective user information 956A-N to be used in processing the end user's order.

The inventory check engine 910 can determine whether a kitchen has low inventory for one or more SKUs (e.g., ingredients) that are required to cook and prepare one or more ordered menu items. The order processing engine 908 can transmit a list of ordered menu items to the engine 910.

Using the list, the engine 910 can retrieve ingredients and their respective weights for each ordered menu item 948A-N in the data store 114. The engine 910 can then poll the kitchen devices 110A-N to receive current stock information. In some implementations, the engine 910 can retrieve the ingredient SKUs and quantities in kitchen inventory information 950A-N stored in the data store 114. This information 950A-N may be updated at various times (e.g., once a day, twice a day, every other day, etc.) by kitchen management at the kitchen devices 110A-N using the kitchen application module 204. The engine 910 can determine a delta between the current stock and the required ingredients to identify if additional ingredients are required in the kitchen to prepare the ordered menu items. If additional ingredients, or quantities of ingredients, are required, the engine 910 can transmit a request to the purveyor application module 936 at the purveyor devices 108A-N for the additional ingredients, or quantity(ies) of ingredient(s).

The prep and cooking scheduler 912 can be configured to determine instructions for the kitchen to prepare and cook the ordered menu items, as described throughout this disclosure. The scheduler 912 can generate these instructions (e.g., directives, schedules) using information that is generated by other components of the computer system 102, such as the delivery scheduler 918. The generated instructions can be stored in kitchen information 952A-N in the data store 114 and presented in the kitchen application module 204 at the kitchen devices 110A-N. The scheduler 912 can also make one or more suggestions regarding staff to bring in to the kitchen to prepare the ordered menu items and/or equipment that may be required to prepare the ordered menu items for the particular delivery window. These suggestions can be stored in the kitchen information 952A-N. Information about available staff (e.g., their work schedules, pay, preferences, etc.) and equipment may also be stored in the kitchen information 952A-N and used by the scheduler 912 to generate these suggestions. In some implementations, the scheduler 912 may determine which kitchen should prepare the ordered menu items based at least in part on available staff and equipment, ingredients, and/or proximity to delivery addresses.

The assembly and packing determiner 914 can be configured to determine instructions, directives, and/or schedules for assembling and packing the ordered menu items into delivery boxes (e.g., delivery units) once they are cooked and prepared. The determiner 914 can generate the instructions using information that is determined/generated by other components, such as the delivery scheduler 918. The generated instructions can be stored in the kitchen information 952A-N in the data store 114 as part of the cooking and prep schedule(s). These instructions can also be presented in the kitchen application module 204 at the kitchen devices 110A-N during runtime.

The route determiner 916 can be configured to determine optimal routes for delivering the ordered menu items and orders in which the menu items should be delivered. The routes can be determined based on information that is generated by other components, such as the delivery scheduler 918. The route determiner 916 may also group one or more ordered menu items into cohorts based on which menu items are to be delivered to addresses in close proximity (e.g., along a same route). The route determiner 916 can generate some delivery information 960A-N that is stored in the data store 114, such as a date of delivery (e.g., delivery window), a cohort of menu items, and a delivery route. In some implementations, the route determiner 916 can determine the delivery route(s) before the prep and cook scheduler 912 determines schedules for preparing the ordered menu items. After all, the schedules can depend in part based on the delivery routes. For example, items to be delivered to a farthest location from the kitchen may be prepared and cooked last in the schedule so that the items do not get too cold. In some implementations, items to be delivered last may be prepared and cooked first so that they can be loaded into the delivery boxes first, at a bottom of the delivery boxes.

The delivery scheduler 918 can be configured to determine an order by which to deliver the ordered menu items. In some implementations, the scheduler 918 can generate the cohorts of menu items described above. The delivery scheduler 918 can be a first component to execute in the computer system 102 before a next delivery window. For example, after the delivery scheduler 918 performs its operations, the route determiner 916 can determine optimal routes, then the assembly and packing determiner 914 can determine optimal packing instructions based on an order in which the ordered menu items will be delivered. Finally, the prep and cooking scheduler 912 can determine optimal schedules, directives, and instructions based on the order in which the ordered menu items will be packed in the delivery boxes.

The delivery scheduler 918 can generate labels for each of the ordered menu items. The scheduler 918 may, in some implementations, assign a delivery worker or multiple delivery workers to one or more delivery routes. Moreover, the scheduler 918 may determine which kitchen should be selected for preparing the ordered menu items (or a cohort of the ordered menu items). Any of this information can be stored in the delivery information 960A-N in the data store 114 and used by the other components of the computer system 102, as described above.

The payout engine 920 can be configured to pay chefs when their menus or menu items are ordered by end users. The engine 920 can retrieve payout information, menu item(s), and/or an ID in chef information 958A-N to identify chefs to pay. The engine 920 can also be configured to pay delivery workers whenever they complete deliveries. The engine 920 can retrieve delivery worker information 954A-N from the data store 114 to determine payout information. The delivery worker information 954A-N can include, for example, a delivery worker ID, delivery schedule, location, and/or payout information.

The output generator 922 can be configured to generate any of the GUIs that are described herein and presented in the modules 302, 202, 936, 204, and 206 of the respective devices 104A-N, 106A-N, 108A-N, 110A-N, and 112A-N.

FIGS. 10A-H are example graphical user interfaces (GUIs) that can be presented to end users at their respective user devices for planning and ordering meals. The GUIs in FIGS. 10A-H can be presented at the user devices 106A-N of the end users described throughout this disclosure. Moreover, the GUIs in FIGS. 10A-H can be presented as part of a mobile application that the end users can load and open on their devices. The mobile application can be used to place meal orders, review meal orders, and track deliveries. For illustrative purposes, the GUIs in FIGS. 10A-H are presented at the example user device 106A.

Figure 10A:

FIG. 10A depicts a GUI 1000 for viewing kitchen menus. The end user can search for a particular type of food (e.g., menu items, meals), menu item, and/or kitchen in a search bar presented in the GUI 1000. The GUI 1000 can automatically be populated with kitchens that have the type of food and/or menu item that the end user is searching. The GUI 1000 can also present information about each kitchen, such as a name of the kitchen, an overall rating of the kitchen, types of food the kitchen prepares, and an image for the kitchen. The end user can select any of the kitchens presented in the GUI 1000 to view additional information about the kitchen, such as the kitchen's menu (e.g., refer to FIG. 10B).

In some implementations, a cart notification can also populate the GUI 1000 and cover at least a portion of the kitchens presented therein. The cart notification may not appear if the end user has not yet added any menu items from any kitchens to their cart. Here, the cart notification appears at a bottom of the GUI 1000. The cart notification can indicate how many menu items are currently in the end user's cart, a delivery timeframe, and a delivery location/address. The end user can select the cart notification to view another GUI at the user device 106A that presents information about the end user's cart, as described further below (e.g., refer to FIG. 10D).

Figure 10B:
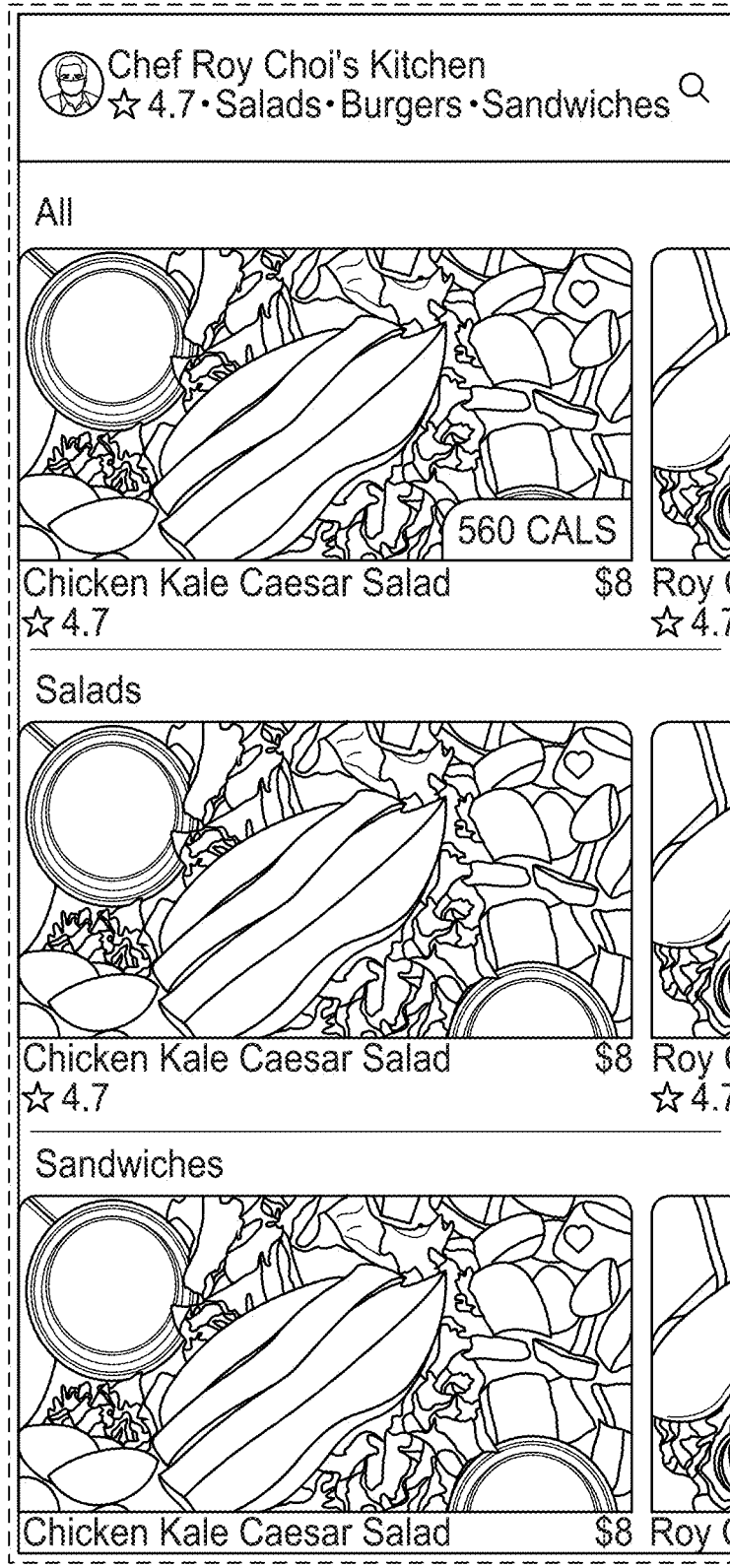

FIG. 10B depicts a GUI 1002 for viewing details about a particular kitchen. When the end user selects a kitchen from the GUI 1000 in FIG. 10A, the user device 106A can present the GUI 1002 for the selected kitchen. The GUI 1002 can include selectable options for different categories or types of menu items provided by the kitchen. For example, as shown in FIG. 10B, the end user can scroll from right to left to view different menu items in different categories. The end user can also search for particular menu items provided by the kitchen using a search bar in the GUI 1002. Each menu item can include an image of the menu item, a rating for menu item, a name of the menu item, a price of the menu item, and optionally nutritional facts about the menu item. One or more additional or fewer information can also be presented per menu item. The end user can select any of the menu items in the GUI 1002 to view additional information about the selected menu item and to add the selected menu item to the cart (e.g., refer to FIG. 10C).

Figure 10C:

FIG. 10C depicts a GUI 1004 for viewing information about a selected menu item from the GUI 1002. In the GUI 1004, the end user can customize the selected menu item and add it to the end user's cart. The end user can select one or more dates to have the selected menu item delivered. As described throughout this disclosure, the disclosed techniques provide calendar-based meal ordering. Therefore, the end user can select multiple days in advance that the menu item can be delivered.

As shown in FIG. 10C, the end user can swipe left and right to pick one or more upcoming delivery dates. The end user can also select a delivery window for delivering the menu item. The end user can further select one or more ingredients to keep or remove from the menu item. Moreover, the end user can select one or more add-on products to include in the order. Once the end user is satisfied with their selection, they can select an option, such as a bottom presented at a bottom of the GUI 1004 to "Add to meal plan." By selecting this option, the end user's selections in the GUI 1004 can be saved and the meal can be added for delivery to the end user's calendar. Selecting the option "Add to meal plan" can also cause another GUI to be presented at the user device 106A that displays information about the end user's cart (e.g., refer to FIG. 10D).

FIG. 10D depicts a GUI 1006 for viewing a cart summary. The GUI 1006 can be presented in response to the end user selecting the cart notification presented in the GUI 1000 in FIG. 10A. The GUI 1006 can also be presented in response to the end user selecting the option to "Add to meal plan" in the GUI 1004 in FIG. 10C.

The GUI 1006 can present information such as a total cost of the menu items in the end user's cart. The GUI 1006 can include selectable options to "Edit cart" and "Empty cart." Selecting either of these options can cause one or more other GUIs to be presented at the user device 106A. The cart can include meal plans for one or more days in the end user's calendar. In the example of FIG. 10D, 2 meal plans are presented, one for Jan. 3, 2020 and another for Jan. 4, 2020. For each of these meal plans, the end user has made a same selection of menu items and a same delivery address. In some implementations, the end user can select different menu items and delivery addresses for each meal plan. Moreover, the menu items that are selected for a meal plan can come from the same or different kitchen menus. Furthermore, the end user can determine additional or fewer meal plans that can be presented in the cart in the GUI 1006.

The GUI 1006 can also present an option for the end user to gift one or more meals. Therefore, end users can pay and gift other meals. In some implementations, third parties, such as advertisers, may also pay and gift the other meals directly. The third parties can also pay for the gifted meals but enable the end users to gift those other meals.

The GUI 1006 also presents a breakdown of the total cost that the end user owes for the menu items in the cart. The GUI 1006 further presents an option to input payment information or select an existing payment method. The end user can also add points, discounts, or other coupons they may have to reduce the total cost that they owe.

The end user can select an option to "Confirm order." Selecting this option can cause the order to be processed as described throughout this disclosure. The end user can also select an option to "continue setting up your meal plans." By selecting this option, the user can modify (e.g., add, delete, etc.) menu items per meal plan on the end user's calendar.

Figure 10E:
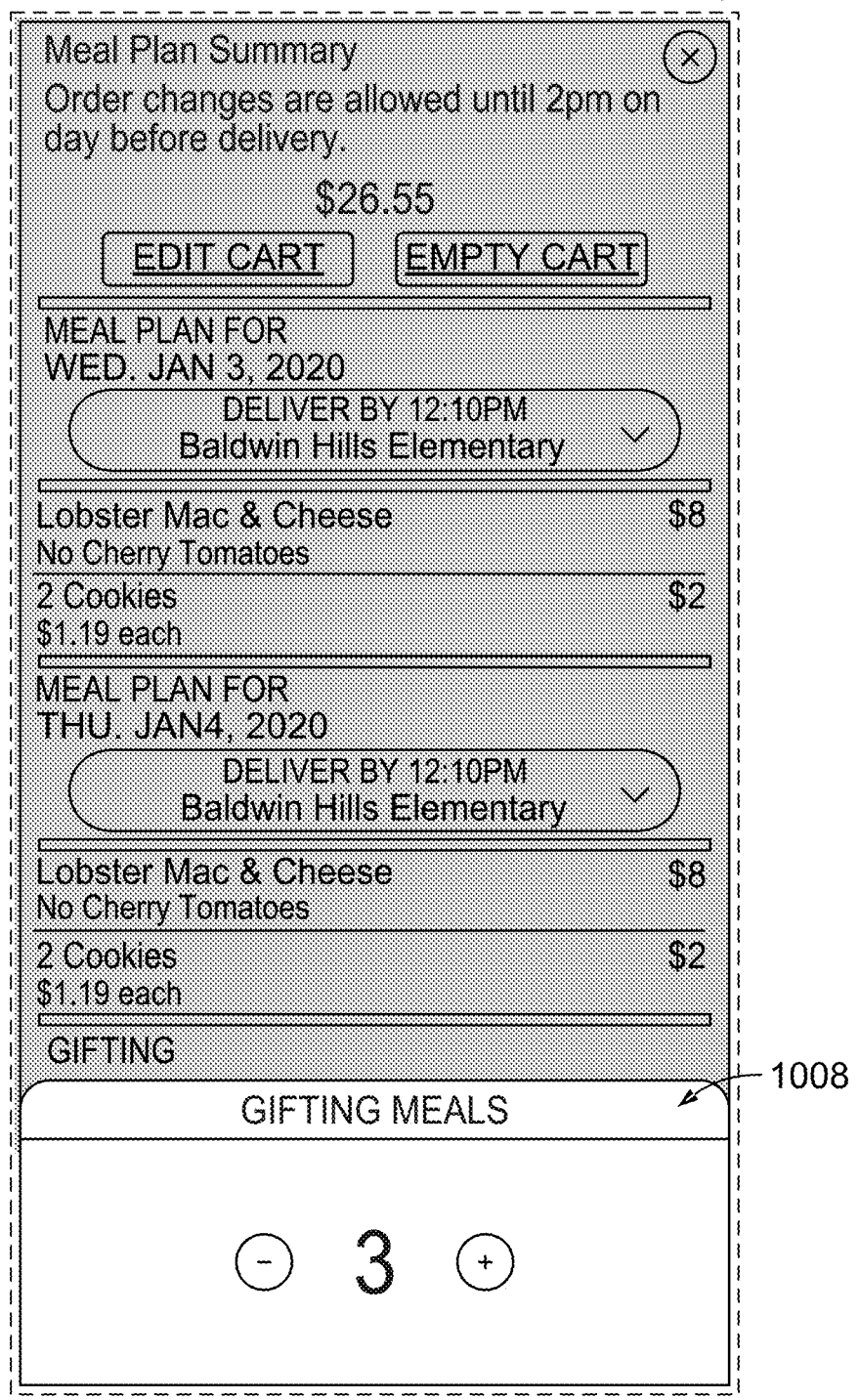

FIG. 10E depicts the GUI 1006 with a portion 1008 for selecting a quantity of meals to gift. As described in reference to FIG. 10D, the end user can select an option to gift one or more meals to families in need from the cart view in the GUI 1006. The GUI 1006 can be updated to present the portion 1008, in which selectable options for increasing and decreasing an amount of gifted meals overlays a bottom section of the GUI 1006. The GUI 1006 can be shaded or represented in another indicia (e.g., grayed out, lower brightness) while the portion 1008 is presented at the user device 106A. The end user can then tap on or select any area of the GUI 1006 to return to viewing the GUI 1006 as presented in FIG. 10D. The gifting meals option in the GUI 1006 can be updated to reflect the user selection in the portion 1008.

Figure 10F:
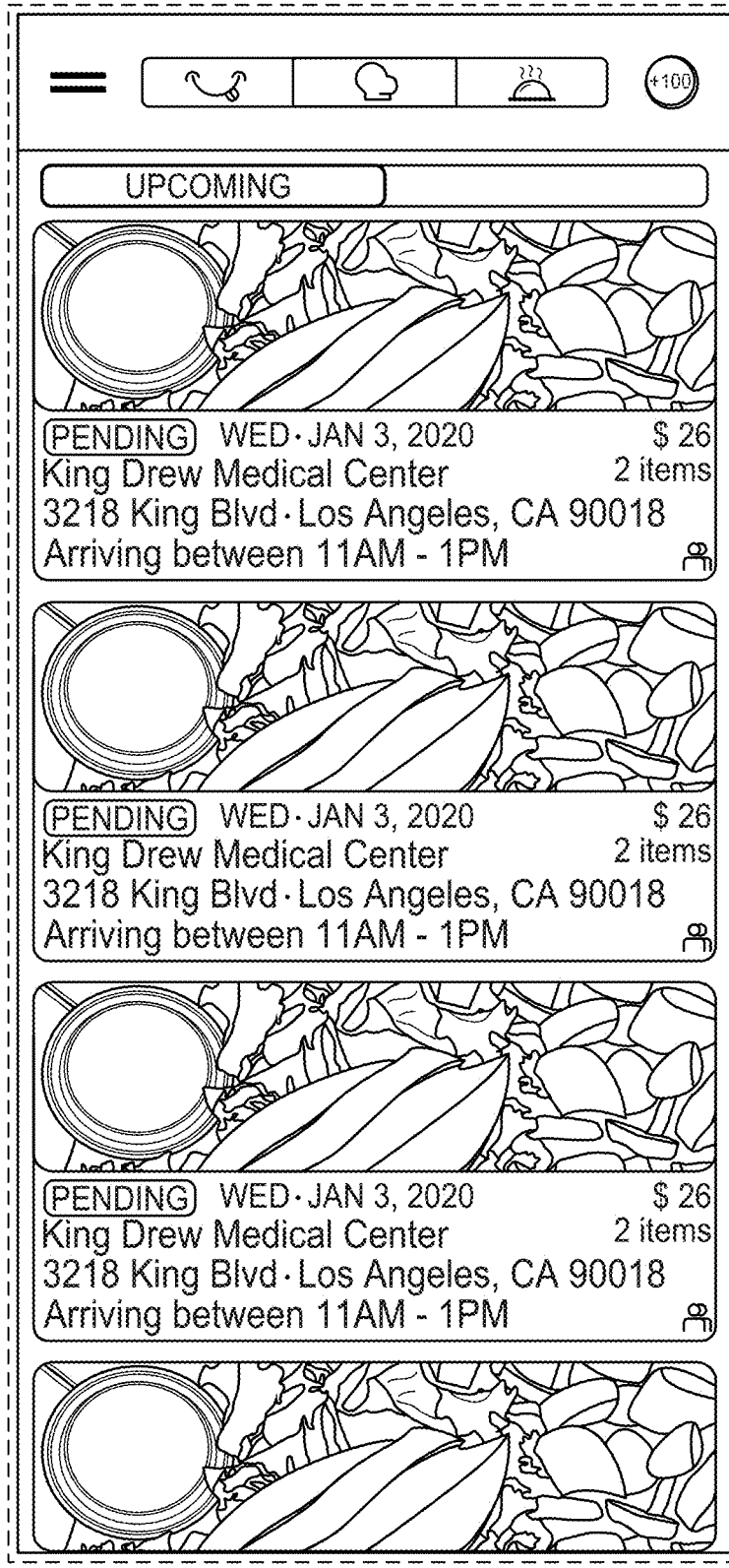

FIG. 10F depicts a GUI 1010 for viewing the end user's orders. The end user may select an option in a menu (e.g., a top menu bar presented in the GUI 1010) having one or more tabs. One of those tabs can be selected so that the end user can view their orders. The end user can toggle between viewing upcoming and past orders. The upcoming orders can include orders for a same day and/or multiple days. For example, the upcoming orders can include all meal plans that were added to the cart and paid for by the end user. The end user can select any of the orders presented in the GUI 1010 to view additional information about the selected order (e.g., refer to FIG. 10G).

Figure 10G:
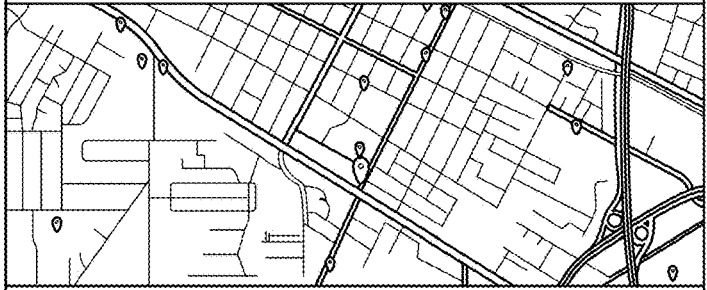

FIG. 10G depicts a GUI 1012 for viewing information about a particular order. The GUI 1012 can be presented at the user device 106A when the end user selects an upcoming order from the GUI 1010 described in FIG. 10F. The GUI 1012 can include information such as whether the order is confirmed, a total cost of the order, a delivery address for the order, menu items to be prepared for the order, status updates on preparation/delivery of the order, an estimated delivery time of the order, and a map that tracks the order while on route to the delivery address. The GUI 1012 can also include a selection option to "Email receipt." By selecting this option, one or more of the information presented in the GUI 1012 can be sent to the end user's email address or another email address that the end user stores in their profile for the mobile application.

Figure 10H:
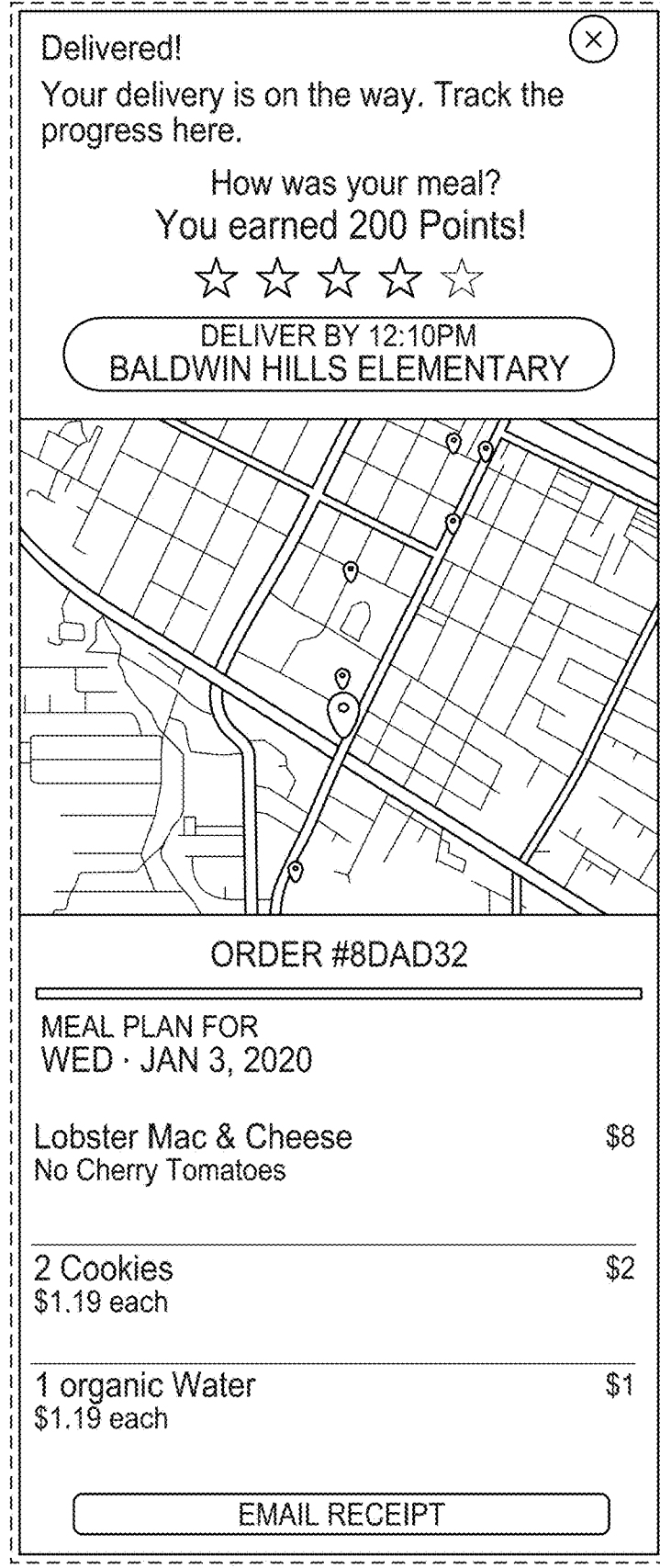

FIG. 10H depicts a GUI 1014 for viewing information about an order after it has been delivered. The GUI 1014 can replace the GUI 1012 described in FIG. 10G once delivery is confirmed. The GUI 1014 can include an option for the end user to rate the order (e.g., the taste/quality of the ordered menu items), the delivery worker, and/or the overall ordering, preparation, and delivery process(es). The GUI 1014 can also include one or more of the information presented in the GUI 1012 and described in FIG. 10G.

FIGS. 11A-G are example GUIs that can be presented to delivery workers at their respective devices for reviewing and performing scheduled delivery tasks. The GUIs in FIGS. 11A-G can be presented at the delivery devices 112A-N of the delivery workers described throughout this disclosure. Moreover, the GUIs in FIGS. 11A-G can be presented as part of a mobile application that the delivery workers can load and open on their devices. The mobile application can be used to review schedules for delivery routes, perform delivery routes, and receive payment for completed delivery routes. For illustrative purposes, the GUIs in FIGS. 11A-G are presented at the example delivery device 112A.

Figure 11A:
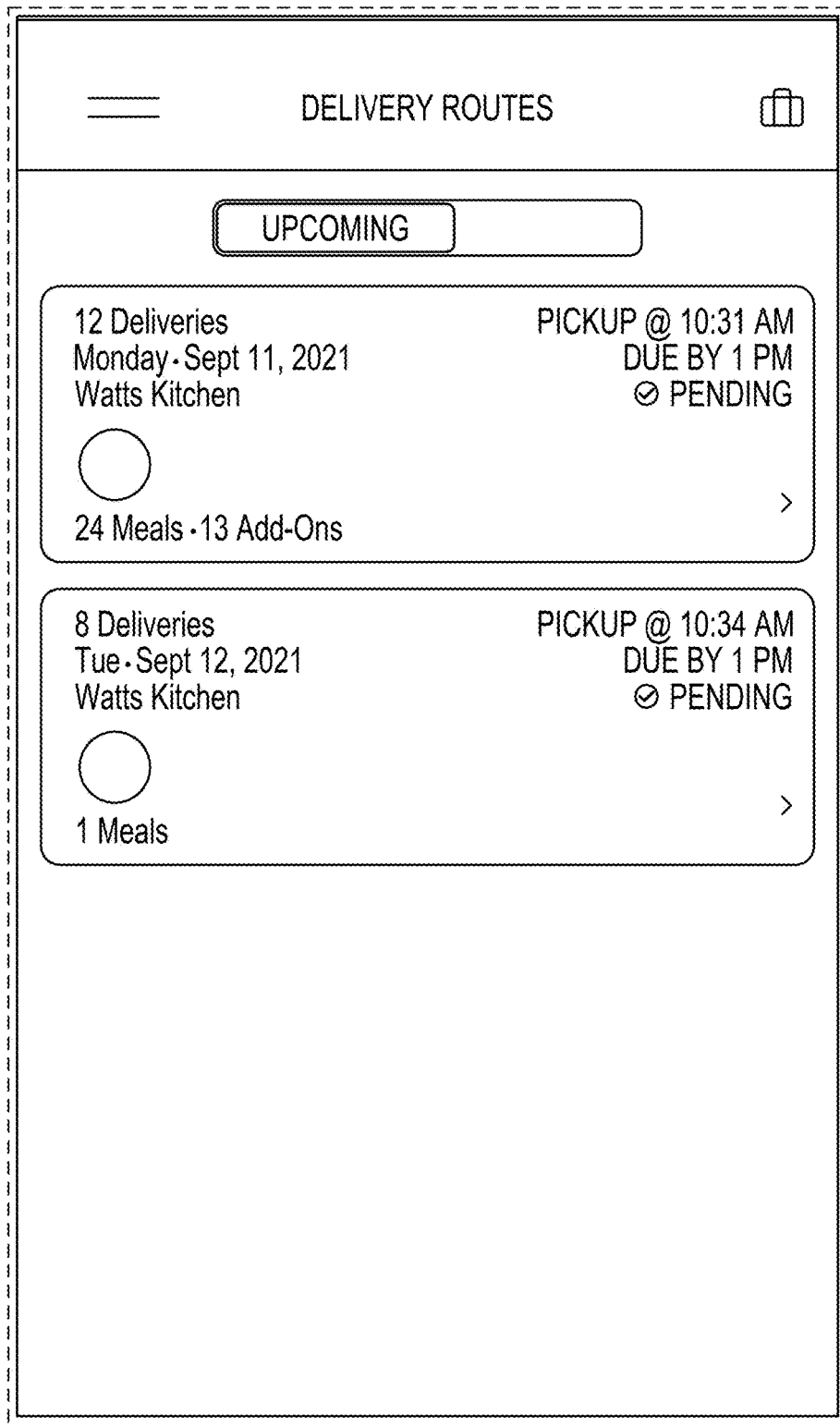

FIG. 11A depicts a GUI 1100 for viewing delivery routes assigned to a delivery worker. The delivery worker can toggle between upcoming and past delivery routes. The delivery worker can select any of the delivery routes in the GUI 1100 to view additional information about the selected delivery route (e.g., refer to FIGS. 11B-E).

Figure 11B:
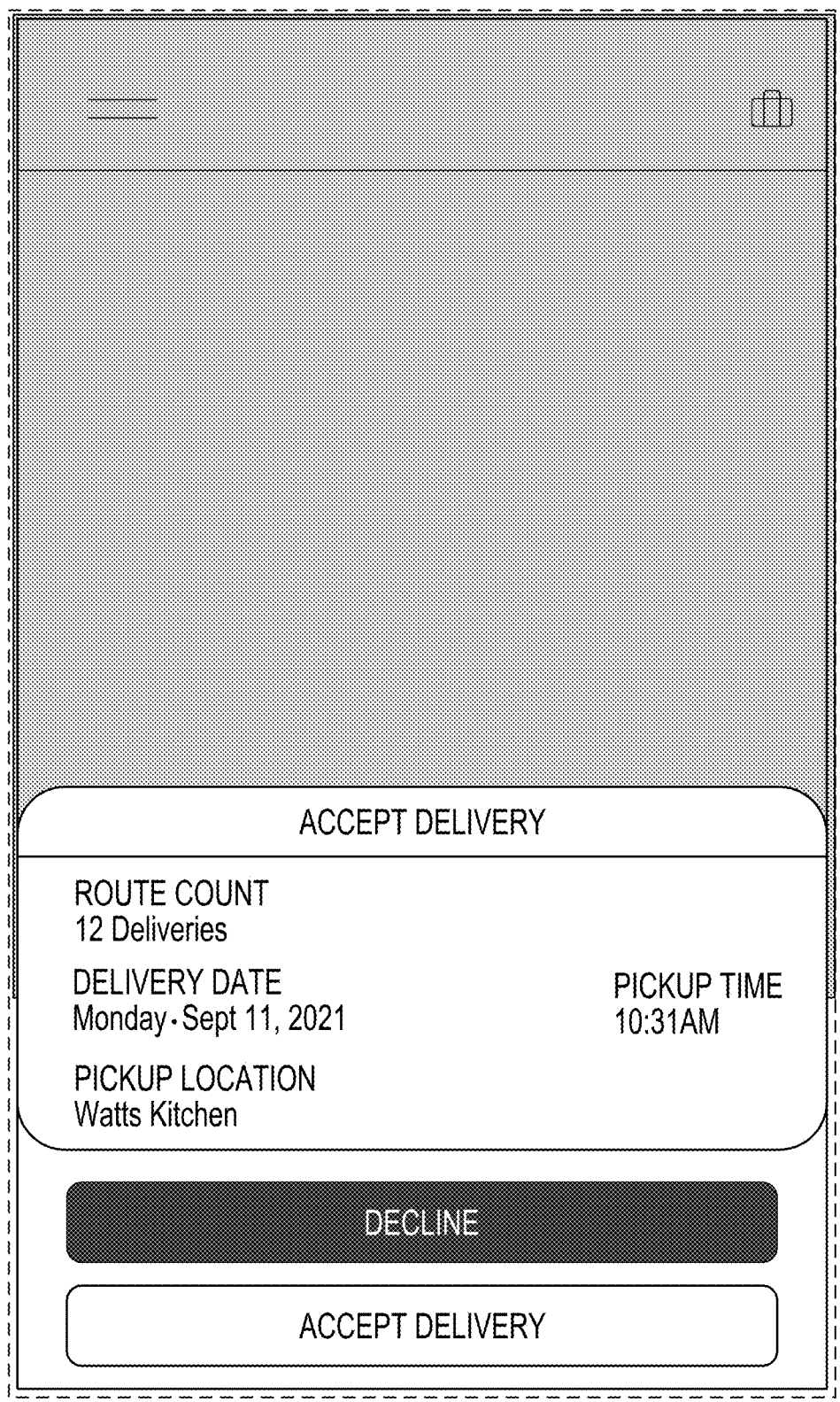

FIG. 11B depicts a GUI 1102 for accepting an upcoming delivery route. The delivery worker can have the option to accept or deny any of the upcoming delivery routes that appear in GUI 1100 described in FIG. 11A. Therefore, the delivery worker can decide what routes they would like to perform. When the delivery worker selects (e.g., taps, clicks on, etc.) one of the upcoming delivery routes in the GUI 1100 in FIG. 11A, the GUI 1102 depicted in FIG. 11B can be presented at the delivery device 112A. The GUI 1102 can present information about the upcoming delivery route including how many deliveries are to be made along that route, a delivery date, a pickup location, and a pickup time. The GUI 1102 can also include selectable options to "Decline" and "Accept delivery." When the delivery worker selects the option to "Decline," the GUI 1100 can be presented at the delivery device 112A and the upcoming delivery route that was declined may be removed from the GUI 1100. When the delivery worker selects the option to "Accept delivery," another GUI can be presented at the delivery device 112A and can include additional information about the delivery route (e.g., refer to FIGS. 11C-E).

Figure 11C:
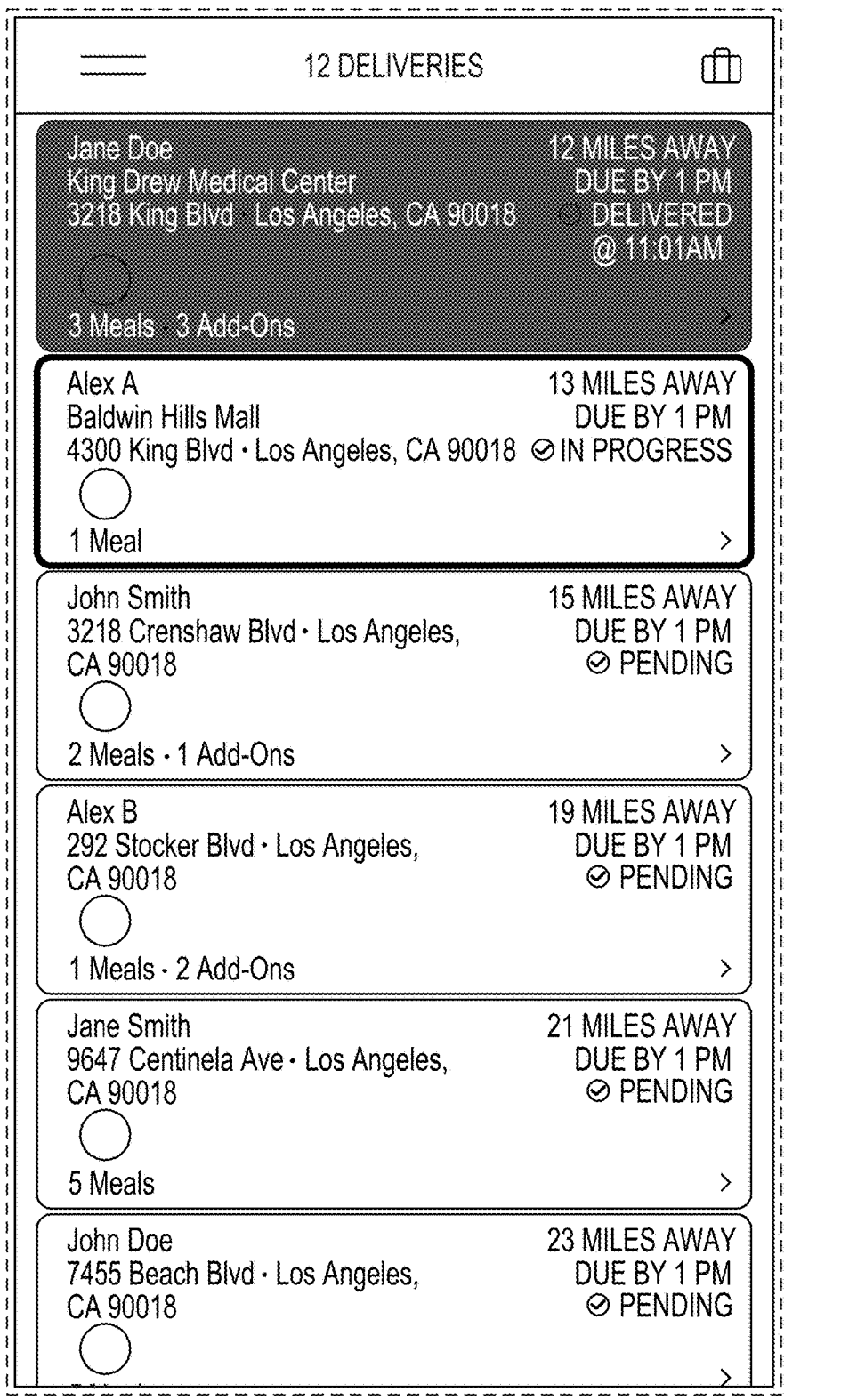

FIG. 11C depicts a GUI 1104 for viewing additional information about an upcoming delivery route. As mentioned above, the GUI 1104 can be presented when the delivery worker accepts an upcoming delivery route. The GUI 1104 can include information such as a list of each delivery to be made along the route. The delivery worker can select any of the listed deliveries to view additional information about the selected delivery (e.g., refer to FIGS. 11D-E). When a delivery is made/completed, the delivery can be grayed out in the GUI 1104. As a result, the delivery worker may not be able to select the completed delivery to view additional information about it.

Each delivery in the list can include information such as an end user's name (or a recipient), a delivery address, a quantity of meals for that delivery, a distance between the delivery worker's current location and the delivery address, a time at which the delivery is due to be delivered, and/or a status check. The status check can indicate whether the delivery was delivered, in progress, and/or pending. The GUI 1104 can be automatically updated whenever deliveries are made and/or based on real-time movement/tracking of the delivery worker along the delivery route.

Figure 11D:
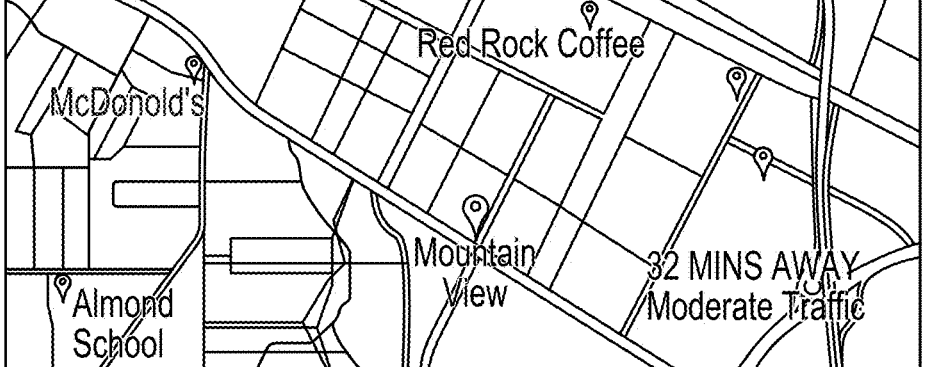

FIG. 11D depicts a GUI 1106 for viewing information about a particular delivery along a delivery route. The GUI 1106 can be presented at the delivery device 112A in response to the delivery worker selecting a delivery from the list of deliveries in the GUI 1104 of FIG. 11C. The GUI 1106 can include information such as a map indicating the delivery address, an estimated amount of time it would take to reach the delivery address, an estimated amount of traffic, and/or real-time tracking of the delivery worker on route to the delivery address. The GUI 1106 can also present information such as a delivery address, a window of time to complete the delivery, a customer (who can be the same as or different than a delivery recipient), a list of menu items for that delivery, and/or delivery notes. The GUI 1106 can also present a selectable option to "Mark as delivered." Selecting the option to "Mark as delivered" can cause the GUI 1106 to be updated, as shown and described in FIG. 11E.

FIG. 11E depicts the GUI 1106 overlaid with a portion 1108 for confirming delivery. When the delivery worker selects the option "Mark as delivered" in the GUI 1106 as described in FIG. 11D, the portion 1108 can be presented over a bottom section of the GUI 1106. The rest of the GUI 1106 can be greyed out or represented in another indicia. In the portion 1108, the delivery worker can add a comment about the delivery and select between "Failed delivery" and "Successful delivery." The delivery worker can then select an option to "Submit" the confirmation.

Once the delivery worker selects the "Submit" option, the portion 1108 can be removed from the GUI 1106. The GUI 1106 can be presented as shown and described in FIG. 11D. In some implementations, selecting the "Submit" option can cause the GUI 1104 in FIG. 11C to be presented at the delivery device 112A. The GUI 1104 can then be updated to grey out the delivery that was marked as successful and completed. The delivery worker can then select on a next delivery in the list of deliveries in the GUI 1104.

Figure 11F:

FIG. 11F depicts a GUI 1110 for viewing all of the delivery worker's transactions. The delivery worker can access the GUI 1110 by selecting an option from a menu presented at their device. For example, a home screen in a delivery worker application can include a menu icon. The delivery worker can select the menu icon and then select an option (e.g., tab) to view their transactions. The GUI 1110 can include a search bar that the delivery worker can use to search for particular transactions. The GUI 1110 may also include one or more filtering options to view the transactions. Each transaction can correspond to a delivery that the delivery worker has completed. One or more transactions can also correspond to deliveries that are currently pending and not yet completed by the delivery worker. The delivery worker, for example, can filter or sort the transactions from most expensive to least expensive, based on what deliveries have been paid for, based on what deliveries have been completed or are currently pending, etc.

The GUI 1110 can indicate how much money the delivery worker is owed (e.g., "Unpaid"), how much money the delivery worker has earned over a past quantity of days (e.g., "Last 30"), and how much money the delivery worker has earned since the delivery worker's first delivery (e.g., "Lifetime"). Payout protocols may vary depending on delivery services used with the disclosed techniques. For example, amounts owed to delivery workers can be calculated and assigned based on a delivery worker's performance. In some implementations, the disclosed techniques can provide payout to a delivery service that then pays the delivery workers. Each delivery can have a value (e.g., revenues per meal plus tip) that can be added to a total amount due a delivery worker for the delivery route they are assigned. Once the delivery route is completed, the total amount due to the delivery worker can be a total revenue for the delivery route plus tips, less any revenues plus tips of deliveries that were unsuccessfully completed along the route.

Figure 11G:
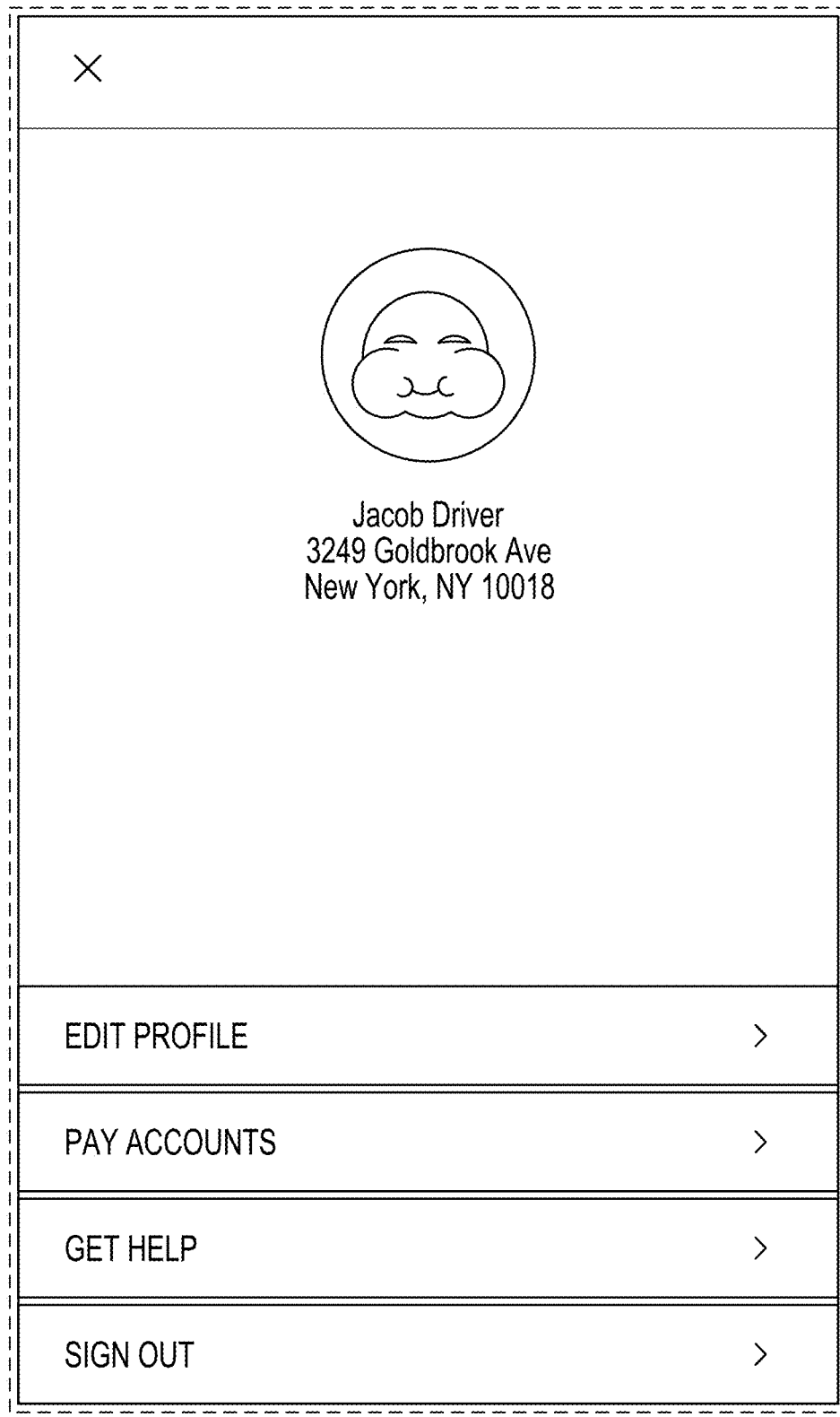

FIG. 11G depicts a GUI 1112 including a menu of options from which the delivery worker can select. The GUI 1112 can be presented at the delivery device 112A when the delivery worker loads or opens the mobile application. The GUI 1112 can present selectable options for "Edit profile," "Pay accounts," "Get help," and "Sign out." Upcoming deliveries can be presented in a home screen or home view at the delivery device 112A. Pay accounts can be used for allowing the delivery worker to upload their payment information so that they can be paid directly using the disclosed techniques.

FIGS. 12A-B are example GUIs that can be presented to kitchen staff at their respective devices for reviewing and performing scheduled meal preparation tasks. The GUIs in FIGS. 12A-B can be presented at the kitchen devices 110A-N of the kitchen staff described throughout this disclosure. Moreover, the GUIs in FIGS. 12A-B can be presented as part of a mobile application that the kitchen staff can load and open on their devices. The mobile application can be used to view preparation, cooking, and packing instructions for a delivery window. For illustrative purposes, the GUIs in FIGS. 12A-B are presented at the example kitchen device 110A.

FIG. 12A depicts a GUI 1200 for a task scheduler. The GUI 1200 can be a calendar indicating various tasks that a particular kitchen staff has been assigned for a particular delivery window. The tasks can be broken up into categories in the calendar, such as preparation, cooking, packaging, and delivery tasks. In the example of FIG. 12A, the particular kitchen staff has been assigned tasks in preparation and cooking. The tasks can be presented in the calendar at times at which the kitchen staff is expected to complete the tasks. The calendar can also include a visual indication, such as a vertical line, that indicates a current time. This visual indication can be used by the kitchen staff to gauge how efficient they are and/or whether they are on time with completing the tasks they have been assigned.

Each category of tasks can include a visual representation of an amount of time it is expected for the kitchen staff to complete all the tasks in the category. For each category of tasks, visual representations of an amount of time expected to complete each task can also be presented in the GUI 1200. As a result, the kitchen staff can view a visual breakdown of time for each task to get a better sense of how and when they are completing tasks during their shift. Accordingly, the GUI 1200 can also include an estimated amount of time it would take the kitchen staff to complete each of the assigned tasks as well as an actual amount of time it takes the kitchen staff.

The kitchen staff can select options to "Start" and "End" each task that is presented in the GUI 1200. When the kitchen staff selects an option to start a task, a timer can begin to keep track of how long it takes the kitchen staff to complete the task. An estimated amount of time to complete the task can be outputted to replace the "Start" option for that particular task. Once the kitchen staff selects the "End" option, this option can be replaced with an actual amount of time that it took the kitchen staff to complete the particular task. This information can be beneficial to determine efficiency of the kitchen staff by comparing the estimated completion time to the actual completion time.

FIG. 12B depicts the GUI 1200 with task notifications 1202, 1204, and 1206. The notifications can be automatically shown based on an expected amount of time that a particular task should be worked on and/or completed. The notifications 1202, 1204, and 1206 can overlay a portion of the GUI 1200. Additional or fewer notifications can be presented in the GUI 1200. For example, the more tasks the kitchen staff falls behind in completing or starting, the more notifications that may populate a portion of the GUI 1200.

Here, the notifications 1202, 1204, and 1206 indicate three preparation tasks that the kitchen staff must complete. The notification 1202 is represented in a first indicia, such as a color orange. The first indicia can indicate a level of urgency for the kitchen staff to complete the corresponding task. The notification 1202 is presented in orange, which can indicate a medium level of urgency. The notification 1202 further includes an estimated time to complete the corresponding task, a start time, and an end time. The notification 1202 also includes an elapsed amount of time that the kitchen staff has been working on the task. Moreover, the notification 1202 includes a selectable option to "End task." Selecting this option can cause the notification 1202 to disappear from the GUI 1200 and for the task to be marked as complete. The kitchen staff can then proceed to the next task to complete.

The notification 1204 is represented in a second indicia, such as a color red. The second indicia can indicate a level of urgency to complete the task. The red color can indicate a high level of urgency, which may mean that the kitchen staff has not yet started the task or is running behind schedule on completing the task (e.g., while the task is in progress or the task has not been started yet). Similar to the notification 1202, the notification 1204 can include an estimated time to complete, a start time, an end time, an amount of time that the task is overdue, and a selectable option to "Start task."

The notification 1206 can be represented in the first indicia, such as the color orange, thereby indicating that the corresponding task has a medium level of urgency. Similar to the notifications 1202 and 1204, the notification 1206 can include an estimated time to complete, a start time, an end time, an amount of time in which the kitchen staff should begin the task, and a selectable option to "Start task."

FIGS. 13A-G are example GUIs that can be presented to relevant users at their respective devices for generating and updating menu items at a kitchen. The GUIs in FIGS. 13A-G can be presented at the chef devices 104A-N of the chefs and/or the kitchen devices 110A-N of the kitchen staff described throughout this disclosure. Moreover, the GUIs in FIGS. 13A-G can be presented as part of a mobile application that the relevant users can load and open on their devices. The mobile application can be used to view and update kitchen menus and view and update menu items. For illustrative purposes, the GUIs in FIGS. 13A-G are presented at an example user device 1300.

FIG. 13A depicts a GUI 1302 for managing menus across multiple kitchens. The GUI 1300 can include a searchable list of kitchens. The relevant user can select any of the kitchens from a left pane in the GUI 1302 to view information about the selected kitchen in an adjacent right pane. The right pane can include a name of the kitchen, a tagline for the kitchen, a description, address, and current inventory. Any of the information presented in the right pane can be edited by the relevant user. The relevant user can also search the current inventory in the kitchen using a search bar presented in the right pane. The current inventory can be presented as a table including ingredient names, size/stock unit, supplier name, and SKU. Although the current inventory is shown for two SKUs (2 types of red onions), the current inventory can also include any other SKUs available in the respective kitchen, such as chicken filets, salmon filets, pickles, tomatoes, apples, and any other type of produce and/or foods that may be available in the kitchen. The table can also include selectable icons to view additional information about an ingredient in the current inventory (e.g., by selecting an icon shaped like an eye). The table can also include a selectable icon such as a red circle and/or an 'X' symbol next to an ingredient in the current inventory. Selecting this icon can cause a reduction to made to that ingredient in stock. In other words, kitchen staff can select that icon to update the GUI 1302 to indicate less stock of that particular ingredient in the kitchen.

Figure 13B:
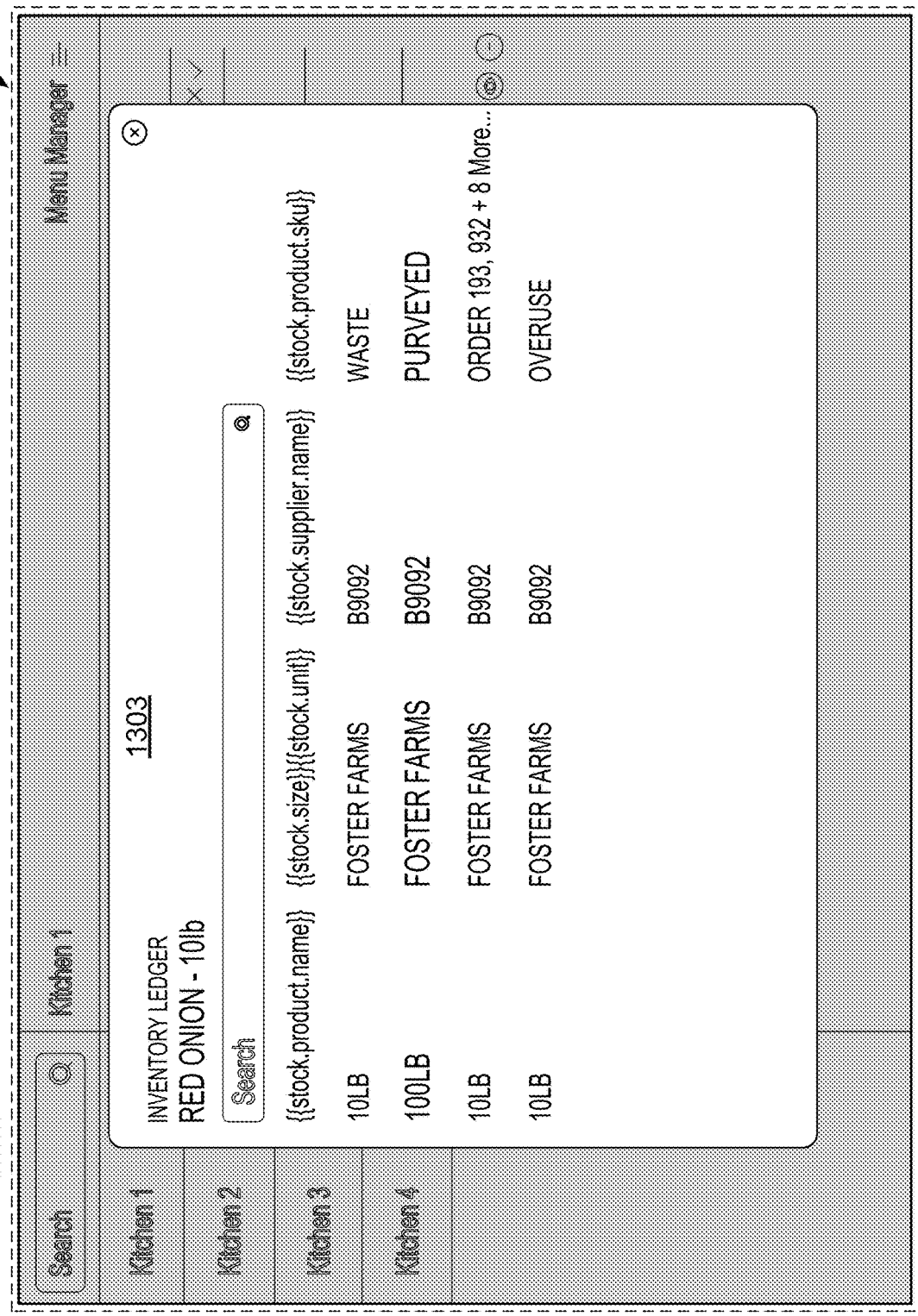

FIG. 13B depicts the GUI 1302 overlaid with a pop out window 1303 for an inventory ledger. The pop out window 1303 can appear over a portion of the GUI 1302 when the relevant user selects the eye icon next to the inventory table described in FIG. 13A. The pop out window 1303 can include a search bar. The pop out window 1303 can also include a ledger of ingredients. Some ingredients can be represented in different colors (e.g., indicia). For example, some ingredients can be represented in a red color, which indicates a debit, and some ingredients can be represented in a green color, which indicates a credit. The pop out window 1303 can show a ledge for any particular SKU selected from the GUI 1302 in FIG. 13A.

FIG. 13C depicts a GUI 1304 for editing a menu item for a kitchen. In the GUI 1302 described in FIG. 13A, the relevant user can select an option to "View menu" for a kitchen that is presented in the right pane. Selecting the option can cause the GUI 1304 to be presented at the user device 1300.

The GUI 1304 can include a left pane and a right pane adjacent to the left pane. The right pane can include a list of all menu items that are offered by the selected kitchen. The right pane can be populated with information about a menu item that the relevant user can select from the list in the left pane. In the example of FIG. 13C, the relevant user has selected "Korean BBQ Sandwich" from the list of menu items in the left pane for "Kitchen 1." As a result, the right pane is populated with information about the "Korean BBQ Sandwich."

The right pane can include editable fields for a name of the menu item, a description, ingredients, preparation tasks, cook tasks, assemble tasks, pack tasks, and inventory. The right pane can also present a SKU for the menu item. The SKU may not be editable by the relevant user. In some implementations, the SKU can be an editable field in the GUI 1304.

In the example of FIG. 13A, the right pane includes one prep task. The relevant user can add additional prep tasks for the particular menu item. The relevant user can also remove any one or more prep tasks that are listed for the particular menu item. Similarly, the relevant user can add and/or remove cook, assemble, and pack tasks for the particular menu item.

Figure 13D:
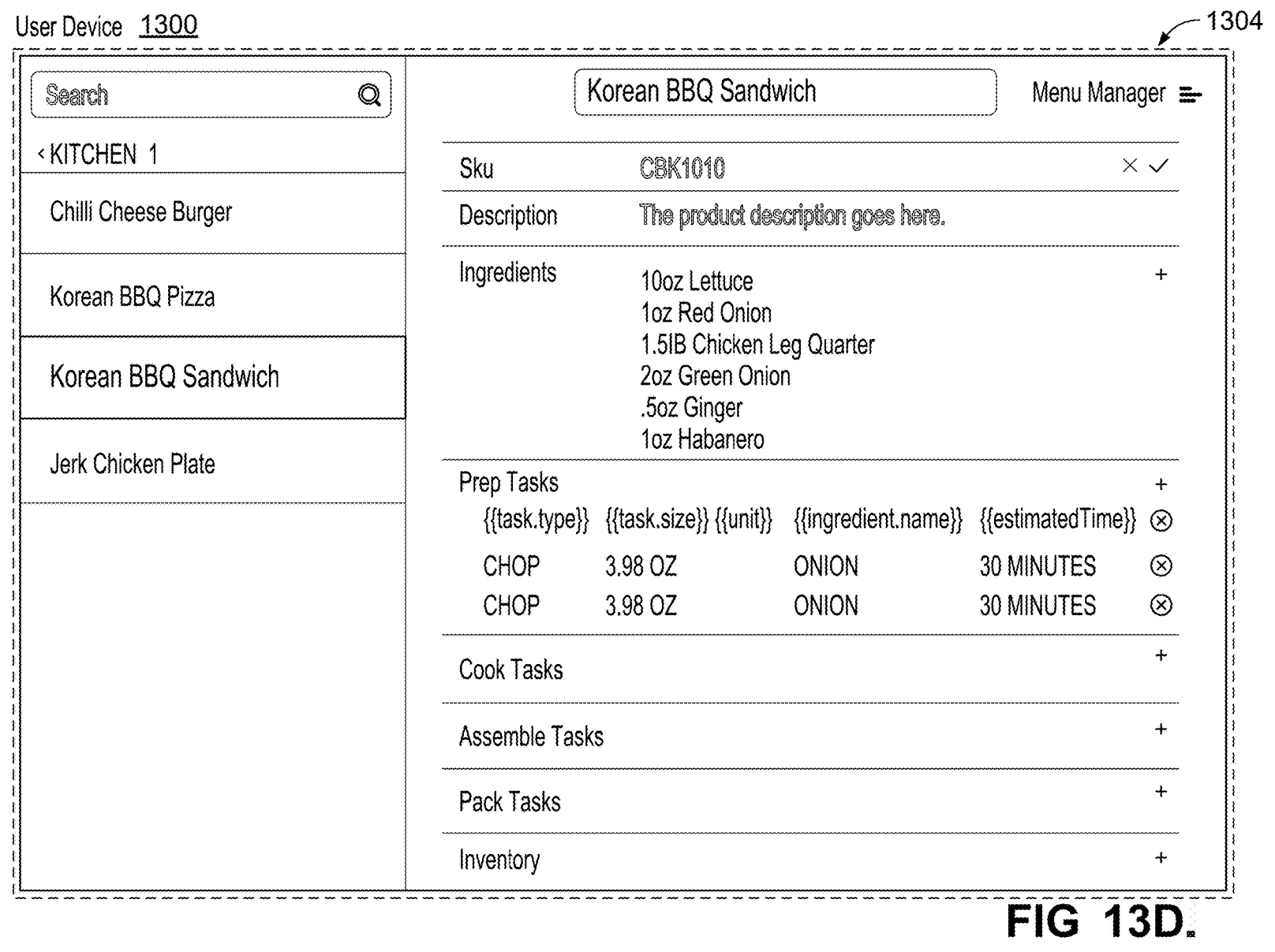

FIG. 13D depicts the GUI 1304 for editing the menu item described in FIG. 13C. In comparison to the GUI 1304 in FIG. 13C, the GUI 1304 in FIG. 13D has been populated with additional information about the particular menu item—the "Korean BBQ Sandwich." For example, the relevant user can confirm or remove the SKU. The relevant user can also add or remove any of the listed ingredients for the menu item. Moreover, 2 prep tasks have been added, both of which indicate a type of task, a unit amount that is involved in the task, an ingredient that is involved in the task, and an estimated time to complete the task. The relevant user can also add one or more ingredients, prep tasks, cook tasks, assemble tasks, and/or pack tasks by selecting respective plus (+) icons presented in the GUI 1304.

Figure 13E:
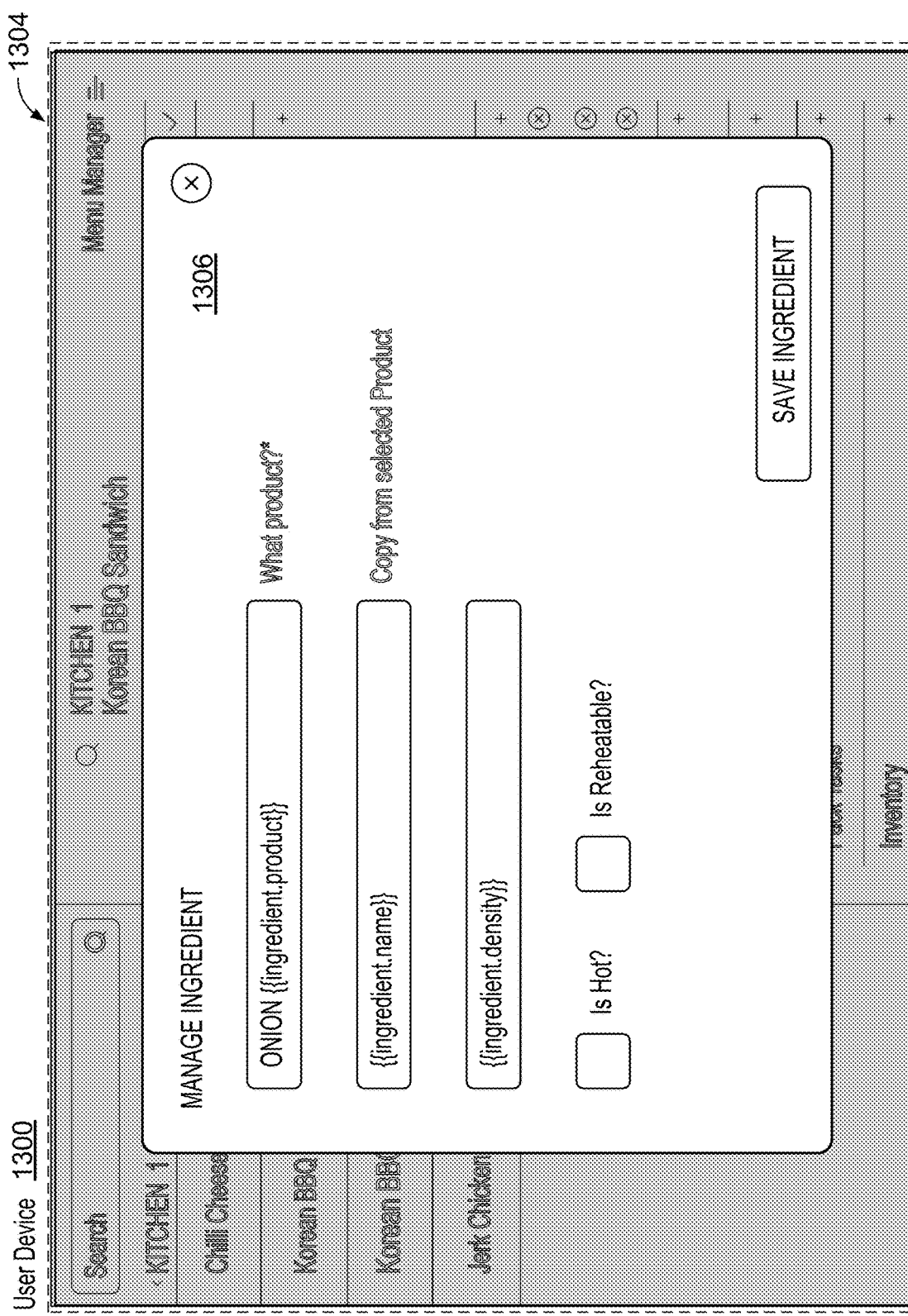

FIG. 13E depicts a pop out window 1306 overlaying the GUI 1304 for adding an ingredient for the particular menu item. The relevant user can select the plus (+) icon next to "Ingredients" in the GUI 1304 described in FIGS. 13C-D in order to view the pop out window 1306. The pop out window 1306 can be presented over a portion of the GUI 1304, as shown in FIG. 13E. Moreover, the GUI 1304 can be grayed out or represented in another indicia (e.g., decreased brightness) when the pop out window 1306 overlays the portion of the GUI 1304.

The pop out window 1306 can include input fields for an ingredient type, an ingredient name, and an ingredient density (e.g., unit size, an amount of the ingredient needed to prepare the particular menu item). The relevant user can select the ingredient type and the ingredient density from respective dropdown menus. The ingredient name input field can be automatically populated with the user-selected ingredient type from the dropdown menu. The relevant user can also manually input the ingredient name. The relevant user can also select options for whether the ingredient is hot and/or reheatable. Once the input fields in the pop out window 1306 are filled in, the relevant user can select an option to "Save ingredient." Selecting this option can cause the pop out window 1306 to close and for the GUI 1304 to be presented in full color/opacity/brightness as depicted and described in FIGS. 13C-D. Moreover, the "Ingredients" section in the GUI 1304 can be updated to include information for the newly added ingredient.

Figure 13F:
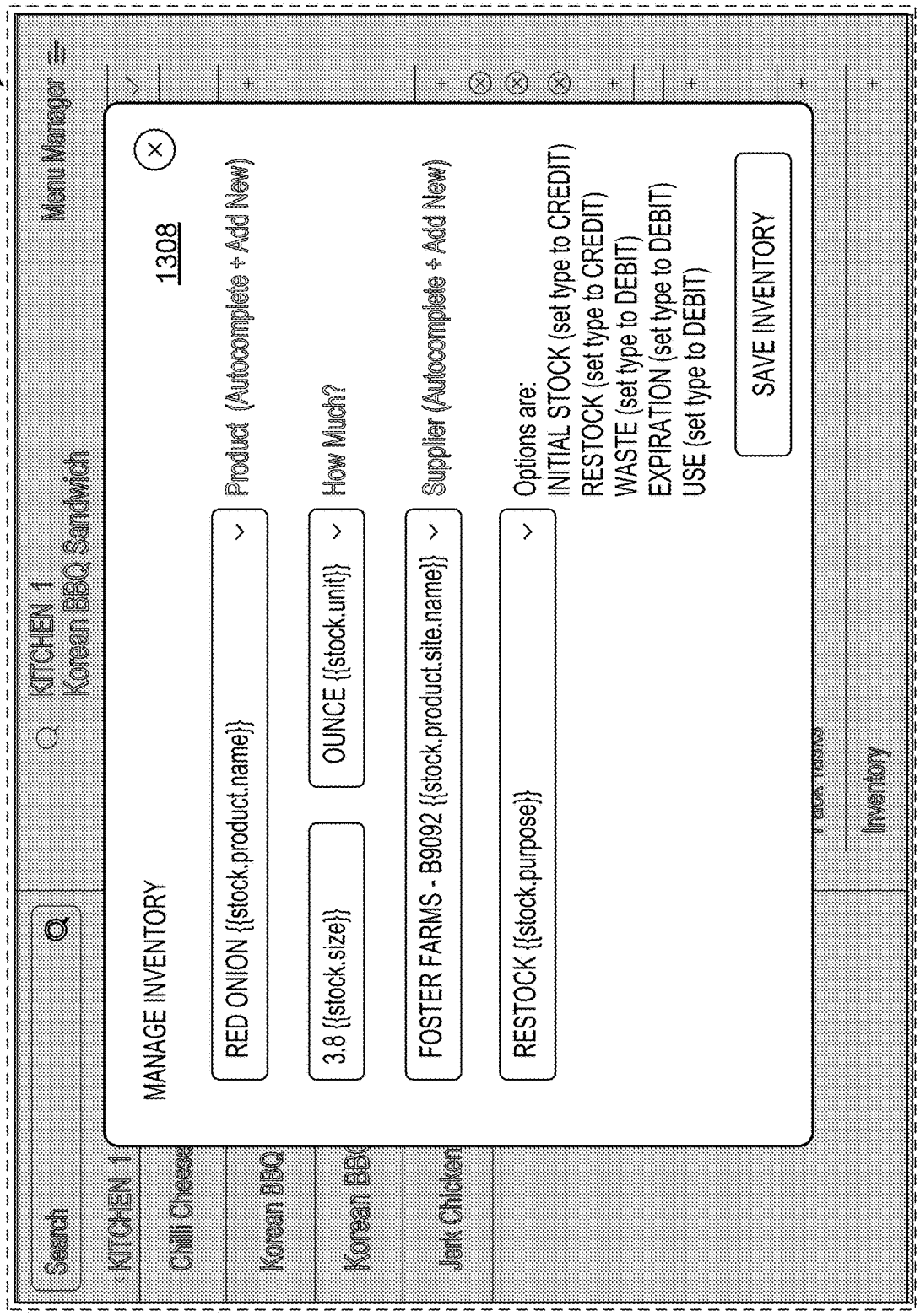

FIG. 13F depicts a pop out window 1308 overlaying the GUI 1304 for adding an ingredient as inventory for the kitchen. In FIGS. 13C-D, a plus icon can appear near to the "Inventory" section. The relevant user can select the plus icon to add ingredients to the kitchen inventory. Selecting the plus icon can cause the pop out window 1308 to be presented over a portion of the GUI 1304, as shown in FIG. 13F. Moreover, the GUI 1304 can be grayed out or represented in another indicia (e.g., decreased brightness) when the pop out window 1308 overlays the portion of the GUI 1304.

The pop out window 1308 can include input fields for an ingredient name, a quantity of the ingredient that is in stock, a unit of measurement for the stock quantity, a supplier, and one or more restocking options. The relevant user can select the ingredient name, the unit of measurement, the supplier, and/or the restocking options from dropdown menus. The relevant user can manually input the quantity of the ingredient that is in stock. In some implementations, the ingredient name and/or the supplier can be autocompleted. In some implementations, the relevant user can also manually input or add new ingredient names and/or suppliers. The relevant user can also select from a variety of restocking options that can include but are not limited to "Initial stock" (in which a type of restocking can be set to credit), "Restock" (in which the type can be set to credit), "Waste" (in which the type can be set to debit), "Expiration" (in which the type can be set to debit), and "Use" (in which the type can be set to debit).

Once the input fields in the pop out window 1308 are filled in, the relevant user can select an option to "Save inventory." Selecting this option can cause the pop out window 1308 to close and for the GUI 1304 to be presented in full color/opacity/brightness as depicted and described in FIGS. 13C-D. Moreover, the "Inventory" section in the GUI 1304 can be updated to include information for the newly updated or added inventory.

Figure 13G:
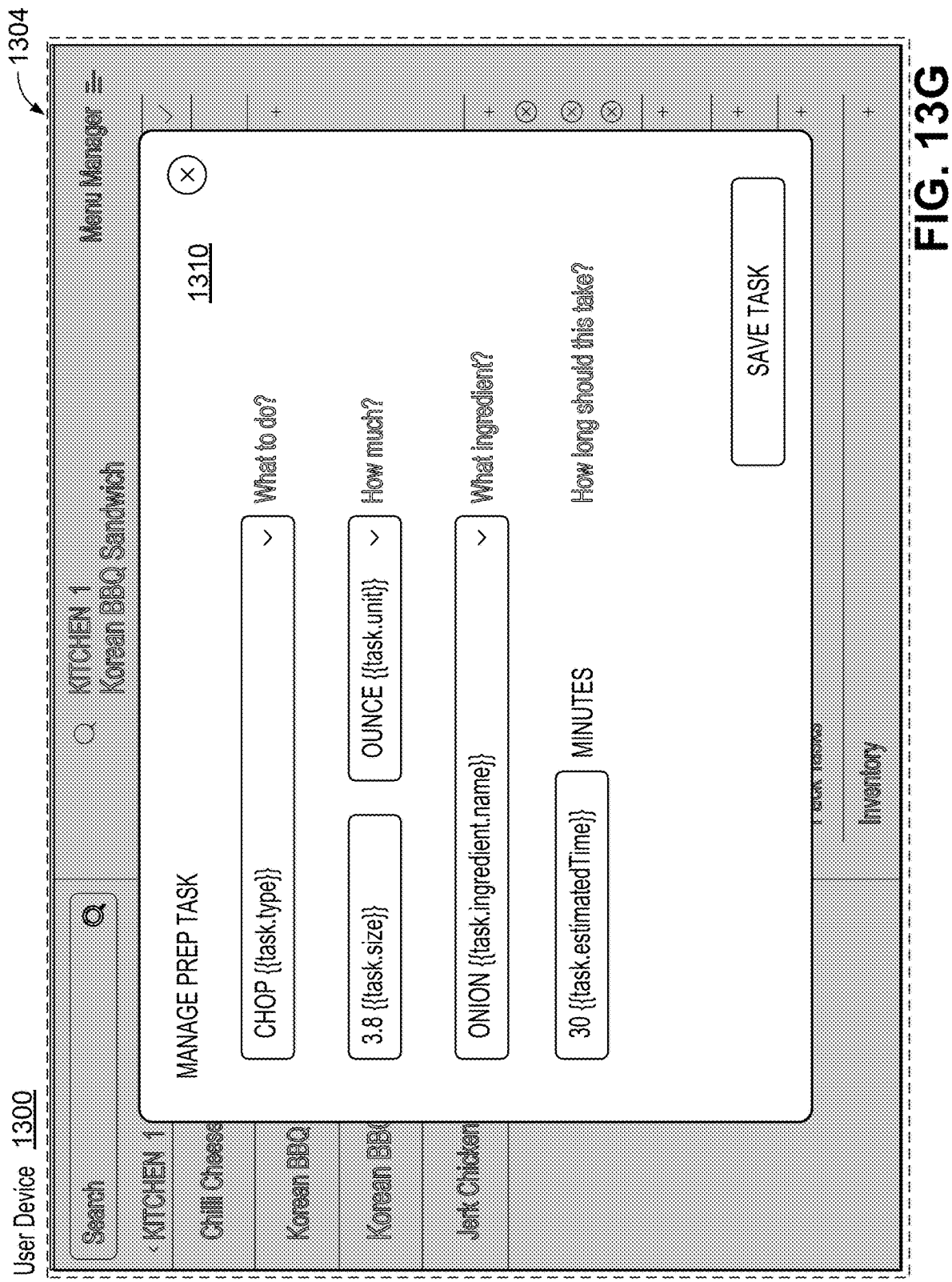

FIG. 13G depicts a pop out window 1310 overlaying the GUI 1304 for adding or managing a prep task for the particular menu item. In FIGS. 13C-D, as described above, the relevant user can select the plus icon in the "Prep Tasks" section. The relevant user can select the plus icon to add prep tasks for the particular menu item. Selecting the plus icon can cause the pop out window 1310 to be presented over a portion of the GUI 1304, as shown in FIG. 13G. Moreover, the GUI 1304 can be grayed out or represented in another indicia (e.g., decreased brightness) when the pop out window 1310 overlays the portion of the GUI 1304.

The pop out window 1310 can include input fields for a task type, a task size, a unit of measurement for the task size, an ingredient that is involved in the task, and an estimated amount of time to complete the task. The relevant user can select the task type, the unit of measurement, and the ingredient from dropdown menus. The relevant user can manually input the task size and the estimated amount of time to complete the task.

Once the input fields in the pop out window 1310 are filled in, the relevant user can select an option to "Save task." Selecting this option can cause the pop out window 1310 to close and for the GUI 1304 to be presented in full color/opacity/brightness as depicted and described in FIGS. 13C-D. Moreover, the "Prep Task" section in the GUI 1304 can be updated to include information for the newly updated or added task(s). Moreover, pop out windows that are similar to or the same as the pop out window 1310 can be presented to the relevant user when the relevant user selects the plus icon to add cook tasks, assemble tasks, and/or pack tasks.

Figure 14:
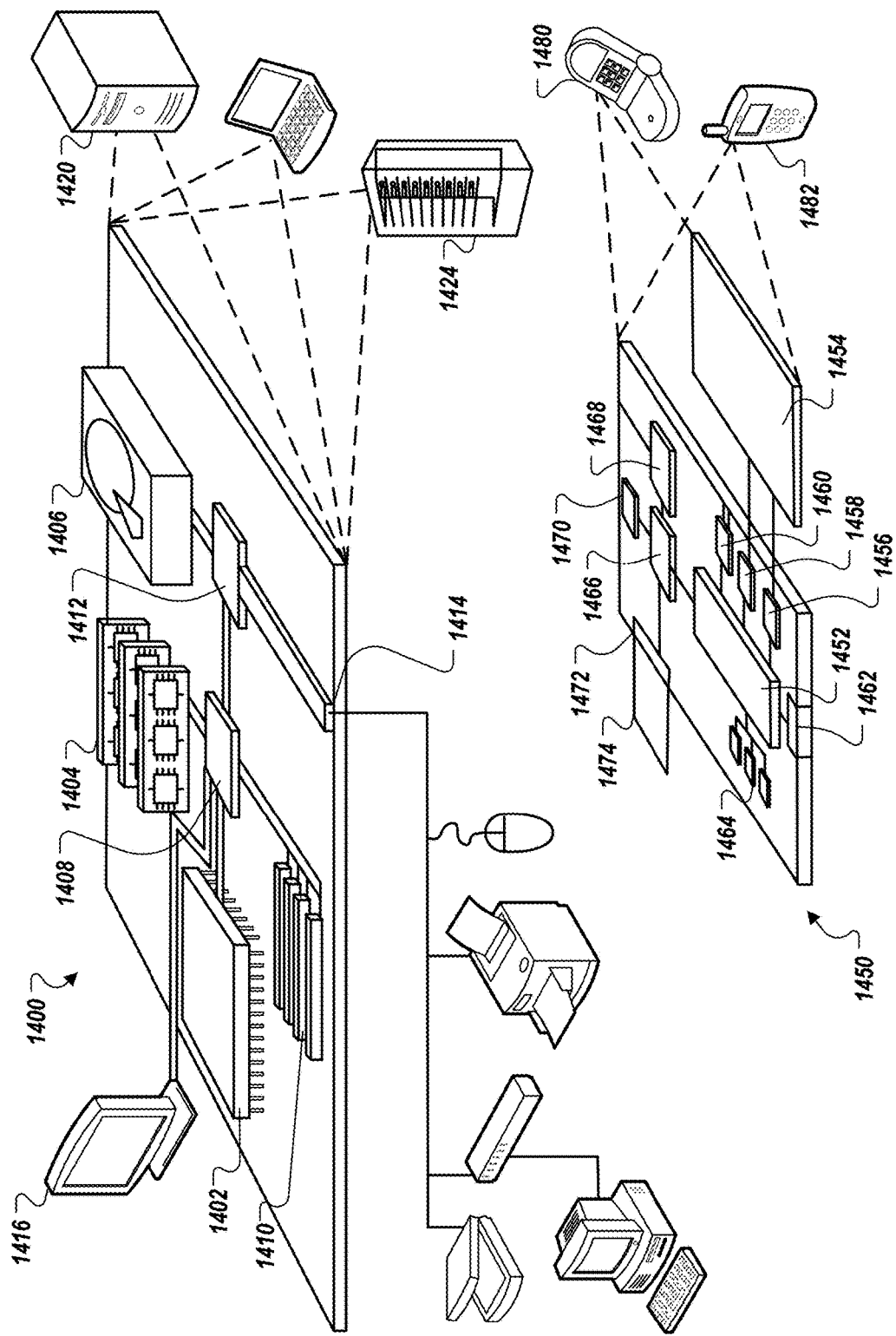
FIG. 14 is a schematic diagram that shows an example of a computing device and a mobile computing device.

FIG. 14 shows an example of a computing device 1400 and an example of a mobile computing device that can be used to implement the techniques described here. The computing device 1400 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1400 includes a processor 1402, a memory 1404, a storage device 1406, a high-speed interface 1408 connecting to the memory 1404 and multiple high-speed expansion ports 1410, and a low-speed interface 1412 connecting to a low-speed expansion port 1414 and the storage device 1406. Each of the processor 1402, the memory 1404, the storage device 1406, the high-speed interface 1408, the high-speed expansion ports 1410, and the low-speed interface 1412, are interconnected using various busses, and can be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as a display 1416 coupled to the high-speed interface 1408. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1404 stores information within the computing device 1400. In some implementations, the memory 1404 is a volatile memory unit or units. In some implementations, the memory 1404 is a non-volatile memory unit or units. The memory 1404 can also be another form of computer-readable medium, such as a magnetic or optical disk.

The storage device 1406 is capable of providing mass storage for the computing device 1400. In some implementations, the storage device 1406 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1404, the storage device 1406, or memory on the processor 1402.

The high-speed interface 1408 manages bandwidth-intensive operations for the computing device 1400, while the low-speed interface 1412 manages lower bandwidth-intensive operations. Such allocation of functions is exemplary only. In some implementations, the high-speed interface 1408 is coupled to the memory 1404, the display 1416 (e.g., through a graphics processor or accelerator), and to the high-speed expansion ports 1410, which can accept various expansion cards (not shown). In the implementation, the low-speed interface 1412 is coupled to the storage device 1406 and the low-speed expansion port 1414. The low-speed expansion port 1414, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1400 can be implemented in a number of different forms, as shown in the figure. For example, it can be implemented as a standard server 1420, or multiple times in a group of such servers. In addition, it can be implemented in a personal computer such as a laptop computer 1422. It can also be implemented as part of a rack server system 1424. Alternatively, components from the computing device 1400 can be combined with other components in a mobile device (not shown), such as a mobile computing device 1450. Each of such devices can contain one or more of the computing device 1400 and the mobile computing device 1450, and an entire system can be made up of multiple computing devices communicating with each other.

The mobile computing device 1450 includes a processor 1452, a memory 1464, an input/output device such as a display 1454, a communication interface 1466, and a transceiver 1468, among other components. The mobile computing device 1450 can also be provided with a storage device, such as a micro-drive or other device, to provide additional storage. Each of the processor 1452, the memory 1464, the display 1454, the communication interface 1466, and the transceiver 1468, are interconnected using various buses, and several of the components can be mounted on a common motherboard or in other manners as appropriate.

The processor 1452 can execute instructions within the mobile computing device 1450, including instructions stored in the memory 1464. The processor 1452 can be implemented as a chipset of chips that include separate and multiple analog and digital processors. The processor 1452 can provide, for example, for coordination of the other components of the mobile computing device 1450, such as control of user interfaces, applications run by the mobile computing device 1450, and wireless communication by the mobile computing device 1450.

The processor 1452 can communicate with a user through a control interface 1458 and a display interface 1456 coupled to the display 1454. The display 1454 can be, for example, a TFT (Thin-Film-Transistor Liquid Crystal Display) display or an OLED (Organic Light Emitting Diode) display, or other appropriate display technology. The display interface 1456 can comprise appropriate circuitry for driving the display 1454 to present graphical and other information to a user. The control interface 1458 can receive commands from a user and convert them for submission to the processor 1452. In addition, an external interface 1462 can provide communication with the processor 1452, so as to enable near area communication of the mobile computing device 1450 with other devices. The external interface 1462 can provide, for example, for wired communication in some implementations, or for wireless communication in other implementations, and multiple interfaces can also be used.

The memory 1464 stores information within the mobile computing device 1450. The memory 1464 can be implemented as one or more of a computer-readable medium or media, a volatile memory unit or units, or a non-volatile memory unit or units. An expansion memory 1474 can also be provided and connected to the mobile computing device 1450 through an expansion interface 1472, which can include, for example, a SIMM (Single In Line Memory Module) card interface. The expansion memory 1474 can provide extra storage space for the mobile computing device 1450, or can also store applications or other information for the mobile computing device 1450. Specifically, the expansion memory 1474 can include instructions to carry out or supplement the processes described above, and can include secure information also. Thus, for example, the expansion memory 1474 can be provide as a security module for the mobile computing device 1450, and can be programmed with instructions that permit secure use of the mobile computing device 1450. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1464, the expansion memory 1474, or memory on the processor 1452. In some implementations, the computer program product can be received in a propagated signal, for example, over the transceiver 1468 or the external interface 1462.

The mobile computing device 1450 can communicate wirelessly through the communication interface 1466, which can include digital signal processing circuitry where necessary. The communication interface 1466 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1468 using a radio-frequency. In addition, short-range communication can occur, such as using a Bluetooth, WiFi, or other such transceiver (not shown). In addition, a GPS (Global Positioning System) receiver module 1470 can provide additional navigation- and location-related wireless data to the mobile computing device 1450, which can be used as appropriate by applications running on the mobile computing device 1450.

The mobile computing device 1450 can also communicate audibly using an audio codec 1460, which can receive spoken information from a user and convert it to usable digital information. The audio codec 1460 can likewise generate audible sound for a user, such as through a speaker, e.g., in a handset of the mobile computing device 1450. Such sound can include sound from voice telephone calls, can include recorded sound (e.g., voice messages, music files, etc.) and can also include sound generated by applications operating on the mobile computing device 1450.

The mobile computing device 1450 can be implemented in a number of different forms, as shown in the figure. For example, it can be implemented as a cellular telephone 1480. It can also be implemented as part of a smart-phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method comprising:
receiving, at a computing system and from first user devices of one or more chefs, menu item content for one or more menu items to be presented to users, at second user devices, and identification of ingredients needed to prepare the one or more menu items;
providing, by the computing system, the one or more menu items to the second user devices for display to the users;
receiving, at the computing system and from a plurality of the second user devices of the users, orders by a specified period of time prior to a delivery window of the orders, wherein the orders include selection of at least one of the one or more menu items presented to the users at the plurality of second user devices;
processing, by the computing system, each order to generate a delivery address and an ordered menu item of the selected at least one of the one or more menu items;
assigning, by the computing system, a kitchen of a plurality of kitchens to prepare the ordered menu item based at least in part on proximity of the kitchen to the generated delivery address of the ordered menu item;
determining, by the computing system, if an inventory of the identification of ingredients of the ordered menu item is understocked in the kitchen;
automatically ordering, by the computing system sending a request to a purveyor device, the understocked ingredients for delivery to the kitchen prior to preparation of the ordered menu item and before the delivery window;
forwarding, by the computing system, instructions to prepare the ordered menu item to a third user device in the kitchen where the ordered menu item is to be prepared after the understocked ingredients have been delivered by a purveyor of the purveyor device;
grouping, by the computing system, the ordered menu items into cohorts of ordered menu items based on proximity of the generated addresses relative to each other;
assigning, by the computing system, the cohorts of ordered menu items to one or more delivery workers; and
providing, by the computing system, delivery routes for each of the cohorts of the ordered menu items to be delivered to fourth user devices of the one or more delivery workers, wherein the delivery routes include driving instructions to deliver the orders.

2. The method of claim 1, further comprising receiving, by the computing system, the menu item content for the menu item to be presented to the users from a plurality of unaffiliated chefs.

3. The method of claim 1, wherein the identification of ingredients comprise SKUs associated with each of the ingredients needed to prepare the menu item.

4. The method of claim 1, wherein the identification of ingredients comprise weights and quantities of each of the ingredients needed to prepare the menu item.

5. The method of claim 1, wherein the specified period of time prior to delivery of the orders is within a range of 3 to 24 hours.

6. The method of claim 1, further comprising lowering, by the computing system and by a predetermined amount, a cost charged to the users for the orders based on how far in advance the users place the orders within the specified period of time prior to the delivery window of the orders.

7. The method of claim 1, wherein assigning, by the computing system, the kitchen to prepare the ordered menu item is further based at least in part on whether the kitchen has a quantity of the ingredients needed to prepare the ordered menu item.

8. The method of claim 1, wherein assigning, by the computing system, the kitchen to prepare the ordered menu item is further based at least in part on whether the kitchen has equipment needed to prepare the ordered menu item.

9. The method of claim 1, wherein assigning, by the computing system, the kitchen to prepare the ordered menu item is further based at least in part on whether the kitchen has sufficient kitchen staff to prepare the ordered menu item.

10. The method of claim 1, wherein assigning, by the computing system, the kitchen to prepare the ordered menu item is further based at least in part on whether the kitchen is assigned a quantity of ordered menu items to prepare that is less than a predetermined threshold quantity.

11. The method of claim 1, wherein the understocked ingredients are automatically ordered within 1 to 2 days of receiving the orders.

12. The method of claim 1, further comprising receiving, at the computing system and from the first user devices of the one or more chefs, at least one of preparing instructions, a recipe, and time needed to prepare the menu item.

13. The method of claim 1, further comprising generating, by the computing system, a label for the ordered menu item to be placed on the ordered menu item once it is prepared by the kitchen.

14. The method of claim 1, wherein determining, by the computing system, if an inventory of the identification of ingredients of the ordered menu item is understocked in the kitchen further comprises:
    receiving, from the third user device in the kitchen, a list of SKUs and quantities of each SKU present in the kitchen; and
    determining at least one of (i) the list of SKUs present in the kitchen does not include the ingredient of the ordered menu item and (ii) the quantity of the SKU present in the kitchen that corresponds to the ingredient of the ordered menu item is less than a predetermined quantity of the ingredient needed to prepare the ordered menu item.

15. The method of claim 1, wherein grouping, by the computing system, the ordered menu items into cohorts of ordered menu items further comprises determining, for each of the cohorts of ordered menu items, an order to pack the ordered menu items into a delivery unit.

16. The method of claim 15, wherein the delivery unit maintains the cohort of ordered menu items at a predetermined temperature for delivery routes that are up to 90 minutes long.

17. The method of claim 1, wherein grouping, by the computing system, the ordered menu items into cohorts of ordered menu items is further based on delivery times for each of the ordered menu items being within a predetermined period of time relative to each other.

18. The method of claim 1, wherein assigning, by the computing system, the cohorts of ordered menu items to one or more delivery workers is based on, for each of the one or more delivery workers, at least one of delivery performance, proximity of the delivery worker to the kitchen, and work schedule of the delivery worker.

19. A computerized system for preparation and delivery of ordered menu items, the system comprising:
    one or more processors; and
    one or more computer-readable devices including instructions that, when executed by the one or more processors, cause the computerized system to perform operations that include:
        receiving, from first user devices of one or more chefs, menu item content for one or more menu items to be presented to users, at second user devices, and identification of ingredients needed to prepare the one or more menu items;
        providing the one or more menu items to the second user devices for display to the users;
        receiving, from a plurality of the second user devices of the users, orders by a specified period of time prior to a delivery window of the orders, wherein the orders include selection of at least one of the one or more menu items presented to the users at the plurality of second user devices;
        processing each order to generate a delivery address and an ordered menu item of the selected at least one of the one or more menu items;
        assigning a kitchen of a plurality of kitchens to prepare the ordered menu item based at least in part on proximity of the kitchen to the generated delivery address of the ordered menu item;
        determining if an inventory of the identification of ingredients of the ordered menu item is understocked in the kitchen;
        automatically ordering, by sending a request to a purveyor device, understocked ingredients for delivery to the kitchen prior to preparation of the ordered menu item and before the delivery window;
        forwarding instructions to prepare the ordered menu item to a third user device in the kitchen where the ordered menu item is to be prepared after the understocked ingredients have been delivered by a purveyor of the purveyor device;
        grouping the ordered menu items into cohorts of ordered menu items based on proximity of the generated addresses relative to each other;
        assigning the cohorts of ordered menu items to one or more delivery workers; and
        providing delivery routes for each of the cohorts of the ordered menu items to be delivered to fourth user devices of the one or more delivery workers, wherein the delivery routes include driving instructions to deliver the orders.

* * * * *